US012809009B2

(12) United States Patent
Iwasa et al.

(10) Patent No.: US 12,809,009 B2

(45) Date of Patent: Nov. 24, 2026

(54) RADAR DEVICE

(71) Applicant: Panasonic Automotive Systems Co., Ltd., Kanagawa (JP)

(72) Inventors: Kenta Iwasa, Kanagawa (JP); Hidekuni Yomo, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 194 days.

(21) Appl. No.: 18/775,543

(22) Filed: Jul. 17, 2024

(65) Prior Publication Data

US 2024/0377518 A1 Nov. 14, 2024

Related U.S. Application Data

(63) Continuation of application No. 18/481,854, filed on Oct. 5, 2023, now Pat. No. 12,072,409, which is a (Continued)

(30) Foreign Application Priority Data

Mar. 19, 2018 (JP) ................................ 2018-051491
Sep. 28, 2018 (JP) ................................ 2018-185238

(51) Int. Cl.

*G01S 13/00* (2006.01)
*G01S 7/03* (2006.01)

(Continued)

(52) U.S. Cl.

CPC .............. *G01S 13/003* (2013.01); *G01S 7/03* (2013.01); *G01S 7/032* (2013.01); *G01S 7/282* (2013.01);

(Continued)

(58) Field of Classification Search

CPC .... H01Q 1/3233; H01Q 3/2605; H01Q 21/00; H01Q 21/293; H01Q 21/08;

(Continued)

(56) References Cited

U.S. PATENT DOCUMENTS

| | | | | |
|---|---|---|---|---|
| 6,246,365 B1 * | 6/2001 | Tokoro | G01S 13/42 | 342/149 |
| 7,250,918 B2 * | 7/2007 | Puente Baliarda | H01Q 21/08 | 343/893 |

(Continued)

FOREIGN PATENT DOCUMENTS

| | | |
|---|---|---|
| EP | 2423704 A1 | 2/2012 |
| EP | 2963442 A1 | 1/2016 |

(Continued)

OTHER PUBLICATIONS

Communication pursuant to Article 94(3) EPC, dated Jul. 31, 2025, for European Patent Application No. 19161172.2. (5 pages).

(Continued)

*Primary Examiner* — Peter M Bythrow

(74) *Attorney, Agent, or Firm* — Seed Intellectual Property Law Group LLP

(57) ABSTRACT

One of a transmitting array antenna and a receiving array antenna includes a first antenna group and a second antenna group. The first antenna group includes one or more first antenna elements of which the phase centers of the antenna elements are laid out at each first layout spacing following a first axis direction, and a shared antenna element. The second antenna group includes a plurality of second antenna elements and the one shared antenna element, and the phase centers of the antenna elements are laid out in two columns at each second layout spacing following a second axis direction that is different from the first axis direction. The phase centers of the antenna elements included in each of the (Continued)

two columns differ from each other regarding position in the second axis direction.

8 Claims, 36 Drawing Sheets

Related U.S. Application Data continuation of application No. 18/179,255, filed on Mar. 6, 2023, now Pat. No. 11,815,586, which is a continuation of application No. 17/507,564, filed on Oct. 21, 2021, now Pat. No. 11,635,506, which is a continuation of application No. 16/289,127, filed on Feb. 28, 2019, now Pat. No. 11,187,795.

(51) Int. Cl.

| | |
|---|---|
| ***G01S 7/282*** | (2006.01) |
| ***G01S 7/285*** | (2006.01) |
| ***G01S 13/42*** | (2006.01) |
| ***G01S 13/87*** | (2006.01) |
| ***G01S 13/931*** | (2020.01) |
| ***H01Q 1/32*** | (2006.01) |
| ***H01Q 3/26*** | (2006.01) |
| ***H01Q 21/06*** | (2006.01) |
| ***H01Q 21/29*** | (2006.01) |

(52) U.S. Cl.
CPC .............. *G01S 7/285* (2013.01); *G01S 13/42* (2013.01); *G01S 13/878* (2013.01); *H01Q 1/3233* (2013.01); *H01Q 3/2605* (2013.01); *H01Q 21/061* (2013.01); *H01Q 21/293* (2013.01); *G01S 13/931* (2013.01)

(58) Field of Classification Search
CPC ......... H01Q 21/061; G01S 7/03; G01S 7/032; G01S 7/282; G01S 7/285; G01S 13/878; G01S 13/42; G01S 13/003
See application file for complete search history.

(56) References Cited

U.S. PATENT DOCUMENTS

| | | | | |
|---|---|---|---|---|
| 7,714,782 | B2 * | 5/2010 | Davis | H01Q 21/22 342/99 |
| 8,289,203 | B2 * | 10/2012 | Culkin | G01S 7/03 342/81 |
| 8,717,224 | B2 * | 5/2014 | Jeong | G01S 13/4463 342/93 |
| 9,121,943 | B2 * | 9/2015 | Stirling-Gallacher | G01S 13/888 |
| 9,203,160 | B2 * | 12/2015 | Blech | H01Q 21/08 |
| 9,541,639 | B2 * | 1/2017 | Searcy | G01S 7/03 |
| 9,568,600 | B2 * | 2/2017 | Alland | G01S 7/2925 |
| 9,880,262 | B2 * | 1/2018 | Hayakawa | H01Q 3/267 |
| 9,910,150 | B2 * | 3/2018 | Schoor | H01Q 25/00 |
| 9,964,631 | B2 * | 5/2018 | Choi | H01Q 21/08 |
| 10,141,657 | B2 * | 11/2018 | Kishigami | G01S 13/26 |
| 10,371,796 | B2 * | 8/2019 | Kishigami | G01S 7/28 |
| 10,382,140 | B2 * | 8/2019 | Fatemi | H04B 10/11 |
| 10,481,249 | B2 * | 11/2019 | Alenljung | G01S 7/354 |
| 10,634,775 | B2 * | 4/2020 | Loesch | G01S 13/003 |
| 10,768,291 | B2 * | 9/2020 | Hammes | G01S 13/343 |
| 10,775,491 | B2 * | 9/2020 | Lim | G01S 13/345 |
| 10,823,819 | B2 * | 11/2020 | Loesch | G01S 13/42 |
| 10,871,562 | B2 * | 12/2020 | Trummer | G01S 13/4454 |
| 10,890,652 | B2 * | 1/2021 | Kishigami | G01S 13/288 |
| 10,928,500 | B2 * | 2/2021 | Culkin | G01S 7/414 |
| 2008/0258964 | A1 * | 10/2008 | Schoeberl | G01S 13/931 342/189 |
| 2008/0291077 | A1 * | 11/2008 | Chang | G01S 13/89 342/179 |
| 2009/0046000 | A1 * | 2/2009 | Matsuoka | H01Q 3/26 342/147 |
| 2010/0123616 | A1 * | 5/2010 | Minami | H01Q 21/08 342/147 |
| 2011/0057831 | A1 * | 3/2011 | Shinomiya | H01Q 21/22 342/189 |
| 2011/0074620 | A1 * | 3/2011 | Wintermantel | G01S 7/0233 342/70 |
| 2011/0163906 | A1 * | 7/2011 | Yang | H01Q 1/3233 342/147 |
| 2012/0050091 | A1 * | 3/2012 | Inami | H01Q 21/061 342/107 |
| 2012/0299773 | A1 * | 11/2012 | Stirling-Gallacher | G01S 13/888 342/368 |
| 2013/0229300 | A1 * | 9/2013 | Izumi | G01S 7/4026 342/156 |
| 2014/0062762 | A1 * | 3/2014 | Kurono | G01S 7/354 342/146 |
| 2014/0104097 | A1 * | 4/2014 | Binzer | H01Q 25/00 342/74 |
| 2014/0340253 | A1 * | 11/2014 | Koerber | G01S 13/931 342/146 |
| 2016/0282450 | A1 * | 9/2016 | Kishigami | G01S 13/426 |
| 2016/0285172 | A1 * | 9/2016 | Kishigami | G01S 13/325 |
| 2017/0082730 | A1 * | 3/2017 | Kishigami | G01S 13/325 |
| 2017/0139042 | A1 * | 5/2017 | Alenljung | G01S 7/354 |
| 2017/0307744 | A1 * | 10/2017 | Loesch | H01Q 21/296 |
| 2018/0088224 | A1 * | 3/2018 | Kishigami | G01S 13/46 |
| 2020/0096626 | A1 * | 3/2020 | Wang | G01S 13/4454 |

FOREIGN PATENT DOCUMENTS

| | | |
|---|---|---|
| JP | 2011526370 A | 10/2011 |
| JP | 2017534881 A | 11/2017 |

OTHER PUBLICATIONS

Cadzow, "Direction-of-Arrival Estimation Using Signal Subspace Modeling", *IEEE Transactions on Aerospace and Electronic Systems* 28(1):64-79, Jan. 1992.
Extended European Search Report, dated Aug. 7, 2019, for European Patent Application No. 19161172.2. (12 pages).
Vaidyanathan et al., "MIMO Radar with Broadband waveforms: Smearing Filter Banks and 2D Virtual Arrays", Forty-Second Asilomar Conference on Signals, Systems and Computers, Pacific Grove, California, Oct. 26-29, 2008, pp. 188-192.

* cited by examiner

10

200

202

500b

500

202g

500g

500i

RADAR DEVICE

BACKGROUND

1. Technical Field

The present disclosure relates to a radar device.

2. Description of the Related Art

In recent years, radar devices are being studied that use short wavelength radar transmission signals, including microwaves or millimeter waves that yield high resolution. There also is demand for development of radar devices that detect, in addition to vehicles, objects (targets) including pedestrians, over a wide angle range (wide-angle radar devices), in order to improve safety outdoors.

There also has been proposed a radar device having a configuration that has multiple antenna elements (antenna array) at a transmitting branch in addition to a receiving branch, and that performs beam scanning by signal processing using transmitting/receiving array antennas (also referred to as Multiple Input and Multiple Output (MIMO) radar) (e.g., see P. P. Vaidyanathan, P. Pal, Chun-Yang Chen, “MIMO radar with broadband waveforms: Smearing filter banks and 2D virtual arrays, “IEEE Asilomar Conference on Signals, Systems and Computers, pp. 188-192, 2008 (hereinafter “VAIDYANATHAN et al”).

A MIMO radar enables configuration of virtual receiving array antennas (hereinafter referred to as virtual receiving array) equivalent to the product of the transmitting antenna element count and receiving antenna element count as a maximum, by innovative layout of antenna elements in a transmitting/receiving array antenna. This is advantageous in that the effective aperture length of the array antenna can be increased with a small number of elements.

Also, MIMO radar can be applied in cases of performing two-dimensional beam scanning in the vertical direction and horizontal direction, besides one-dimensional scanning in the vertical direction or the horizontal direction (e.g., see Japanese Unexamined Patent Application Publication (Translation of PCT Application) No. 2017-534881 and VAIDYANATHAN et al).

SUMMARY

One non-limiting and exemplary embodiment provides a radar device where the aperture length per antenna element can be increased, and the aperture length of a virtual receiving array can be widened.

In one general aspect, the techniques disclosed here feature a radar device, including a radar transmitting circuit that transmits radar signals from a transmission array antenna, and a radar receiving circuit that receives returning wave signals, where the radar signals have been reflected at a target, from a receiving array antenna. One of the transmitting array antenna and the receiving array antenna includes a first antenna group and a second antenna group. The first antenna group includes one or more first antenna elements of which the phase centers of the antenna elements are laid out at each first layout spacing following a first axis direction, and a shared antenna element. The second antenna group includes a plurality of second antenna elements and the one shared antenna element, and the phase centers of the antenna elements are laid out in two columns at each second layout spacing following a second axis direction that is different from the first axis direction. The phase centers of the antenna elements included in each of the two columns differ from each other regarding position in the second axis direction. The other of the transmitting array antenna and the receiving array antenna includes a plurality of third antenna elements of which the phase centers are laid out in a first count of columns based on the first layout spacing along the first axis direction, at each third layout spacing that is smaller than the first layout spacing, and laid out following the second axis direction at each fourth layout spacing that is larger than the second layout spacing.

According to an aspect of the present disclosure, a radar device where the aperture length per antenna element can be increased, and the aperture length of a virtual receiving array can be widened, can be provided.

It should be noted that general or specific embodiments may be implemented as a system, a device, a method, an integrated circuit, a computer program, or a recording medium, or may be realized by any combination of system, device, method, integrated circuit, computer program, and recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
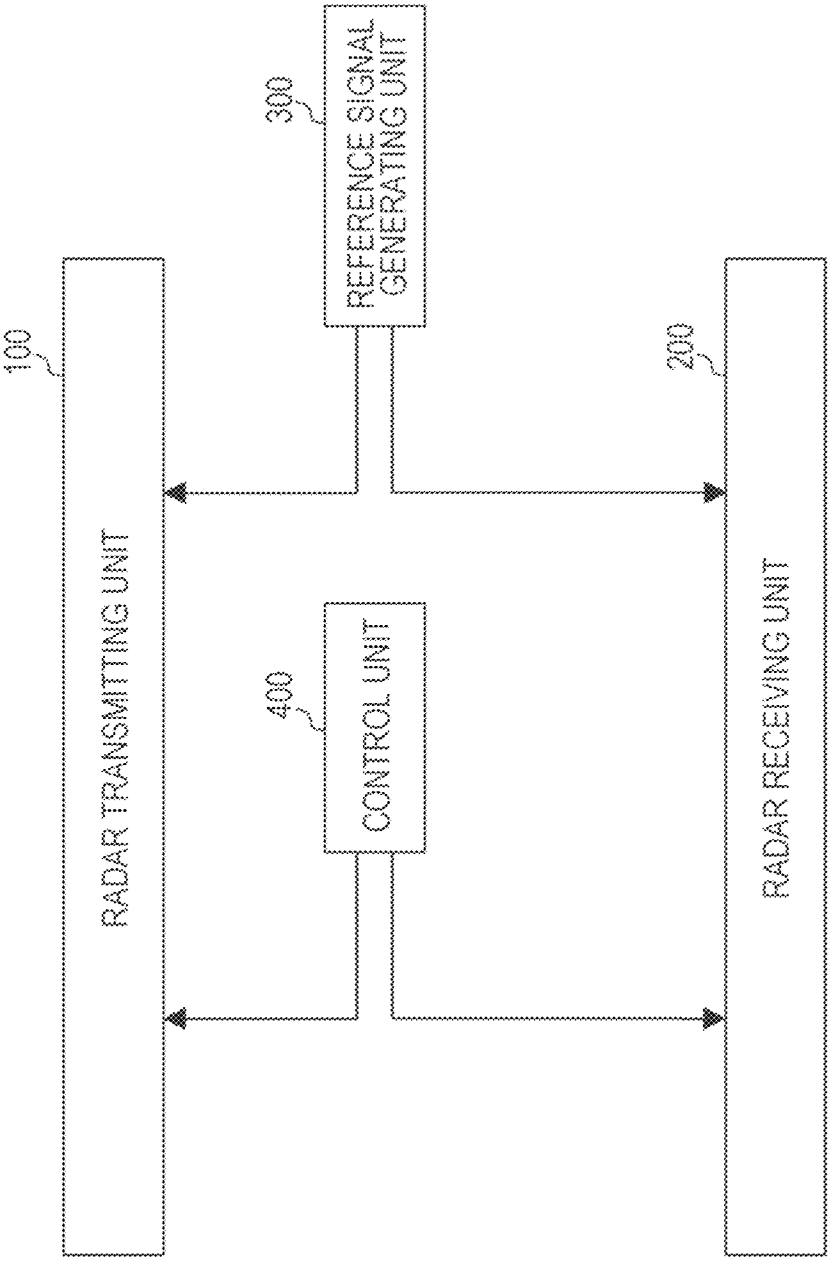
FIG. 1 is a block diagram illustrating an example of the configuration of a radar device according to a first embodiment.

A type of radar device called a pulse radar device, which repeatedly emits pulse waves for example, is known. Reception signals of a wide-angle pulse radar that detects vehicles and pedestrians over a wide range are signals where multiple reflected waves from nearby targets (e.g., vehicles) and distant targets (e.g., pedestrians) are intermingled. Accordingly, (1) the radar transmitting unit is required to have a configuration where pulse waves or pulse modulation waves having autocorrelation properties of low-range sidelobes (hereinafter referred to as low-range sidelobe properties) are transmitted, and (2) the radar receiving unit is required to have a configuration with a broad reception dynamic range.

Wide-angle radar device configurations include the following two. A first configuration transmits radar waves by mechanically or electronically scanning pulse waves or modulation waves using a narrow-angle (beam width of around several degrees) directional beam, and receives reflected waves using a narrow-angle directional beam. Tracking capabilities of fast-moving targets deteriorates with this configuration, since the number of times of scanning to obtain high resolution increases.

A second configuration receives reflected waves by an array antenna made up of multiple antennas (multiple antenna elements) at the receiving branch, and uses a technique of estimating the arrival angle of reflected waves (direction of arrival (DOA) estimation) by a signal processing algorithm based on reception phase difference as to antenna element spacing. This configuration enables reduction of the scanning time since the arrival angle can be estimated at the receiving branch even if scanning spacings of transmission beams at the transmitting branch are thinned out, and accordingly tracking capabilities are higher as compared to the first configuration. Examples of DOA estimation techniques include Fourier transform based on matrix operations, Capon and linear prediction (LP) based on inverse matrix operations, and Multiple Signal Classification (MUSIC) and estimation of signal parameters via rotational invariance techniques (ESPRIT) based on eigenvalue operations.

A MIMO radar that performs beam scanning using multiple antenna elements at the transmitting branch in addition to the receiving branch transmits signals multiplexed using time division, frequency division, or code division, from multiple transmitting antenna elements. Signals reflected at surrounding objects are received by multiple receiving antenna elements, and the multiplexed transmission signals are separated from each of the received signals, and thus received.

Further, a MIMO radar enables configuration of virtual receiving array antennas (virtual receiving array) equivalent to the product of the transmitting antenna element count and receiving antenna element count as a maximum, by innovative layout of antenna elements in a transmitting/receiving array antenna. Accordingly, propagation channel response indicated by the product of the transmitting antenna element count and receiving antenna element count can be obtained. Also, the effective aperture length of the array antenna can be virtually broadened with a small number of elements, and angular resolution can be improved by appropriately laying out spacings between transmitting/receiving antenna elements.

Antenna element configurations in a MIMO radar are generally classified into configurations using a single antenna element (hereinafter referred to as single antenna) and configurations using a sub-array arrangement of multiple antenna elements (hereinafter referred to as sub-array). In a case of using a single antenna, properties are exhibited with broad directionality as compared to a case of using a sub-array, but antenna gain is relatively lower. Accordingly, in order to improve the reception signal to noise ratio (SNR) of the returning wave signals, either more addition processing has to be performed in the reception signal processing, or the antenna has to be configured using multiple single antennas, for example.

On the other hand, in a case of using a sub-array, multiple antenna elements are included in one sub-array, unlike the case of using a single antenna, so the physical size of the antenna increases and antenna gain in the main beam direction can be increased. Specifically, the physical size of the sub-array is around or greater than the wavelength of the radio frequency (carrier frequency) of the transmission signals.

Also, MIMO radar can be applied in cases of performing two-dimensional beam scanning in the vertical direction and horizontal direction, besides one-dimensional scanning in the vertical direction or the horizontal direction (e.g., see Japanese Unexamined Patent Application Publication (Translation of PCT Application) No. 2017-534881 and VAIDYANATHAN et al). However, in a case of arraying antenna elements at equal spacings that are around one-half wavelength in the horizontal direction and vertical direction for the transmitting antennal elements and receiving antennal elements, as described in Japanese Unexamined Patent Application Publication (Translation of PCT Application) No. 2017-534881, it is difficult to form a sub-array of the antenna elements and obtain high antenna gain, due to physical constraints since the antenna elements are adjacent to each other.

On the other hand, the farther the antenna spacing is increased beyond one wavelength to form a sub-array of the antenna elements, grating lobe or sidelobe components in angular directions are generated, and the chance of erroneous detection increases.

Also, in a case where there are restrictions on the antenna element count for transmitting/receiving branches in order to reduce the size and cost of a MIMO radar (e.g., around four antenna elements for transmitting or around four antenna elements for receiving), it is difficult to improve the SNR of the returning wave signals by using a greater number of antenna elements, and moreover, the aperture length of the planar virtual receiving array of the MIMO radar in the vertical direction and horizontal direction is restricted.

As described above, in a case of arraying transmitting antenna elements and receiving antenna elements at equal spacings that are around one-half wavelength in the horizontal direction and vertical direction, increasing the aperture length of each antenna element to obtain high gain of the antenna elements is difficult, since the antenna elements are adjacent to each other. On the other hand, the farther the antenna spacing is increased, the more grating lobes are generated near the main lobe, and the chance of erroneous detection increases.

First Embodiment

According to one aspect of the present disclosure, antenna elements are formed into a sub-array to improve reception SNR of returning wave signals, and virtual receiving arrays are arrayed at equal spacings around one-half wavelength to suppress grating lobes or sidelobe components. According to an aspect of the present disclosure, a radar device can be provided where the aperture length per antenna element is increased to raise gain without increasing the chance of erroneous detection, while arraying a virtual receiving array at equal spacings whereby the aperture length of the virtual receiving array can be broadened. Embodiments of the present disclosure will be described below in detail with reference to the drawings. Note that in the embodiments, components that are the same are denoted by the same symbols, and redundant description thereof will be omitted.

Before describing the layout of multiple transmitting antennas (transmitting sub-arrays) and multiple receiving antennas (receiving sub-arrays), the configuration of the radar device will be described. Specifically, description will be made regarding the configuration of a MIMO radar where multiple transmitting antennas are switched by time division in the transmitting branch of the radar device, different radar transmission signals that have been time division multiplexed are transmitted, and the transmission signals are separated and reception processing is performed at the receiving branch. However, the configuration of the radar device is not restricted to this, and may be of a configuration where different transmission signals that have been frequency division multiplexed are transmitted by multiple transmitting antennas at the transmitting branch, and the transmission signals are separated and reception processing is performed at the receiving branch. Similarly, a configuration of the radar device may be made where transmission signals that have been code division multiplexed are transmitted by multiple transmitting antennas at the transmitting branch, and reception processing is performed at the receiving branch. It should be noted that the embodiments described below are only exemplary, and that the present disclosure is not restricted by the following embodiments.

Configuration of Radar Device 10

FIG. 1 is a block diagram illustrating an example of the configuration of a radar device 10 according to a first embodiment. The radar device 10 has a radar transmitting unit (also referred to as a transmitting branch or radar transmission circuit) 100, a radar receiving unit (also referred to as a receiving branch or radar reception circuit) 200, a reference signal generating unit (reference signal generating circuit) 300, and a control unit (control circuit) 400.

The radar transmitting unit 100 generates high-frequency (radio frequency) radar signals (radar transmission signals) based on reference signals received from the reference signal generating unit 300. The radar transmitting unit 100 then transmits the radar transmission signals while switching multiple transmitting antenna elements #1 through #Na by time division.

The radar receiving unit 200 receives returning wave signals that are radar transmission signals reflected at a target (omitted from illustration), using multiple receiving antenna elements #1 through #Na. The radar receiving unit 200 performs processing synchronously with the radar transmitting unit 100 by performing the processing operations described below, using reference signals received from the reference signal generating unit 300. The radar receiving unit 200 performs signal processing on returning wave signals received at each receiving antenna element 202, and performs detection of at least whether or not a target is present, or estimation of the direction thereof. Note that a target is an object that is to be detected by the radar device 10, and includes, for example, vehicles (including those with two wheels, three wheels, and four wheels) and people.

The reference signal generating unit 300 connected to each of the radar transmitting unit 100 and the radar receiving unit 200. The reference signal generating unit 300 supplies reference signals to the radar transmitting unit 100 and radar receiving unit 200, to synchronize the processing at the radar transmitting unit 100 and radar receiving unit 200.

The control unit 400 sets the pulse code generated by the radar transmitting unit 100, the phase to be set in variable beam control at the radar transmitting unit 100 and the level of amplification of signals by the radar transmitting unit 100, for each radar transmission cycle Tr. The control unit 400 outputs control signals instructing pulse code (code control signals), control signals instructing phase (phase control signals), and control signals instructing amplification level of transmission signals (transmission control signals) to the radar transmitting unit 100. The control unit 400 also outputs output switching signals instructing timing of switching of transmitting sub-arrays #1 through #N of the radar transmitting unit 100 (switching of output of radar transmission signals) to the radar receiving unit 200.

Configuration of Radar Transmitting Unit 100

Figure 2:
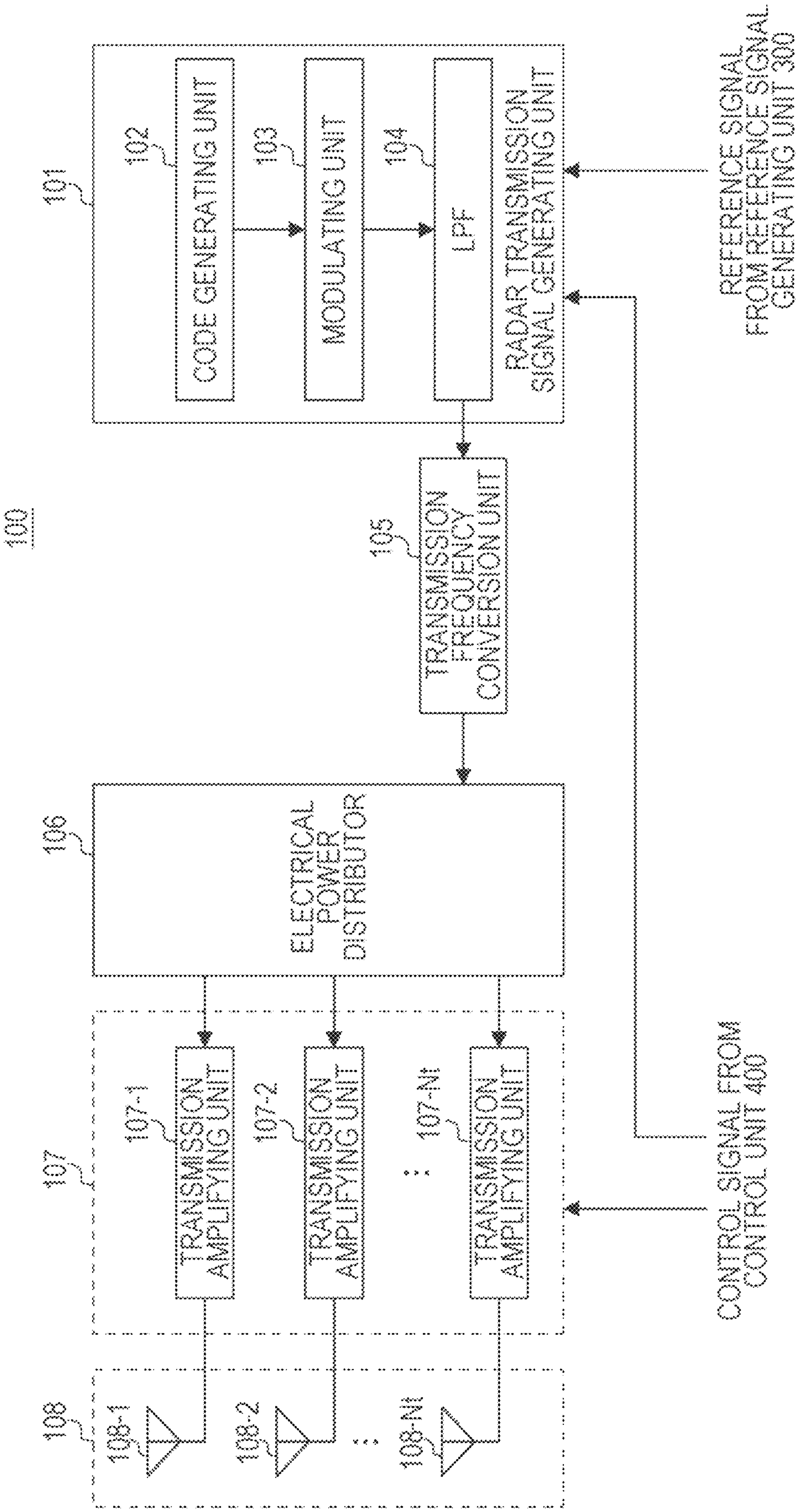
FIG. 2 is a block diagram illustrating an example of the configuration of a radar transmitting unit according to the first embodiment.

FIG. 2 is a block diagram illustrating an example of the configuration of the radar transmitting unit 100 according to the first embodiment. The radar transmitting unit 100 has a radar transmission signal generating unit (radar transmission signal generating circuit) 101, a transmission frequency conversion unit (transmission frequency conversion circuit) 105, an electrical power distributor (electrical power distribution circuit) 106, a transmission amplifying unit (transmission amplifying circuit) 107, and a transmission array antenna 108.

Although the following description will be made illustrating the configuration of the radar transmitting unit 100 using a coded pulse radar, but this is not restrictive. For example, the radar transmitting unit 100 is similarly applicable to radar transmission signals using frequency-modulated continuous-wave (FM-CW) radar frequency modulation.

The radar transmission signal generating unit 101 generates a timing clock (clock signal) where a reference signal received from the reference signal generating unit 300 is multiplied by a predetermined number, and generates radar transmission signals based on the generated timing clock. The radar transmission signal generating unit 101 repeatedly outputs radar transmission signals at the radar transmission cycle Tr, based on code control signals from the control unit 400 at each predetermined radar transmission cycle Tr.

Radar transmission signals are expressed by $$y(k_t, M) = I(k_T, M) + jQ(k_t, M)$$

where j represents an imaginary unit, k represents discrete time, M is an ordinal number of the radar transmission cycle, and I ($k_T$, M) and Q ($k_T$, M) respectively represent the in-phase component and quadrature component of radar transmission signal ($k_T$, M) at discrete time $k_T$ in the M'th radar transmission cycle.

The radar transmission signal generating unit 101 includes a code generating unit (code generating circuit) 102, a modulating unit (modulation circuit) 103, and a low-pass filter (LPF) 104.

The code generating unit 102 generates code $a_n(M)$ (where n=1, . . . , L) of a code sequence having a code length of L (pulse code), in the M'th radar transmission cycle, based on code control signals at each radar transmission cycle Tr. Pulse code that yields low-range sidelobe properties is used for the code $a_n(M)$ generated at the code generating unit 102. Examples of the code sequence include Barker code, maximum-length sequence code, and Gold code. The code $a_n(M)$ generated by the code generating unit 102 may all be of the same code, or may be code including different codes.

The modulating unit 103 subjects the code $a_n(M)$ output from the code generating unit 102 to pulse modulation (amplitude modulation, amplitude-shift keying (ASK), or pulse shift keying) or phase modulation (phase-shift keying (PSK), and outputs the modulated code to the LPF 104.

Of the modulated signals output from the modulating unit 103, signal components of a predetermined restricted bandwidth and lower are output to the transmission frequency conversion unit 105 as baseband radar transmission signals by the LPF 104.

The transmission frequency conversion unit 105 performs frequency conversion of the baseband radar transmission signals output from the LPF 104 into radar transmission signals of a predetermined carrier frequency (radio frequency (RF)) band.

The electrical power distributor 106 distributes the radio-frequency-band radar transmission signals output from the transmission frequency conversion unit 105 over a count Nt, and outputs to the transmission amplifying units 107.

The transmission amplifying units 107 (107-1 through 107-Nt) either amplify the radar transmission signals to be output to a predetermined level and output, or turn transmission output off, based on transmission control signals for each radar transmission cycle Tr instructed from the control unit 400.

The transmission array antenna 108 has Nt transmitting antenna elements #1 through #Nt (108-1 through 108-Nt). The transmitting antenna elements #1 through #Nt are respectively connected to individual transmission amplifying units 107-1 through 107-Nt, and transmit radar transmission signals output from the individual transmission amplifying units 107-1 through 107-Nt.

Figure 3:
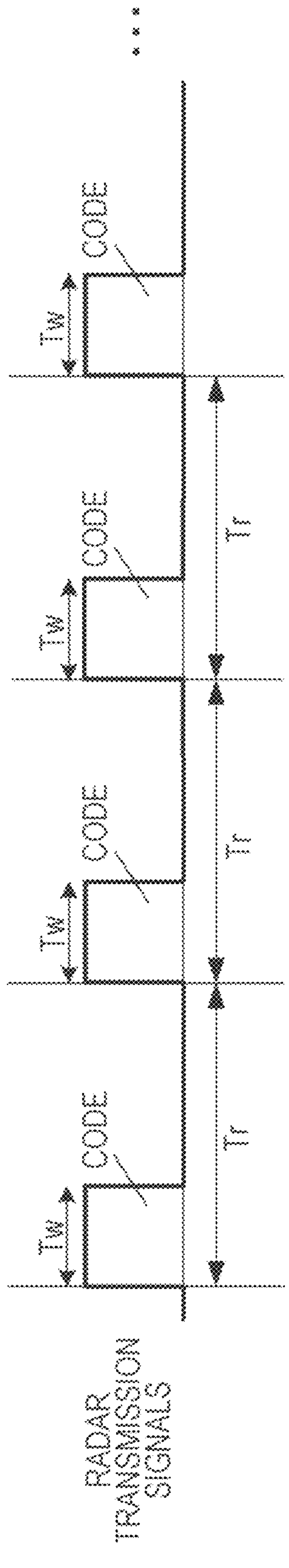
FIG. 3 is a block diagram illustrating an example of radar transmission signals according to the first embodiment.

FIG. 3 is a diagram illustrating an example of radar transmission signals according to the first embodiment. In each radar transmission cycle Tr, the pulse code sequence is transmitted during a code transmission slot Tw, and the remainder (Tr−Tw) is a non-transmission slot. A pulse code sequence of code length L is included in the code transmission slot Tw. An L count of sub-pulses is included in a single code. Also, pulse modulation is performed using an No count of samples per sub-pulse, so there are Nr (No×L) samples in each code transmission slot Tw. Further, an Nu count of samples is included in the non-transmission slot (Tr−Tw) of the radar transmission cycle Tr.

Figure 4:
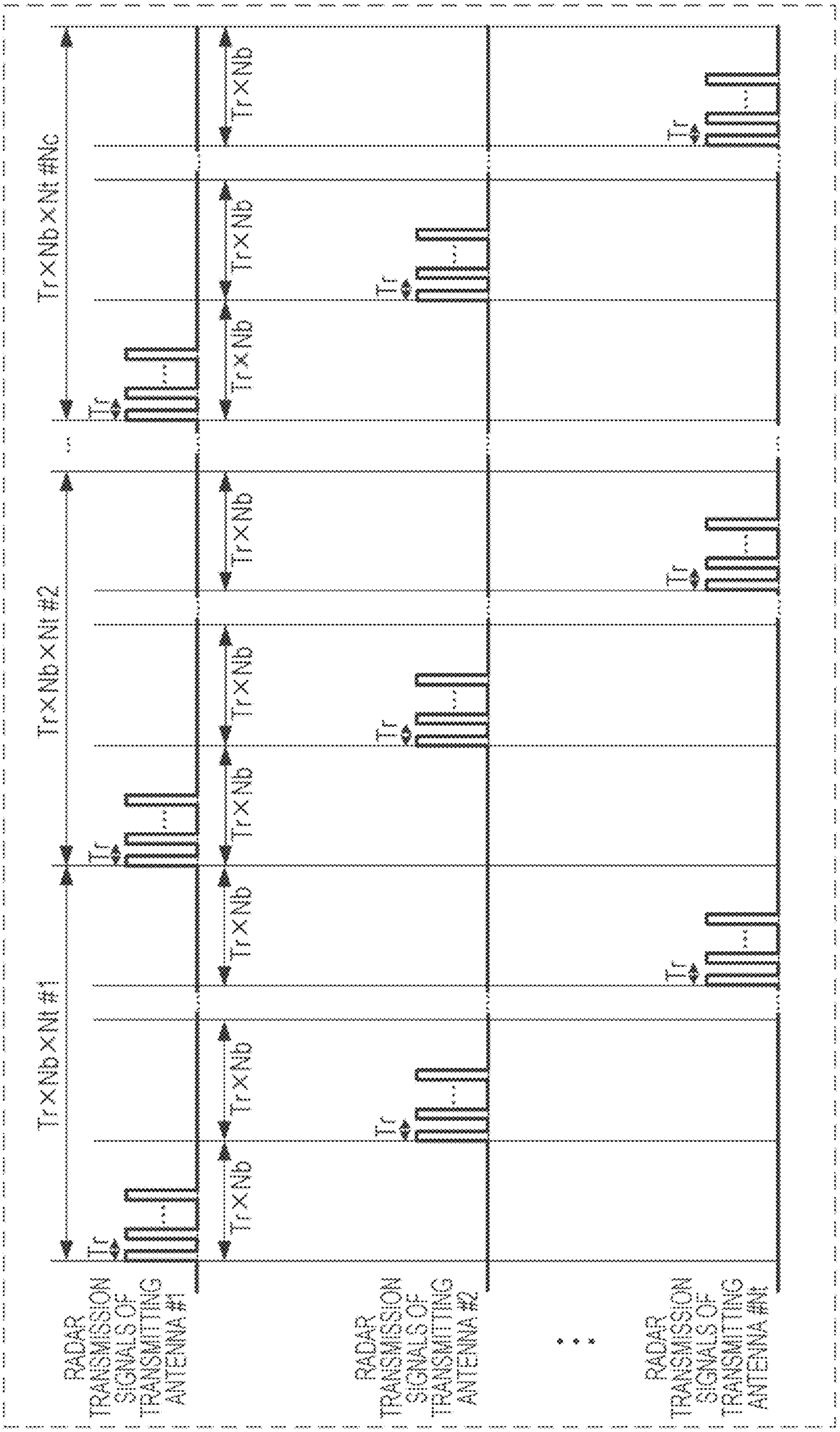
FIG. 4 is a diagram illustrating an example of time division switching operations of a transmitting antenna by a control unit according to the first embodiment.

FIG. 4 illustrates an example of time division switching operations of the transmitting antenna elements #1 through #Nt by the control unit 400 according to the present disclosure. In FIG. 4, the control unit 400 outputs control signals (code control signals, transmission control signals) to instruct switching the output from the transmission antenna elements, in order from the transmitting antenna element #1 through the transmitting antenna element #Nt, to the radar transmitting unit 100 at each radar transmission cycle Tr. With the transmission output duration of each transmitting sub-array as (Tr×Nb), the control unit 400 effects control to repeat switching operations for the transmission output duration for all transmitting sub-arrays, which is (Tr×Np)=(Tr×Nb×Nt), Nc times. The later-described radar receiving unit 200 performs measurement processing based on the switching operations of the control unit 400.

For example, in a case of transmitting radar transmission signals from the transmitting antenna element #1, the control unit 400 outputs a transmission control signal to the transmission amplifying unit 107-1 connected to the transmitting antenna element #1, instructing amplification of input signals to a predetermined level, and outputs transmission control signals to the transmission amplifying units 107-2 through 107-Nt not connected to the transmitting antenna element #1, instructing to leave transmission output off.

In the same way, in a case of transmitting radar transmission signals from the transmitting antenna element #2, the control unit 400 outputs a transmission control signal to the transmission amplifying unit 107-2 connected to the transmitting antenna element #2, instructing amplification of input signals to a predetermined level, and outputs transmission control signals to the transmission amplifying units 107 not connected to the transmitting antenna element #2, instructing to leave transmission output off. Thereafter the control unit 400 performs the same control to the transmitting antenna elements #3 through #Nt in order. This so far has been a description of output switching operations of radar transmission signals by the control unit 400.

Another Configuration of Radar Transmitting Unit 100

Figure 5:
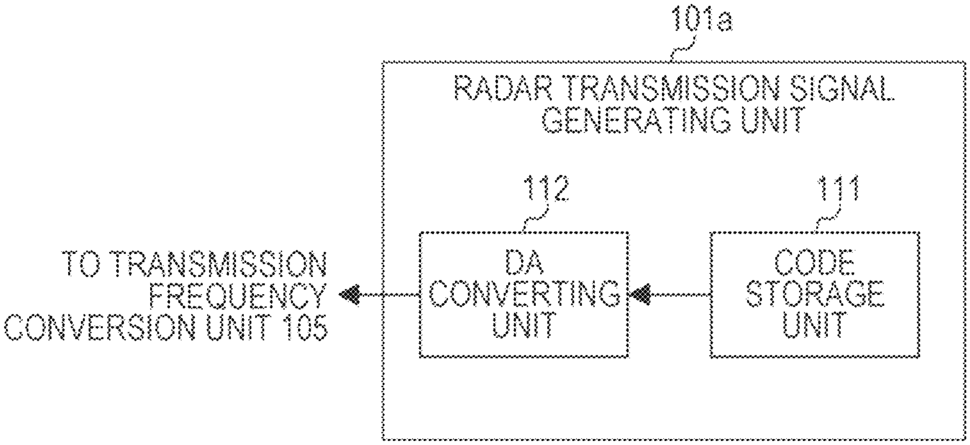
FIG. 5 is a block diagram illustrating an example of another configuration of a radar transmission signal generating unit according to the first embodiment.

FIG. 5 is a block diagram illustrating an example of another configuration of the radar transmission signal generating unit 101 according to the first embodiment. The radar transmitting unit 100 may have, instead of the radar transmission signal generating unit 101, a radar transmission signal generating unit 101*a* illustrated in FIG. 5. The radar transmission signal generating unit 101*a* does not have the code generating unit 102, modulating unit 103, and the LPF 104, illustrated in FIG. 2, and instated has a code storage unit (code storage circuit) 111 and DA converting unit (DA converting circuit) 112 illustrated in FIG. 5.

The code storage unit 111 stores a code sequence generated at the code generating unit 102 illustrated in FIG. 2 beforehand, and cyclically reads out the stored code sequence in order. The DA converting unit 112 converts the code sequence (digital signals) output from the code storage unit 111 into analog baseband signals.

Configuration of Radar Receiving Unit 200

Figure 6:
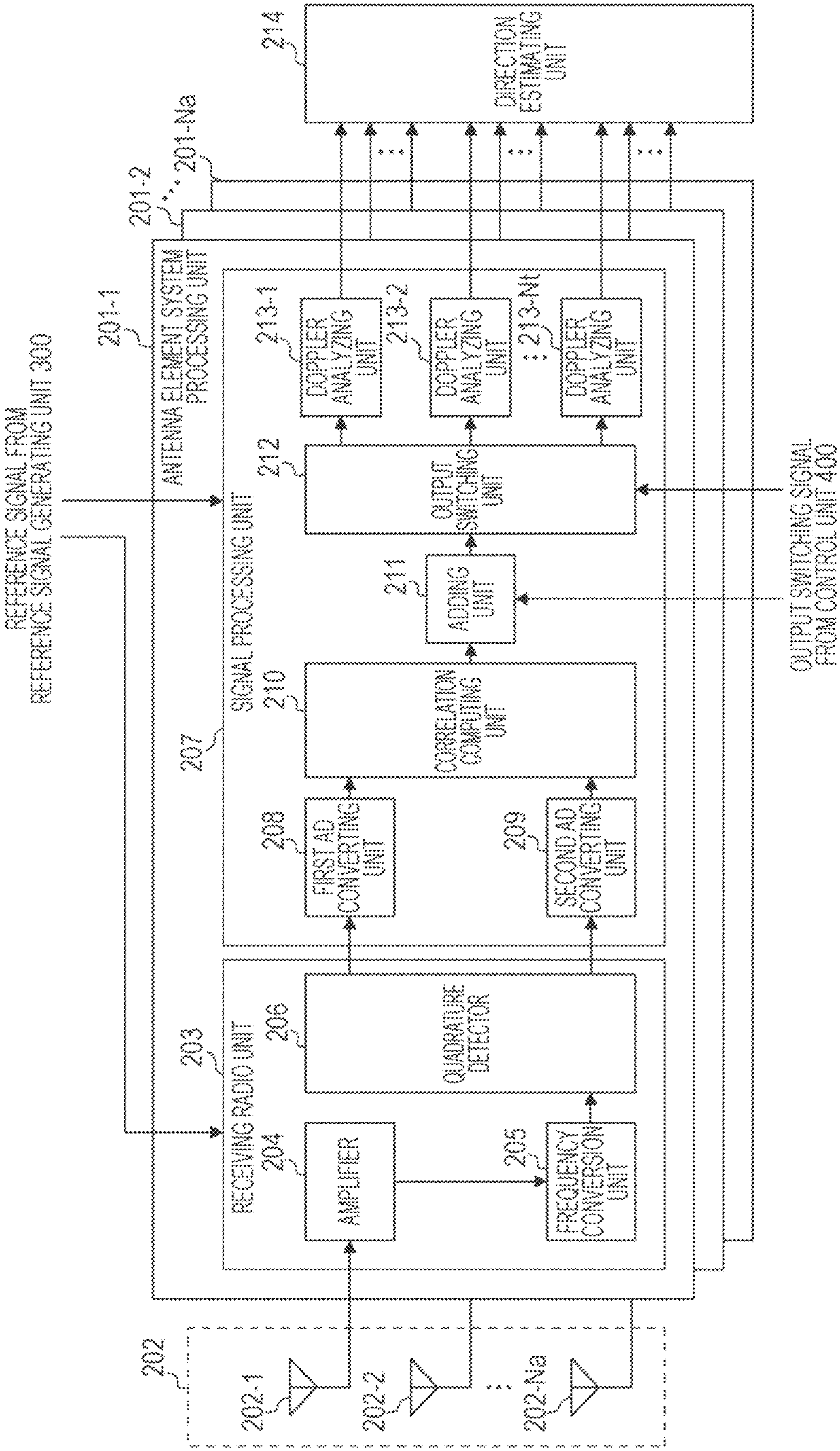
FIG. 6 is a block diagram illustrating an example of the configuration of a radar receiving unit according to the first embodiment.

FIG. 6 is a block diagram illustrating an example of the configuration of the radar receiving unit 200 according to the first embodiment. The radar receiving unit 200 has a receiving array antenna 202, an Na count of antenna element system processing units (antenna element system processing circuits) 201 (201-1 through 201-Na), and a direction estimating unit (direction estimating circuit) 214.

The receiving array antenna 202 has an Na count of receiving antenna elements #1 through #Na (202-1 through 202-Na). The Na count of receiving antenna elements 202-1 through 202-Na receive returning wave signals that are radar transmission signals that have reflected off of a reflecting object including a measurement target (object), and outputs the received returning wave signals to the respectively corresponding antenna element system processing units 201-1 through 201-Na as reception signals.

The antenna element system processing units 201 (201-1 through 201-Na) each have a receiving radio unit (receiving radio circuit) 203 and a signal processing unit (signal processing circuit) 207. The receiving radio unit 203 and signal processing unit 207 generate a timing clock (reference clock signal) where a reference signal received from the reference signal generating unit 300 is multiplied by a predetermined number, and operate based on the generated timing clock, thereby ensuring synchronism with the radar transmitting unit 100.

The receiving radio units 203 each have an amplifier (amplifying circuit) 204, a frequency converter (frequency conversion circuit) 205, a quadrature detector (quadrature detecting circuit) 206. Specifically, at the z'th receiving radio unit 203, the amplifier 204 amplifies reception signals received from the z'th receiving antenna element #z to a predetermined level, where z=1, . . . , Nr. Next, the frequency conversion unit 205 performs frequency conversion of high-frequency-band reception signals to baseband range. Thereafter, the quadrature detector 206 converts the baseband range reception signals into baseband range reception signals including I signals and Q signals.

The signal processing units 207 each have a first AD converting unit (AD converting circuit) 208, a second AD converting unit (AD converting circuit) 209, a correlation computing unit (correlation computing circuit) 210, an adding unit (adding circuit) 211, an output switching unit (output switching circuit) 212, and an Nt count of doppler analyzing units (doppler analyzing circuits) 213-1 through 213-Nt.

The first AD converting unit 208 inputs I signals from the quadrature detector 206. The first AD converting unit 208 performs discrete-time sampling of baseband signals including I signals, thereby converting the I signals into digital data.

The second AD converting unit 209 inputs Q signals from the quadrature detector 206. The second AD converting unit 209 performs discrete-time sampling of baseband signals including Q signals, thereby converting the Q signals into digital data.

Now, in the sampling by the first AD converting unit 208 and second AD converting unit 209, an Ns count of discrete samples are taken per time Tp (i.e., Tw/L) of a single sub-pulse in radar transmission signals. That is to say, the oversampling count per sub-pulse is Ns.

Figure 7:
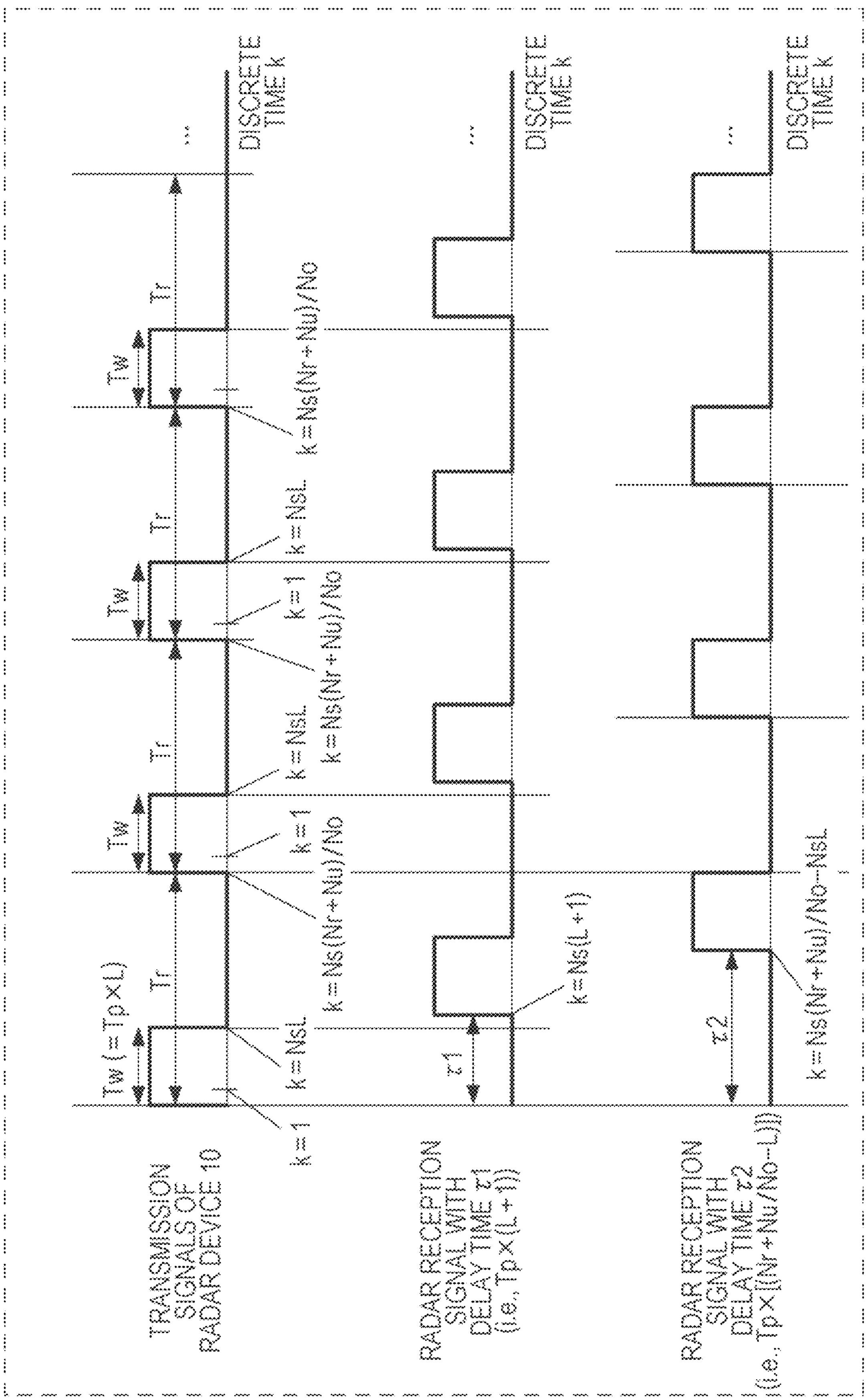
FIG. 7 is a diagram illustrating an example of transmission timing of radar transmission signals and measurement range of the radar device according to the first embodiment.

FIG. 7 illustrates an example of transmission timing of radar transmission signals and measurement range of the radar device 10 according to the first embodiment. In the following description, the baseband reception signals at discrete time k in an M'th radar transmission cycle Tr[M] as the output of the first AD converting unit 208 and second AD converting unit 209 are expressed as complex number signals $x_z(k, M)=I_z(k, M)+jQ_z(k, M)$, using I signal $I_z(k, M)$ and Q signal $Q_z(k, M)$. Also note that in the following, the discrete time k uses the timing as which the radar transmission cycle (Tr) starts as a reference (k=1), and the signal processing unit 207 cyclically performs measurement up to a sample point $k=(N_r+N_u)\ N_s/N_o$ before the radar transmission cycle Trends. That is to say, $k=1, \ldots, (N_r+N_u)\ N_s/N_o$ holds. Also, j is an imaginary unit here.

At the z'th signal processing unit 207, the correlation computing unit 210 performs correlation computation between discrete sample value $X_z(k, M)$ received from the first AD converting unit 208 and second AD converting unit 209, and pulse code $a_n(M)$ of a code length L (where z=1, . . . , Na, and n=1, . . . , L) transmitted by the radar transmitting unit 100, for each radar transmission cycle Tr.

For example, the correlation computing unit 210 performs sliding correlation computation between discrete sample value $x_z(k, M)$ and pulse code $a_n(M)$. For example, correlation computation value $AC_z(k, M)$ from sliding correlation computation of discrete time k at the M'th radar transmission cycle Tr[M] is calculated based on Expression (1)

$$AC_z(k, M) = \sum_{n=1}^{L} x_z(k + N_s(n-1), M)a_n(M)^* \tag{1}$$

where the asterisk "*" represents a complex conjugate operator.

The correlation computing unit 210 performs correlation computation over a period $k=1, \ldots, (N_r+N_u)\ N_s/N_o$, for example, in accordance with Expression (1). Note however, that the correlation computing unit 210 is not restricted to cases of performing correlation computation over a period $k=1, \ldots, (N_r+N_u)\ N_s/N_o$, and that the measurement range (I.e., the range of k) may be restricted in accordance with the range where the target that is the object of measurement by the radar device 10 is present. This restriction reduces the amount of computation processing at the correlation computing unit 210. For example, the measurement range of the correlation computing unit 210 may be restricted to $k=N_s(L+1), \ldots, (N_r+N_u)N_s/N_o-N_sL$. In this case, the radar device 10 does not perform measurement in a time slot corresponding to code transmission slot Tw, as illustrated in FIG. 7.

According to the above-described configuration, even in a case where there is direct leakage of radar transmission signals at the radar receiving unit 200, processing by the correlation computing unit 210 is not performed during the period where there is leakage of radar transmission signals (at least during a period below τ1). Accordingly, the radar device 10 is capable of measurement with the effects of leakage eliminated. Also, in a case of restricting the measurement range (range of k), processing can be applied in the same way with the measurement range (range of k) restricted with regard to the processing at the adding unit 211, output switching unit 212, doppler analyzing unit 213, and direction estimating unit 214, which will be described below. Accordingly, the amount of processing at each component can be restricted, and the power consumption of the radar receiving unit 200 can be reduced.

At the z'th signal processing unit 207, the adding unit 211 performs addition (coherent integration) processing using the correlation computation value $AC_z(k, M)$ received from the correlation computing unit 210 each discrete time k, with a period (Tr×Nb) of multiple times Nb in radar transmission cycles Tr continuously transmitted from the $N_D$'th transmitting antenna element #$N_D$ as an increment, based on output switching signals output from the control unit 400. Note that $N_D=1, \ldots, Nt$, and $z=1, \ldots, Na$ here.

The addition processing (coherent integration) spanning the period (Tr×Nb) is represented by the following Expression (2)

$$CI_z^{(N_D)}(k, m) = \sum_{g=1}^{N_b} AC_z(k, (N \times N_b)(m-1) + (N_D - 1) \times N_b + g) \tag{2}$$

where $CI_z^{(ND)}(k, m)$ represents the addition value of correlation computation values (hereinafter referred to as correlation addition value), m is an integer of 1 or greater indicating an ordinal number of the number of times of addition at the adding unit 211, and z=1, . . . , Na.

A condition in order to obtain ideal addition gain is for the phase component of correlation computation values to be aligned to a certain extent in the addition range of correlation computation values. That is to say, the number of times of addition preferably is set based on the estimated greatest velocity of movement of the target that is the object of measurement. The reason is that the greater the velocity of movement of the target is, the greater the variation of doppler frequency contained in waves reflected from the target is, and the temporal period where there is a high correlation is short, so Np (i.e., N×Nb) is a small value, and the advantages of increased gain by addition at the adding unit 211 decreases.

At the z'th signal processing unit 207, the output switching unit 212 selectively switches addition results $CI_z^{(ND)}(k, m)$ for each discrete time k, where addition has been performed in increments of multiple Nb periods (Tr×Nb) of radar transmission cycles Tr continuously transmitted from the $N_D$'th transmitting antenna element, to the $N_D$'th doppler analyzing unit 213-$N_D$ and outputs, based on output switching signals output from the control unit 400. Note that $N_D=1, \ldots, Nt$, and z=1 . . . , Na, here.

The signal processing unit 207 has doppler analyzing unit 213-1 through 213-Nt, of the same count Nt as the transmitting antenna elements #1 through #Nt. The doppler analyzing unit 213 (213-1 through 213-Nt) performs coherent integration with the timing of discrete time k aligned, with $CI_z^{(ND)}(k, N_C(w-1)+1)$ through $CI_z^{(ND)}(k, N_C \times w)$ that is the output of a count $N_C$ of adding units 211 obtained each discrete time k as an increment. For example, the doppler analyzing unit 213 performs coherent integration after having corrected phase variation $\Phi(f_s)=2\pi f_s(T_r \times N_b)\ \Delta\Phi$ in accordance with a count 2Nf of different doppler frequencies $f_s\Delta\Phi$ as shown in the following Expression (3)

$$\mathrm{FT\_CI}_z^{(N_D)}(k, f_s, w) = \sum_{q=0}^{N_c-1} CI_z^{(N_D)}(k, N_c(w-1)+q+1)\exp[-j\Phi(f_s)q] = \sum_{q=0}^{N_c-1} CI_z^{(N_D)}(k, N_c(w-1)+q+1)\exp[-j2\pi f_s T_r N_b q \Delta\Phi] \tag{3}$$

where $FT\_CI_z^{(ND)}(k, f_s, w)$ is the w'th output at the $N_D$'th doppler analyzing unit 213-No in the z'th signal processing unit 207, and indicates the results of coherent integration of doppler frequencies $f_s\Delta\Phi$ at discrete time k, with regard to the $N_D$'th output of the adding unit 211. Note that $N_D=1, \ldots, Nt$ holds, $f_s=-Nf+1, \ldots, 0, Nf$ holds, $k=1, \ldots, (Nr+Nu)\ Ns/No$ holds, w is a natural number, $\Delta\Phi$ is a phase rotation unit, j is an imaginary unit, and $z=1, \ldots, Na$ holds.

Accordingly, the signal processing unit 207 can obtain $FT\_CI_z^{(ND)}(k,-Nf+1, w), \ldots, FT\_CI_z^{(ND)}(k, Nf-1, w)$ that is the results of coherent integration in accordance with a count 2Nf of doppler frequency components every discrete time k, each period (Tr×Nb×Nc) of multiple times Nb×Nc of radar transmission cycles Tr.

In a case where $\Delta\Phi=1/N_c$, the processing at the doppler analyzing unit 213 described above is equivalent to performing discrete Fourier transform (DFT) processing of the output of the adding unit 211 at a sampling interval $T_m=(Tr\times N_p)$ and a sampling frequency $f_m=1/T_m$.

Setting Nf to be a number that is a power of 2 enables the doppler analyzing unit 213 to apply fast Fourier transform (FFT) processing, and the amount of computation processing can be reduced. Note that when Nf>Nc, performing zero padding processing where $CI_z^{(ND)}(k, Nc(w-1)+1)=0$ in the region where q>Nc holds similarly enables FFT processing to be applied, and the amount of computation processing can be reduced.

Also, the doppler analyzing unit 213 may perform processing of successively computing the multiply-add operation in Expression (3) above, instated of FFT processing. That is to say, the doppler analyzing unit 213 may generate a coefficient $\exp[-j2\pi f_s T_r N_b q\Delta\Phi]$ corresponding to $f_s=-Nf+1, \ldots, 0, Nf$, with regard to $CI_z^{(ND)}(k, Nc(w-1)+q+1)$ that is Nc outputs of the adding unit 211 obtained at each discrete time k, and successively perform multiply-add processing. Note that $q=0 \ldots, N_c-1$ here.

Note that in the following description, the w'th output $FT\_CI_z^{(1)}(k, f_s, w), \ldots, FT\_CI_z^{(Na)}(k, f_s, w)$, obtained by performing the same processing on each of the signal processing unit 207 of the first antenna element system processing unit 201-1 through the Na'th antenna element system processing unit 201-Na, will be written as a virtual receiving array correlation vector $h(k, f_s, w)$ in the following Expression (4) (or Expression (5)).

$$h(k, fs, w) = \begin{bmatrix} FT\_CI_1^{(1)}(k, f_s, w) \\ FT\_CI_1^{(2)}(k, f_s, w)\exp(-j2\pi f_s\Delta\Phi T_r N_b) \\ \vdots \\ FT\_CI_1^{(N)}(k, f_s, w)\exp(-j2\pi f_s\Delta\Phi(N-1)T_r N_b) \\ FT\_CI_2^{(1)}(k, f_s, w) \\ FT\_CI_2^{(2)}(k, f_s, w)\exp(-j2\pi f_s\Delta\Phi T_r N_b) \\ \vdots \\ FT\_CI_2^{(N)}(k, f_s, w)\exp(-j2\pi f_s\Delta\Phi(N-1)T_r N_b) \\ \vdots \\ FT\_CI_{Na}^{(1)}(k, f_s, w) \\ FT\_CI_{Na}^{(2)}(k, f_s, w)\exp(-j2\pi f_s\Delta\Phi T_r N_b) \\ \vdots \\ FT\_CI_{Na}^{(N)}(k, f_s, w)\exp(-j2\pi f_s\Delta\Phi(N-1)T_r N_b) \end{bmatrix} = \begin{bmatrix} h_1(k, fs, w) \\ h_2(k, fs, w) \\ \vdots \\ h_{Na}(k, fs, w) \end{bmatrix} \quad (4)$$

-continued $$h_Z(k, fs, w) = \begin{bmatrix} FT\_CI_z^{(1)}(k, f_s, w) \\ FT\_CI_z^{(2)}(k, f_s, w)\exp(-j2\pi f_s\Delta\Phi T_r N_b) \\ \vdots \\ FT\_CI_z^{(N)}(k, f_s, w)\exp(-j2\pi f_s\Delta\Phi(N-1)T_r N_b) \end{bmatrix} \quad (5)$$

The virtual receiving array correlation vector $h(k, f_s, w)$ includes Nt×Na elements, being the product of the count Nt of transmitting antenna elements #1 through #Nt and the count Na of receiving antenna elements #1 through #Na. This virtual receiving array correlation vector $h(k, f_s, w)$ is used in description of processing where direction estimation processing is performed based on phase difference among the receiving antenna elements #1 through #Na as to returning wave signals from the target, which will be described later. Note that $z=1, \ldots, Na$ and $N_D=1, \ldots, Nt$ here.

In the above-described Expressions (4) and (5), phase rotation for each doppler frequency ($f_s\Delta\Phi$), due to difference in transmission time from the transmitting sub-arrays, is corrected. That is to say, reception signal $FT\_CI_z^{(Na)}(k, f_s, w)$ of the doppler frequency ($f_s\Delta\Phi$) component from the $N_D$'th transmitting sub-array is multiplied by $\exp[-j2\pi f_s\Delta\Phi(N_D-1)T_r N_b]$, with the first transmitting sub-array ($N_D=1$) as a reference. This so far has been description of processing by the components of the signal processing unit 207.

The direction estimating unit 214 calculates a virtual receiving array correlation vector $h_{\_after\_cal}(k, f_s, w)$ where inter-antenna deviation has been corrected, by multiplying the virtual receiving array correlation vector $h(k, f_s, w)$ of the w'th doppler analyzing unit 213 output from the signal processing unit 207 of the first antenna element system processing unit 201-1 through the signal processing unit 207 of the Na'th antenna element system processing unit 201-Na, by an array correction value $h_{cal[b]}$ that corrects phase-shift deviation and amplitude deviation between the transmission array antenna 108 and the receiving array antenna 202, as in the following Expression (6). Note that $b=1, \ldots, (Nt\times Na)$ here.

$$h_{\_after\_cal}(k, fs, w) = CAh(k, fs, w) = \begin{bmatrix} h_1(k, fs, w) \\ h_2(k, fs, w) \\ \vdots \\ h_{Na\times Nr}(k, fs, w) \end{bmatrix} \quad (6)$$

$$CA = \begin{bmatrix} h\_cal_{[1]} & 0 & \ldots & 0 \\ 0 & h\_cal_{[2]} & \ldots & 0 \\ \vdots & \ddots & \ddots & \vdots \\ 0 & \ldots & 0 & h\_cal_{[Nt\times Na]} \end{bmatrix}$$

The virtual receiving array correlation vector $h_{\_after\_cal}(k, fs, w)$ where inter-antenna deviation has been corrected is a column vector made up of Na×Nr elements. The elements of the virtual receiving array correlation vector $h_{\_after\_cal}(k, f_s, w)$ will be written as $h_1(k, fs, w), \ldots, h_{Na\times Nr}(k, fs, w)$ and used in description of direction estimating processing below.

The direction estimating unit 214 then uses the virtual receiving array correlation vector $h_{\_after\_cal}(k, fs, w)$ to perform estimation processing of the direction of arrival of reflected wave signals, based on the phase difference of reflected wave signals among the receiving array antennas 202. The direction estimating unit 214 calculates a spatial profile with an azimuth θ in a direction estimation evaluation function value $P_H(\theta, k, fs, w)$ variable over a predetermined angular range, extracts a predetermined number of maximal peaks in the calculated spatial profile, in order from the largest, and the directions of orientation of the maximal peaks are taken as estimation values of the direction of arrival.

There are various types of the estimation evaluation function value $P_H(\theta, k, fs, w)$ depending on the direction of arrival estimation algorithm. For example, an estimation method using an array antenna that is disclosed in "Direction-of-arrival estimation using signal subspace modeling", Cadzow. J. A., Aerospace and Electronic Systems, IEEE Transactions on Volume: 28, Issue: 1 Publication Year: 1992, Page(s): 64-79, may be used.

Beamforming, for example, can be expressed as in the following Expressions (7) and (8)

$$P_H(\theta_u, k, fs, w) = \left|a_H(\theta_u)^H h_{\_after\_cal}(k, fs, w)\right|^2 \quad (7)$$

$$a_H(\theta_u) = \begin{bmatrix} 1 \\ \exp\{-j2\pi d_H \sin\theta_u/\lambda\} \\ \vdots \\ \exp\{-j2\pi(N_{VAH}-1)d_H \sin\theta_u/\lambda\} \end{bmatrix} \quad (8)$$

where the superscript H is a Hermitian transpose operator, $a_H(\theta_u)$ indicates the direction vector of the virtual receiving array as to waves arriving from an azimuth $\theta_u$, and $\theta_u$ is changed by a predetermined direction interval $\beta_1$ within the range of direction in which arrival direction estimation is performed. This $\theta_u$ is, for example, set as follows $$\theta_u = \theta\min + u\beta_1,\ u = 0, \ldots, NU$$

$$NU = \text{floor}\left[(\theta\max - \theta\min)/\beta_1\right] + 1$$

where floor (x) is a function that returns the largest integer value that does not exceed real number x. Note that techniques such as Capon, MUSIC, and so forth may be applied in the same way, instead of beamforming.

Figure 8:
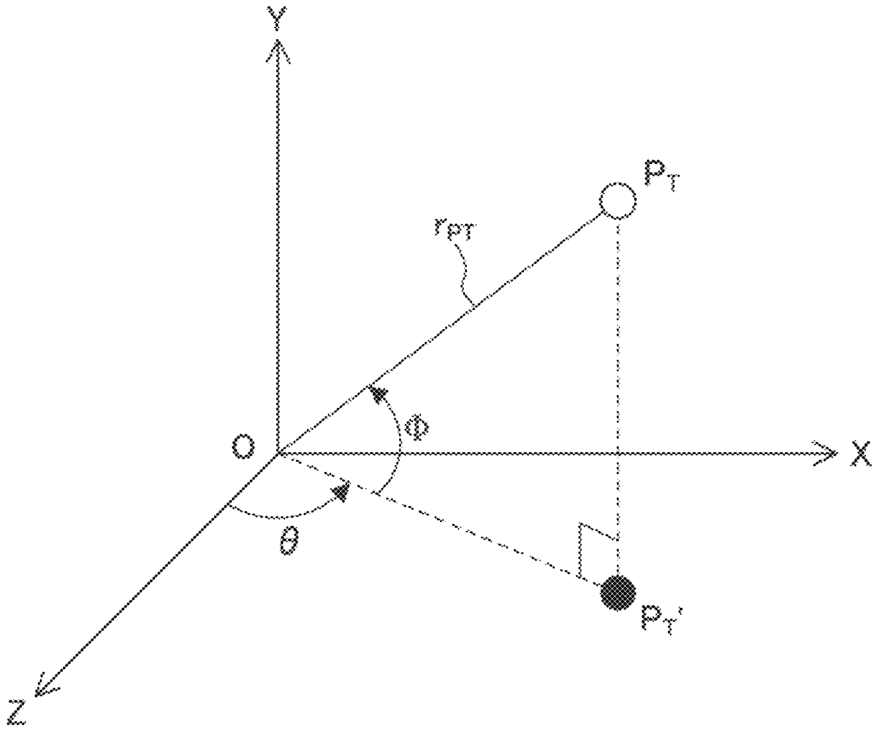
FIG. 8 is a diagram illustrating a three-dimensional coordinate system used to describe operations of a direction estimating unit according to the first embodiment.

FIG. 8 illustrates a three-dimensional coordinates system used for description of operations of the direction estimating unit 214 according to the first embodiment. Description will be made below regarding a case where estimation processing is made in two-dimensional directions, by applying the processing of the direction estimating unit 214 to the three-dimensional coordinates system illustrated in FIG. 8.

In FIG. 8, the positional vector of target $P_T$ is defined as $r_{PT}$, with the origin O as a reference. Also, a projection point where the positional vector $r_{PT}$ of the target $P_T$ is projected on the XZ plane is $P_T'$ in FIG. 8. In this case, the azimuth θ is defined as an angle formed between line O-$P_T'$ and the Z axis (θ>0 in a case where the X coordinate of target $P_T$ is positive). Elevation Φ is defined as the angle between the target $P_T$ and a line connecting the origin O and projected point $P_T'$, within a plane including the target $P_T$, the origin O, and projected point $P_T'$(Φ>0 in a case where the Y coordinate of the target $P_T$ is positive). Note that description will be made below with a case where the transmission array antenna 108 and receiving array antenna 202 are disposed within the XY plane, as one example.

The positional vector of the $n_{va}$'th antenna element in the virtual receiving array with the origin O as a reference is written as $Sn_{va}$. Note that $n_{va}$=1, . . . , Nt×Na here.

The positional vector $S_1$ of the first ($n_{va}$=1) antenna element in the virtual receiving array is decided based on the positional relation between physical position of the first receiving antenna element Rx#1 and the origin O. The positional vectors $S_2$, . . . , $Sn_{va}$, of the other antenna elements in the virtual receiving array are decided in a state where the relative layout of the virtual receiving array, decided from the inter-element spacing of the transmission array antenna 108 and receiving array antenna 202 in the XY plane, is maintained, with the positional vector $S_1$ of the first antenna element as a reference. Note that the origin O may be made to coincide with the physical position of the first receiving antenna element Rx#1.

In a case of the radar receiving unit 200 receiving reflected waves from a target $P_T$ at a far field, the phase difference $d(r_{PT}, 2, 1)$ of reception signals at the second antenna element, with reception signals at the first antenna element of the virtual receiving array as a reference, is as shown in the following Expression (9)

$$d(r_{PT}, 2, 1) = -\frac{2\pi}{\lambda}\frac{<-r_{PT}, (S_2 - S_1)>}{|r_{PT}|} = \frac{2\pi}{\lambda} < \frac{r_{PT}}{|r_{PT}|}, (S_2 - S_1) >= \frac{2\pi}{\lambda} < \frac{r_{PT}}{|r_{PT}|}, D(2, 1) > \quad (9)$$

where <x, y>is an inner product operator of vector x and vector y.

The positional vector of the second antenna element, with the positional vector of the first antenna element of the virtual receiving array as a reference, is shown in the following expression (10) as inter-element vector D(2, 1).

$$D(2, 1) = S_2 - S_1 \quad (10)$$

In the same way, in a case of the radar receiving unit 200 receiving reflected waves from a target $P_T$ at a far field, the phase difference $d(r_{PT}, n_{va}^{(t)}, n_{va}^{(r)})$ of reception signals at the $n_{va}^{(t)}$'th antenna element, with reception signals at the $n_{va}^{(r)}$'th antenna element of the virtual receiving array as a reference, is as shown in the following Expression (11)

$$d\left(r_{PT}, n_{va}^{(t)}, n_{va}^{(r)}\right) = \frac{2\pi}{\lambda} < \frac{r_{PT}}{|r_{PT}|}, D\left(n_{va}^{(t)}, n_{va}^{(r)}\right) > \quad (11)$$

where $n_{va}^{(r)}$=1, . . . , Nt×Na holds and $n_{va}^{(t)}$=1, . . . , Nt×Na holds.

The positional vector of the $n_{va}^{(t)}$'th antenna element, with the positional vector of the $n_{va}^{(r)}$'th antenna element of the virtual receiving array as a reference, is shown in the following expression (12) as inter-element vector $D(n_{va}^{(t)}, n_{va}^{(r)})$.

$$D\left(n_{va}^{(t)}, n_{va}^{(r)}\right) = S_{n_{va}^{(t)}} - S_{n_{va}^{(r)}} \quad (12)$$

The phase difference $d(r_{PT}, n_{va}^{(t)}, n_{va}^{(r)})$ of reception signals at the $n_{va}^{(1)}$'th antenna element, with reception signals at the $n_{va}^{(r)}$'th antenna element of the virtual receiving array as a reference, is dependent on unit vector ($r_{PT}/|r_{PT}|$) indicating the direction of the target $P_T$ at a far field and the inter-element vector $D(n_{va}^{(t)}, n_{va}^{(r)})$, as shown in the above-described Expressions (11) and(12).

Also, in a case where the virtual receiving array exists within the same plane, the inter-element vector $D(n_{va}^{(t)}, n_{va}^{(r)})$ exists on the same plane. The direction estimating unit

214 uses part or all of such inter-element vectors to configure a virtual plane layout array antenna assuming that antenna elements virtually exist at positions indicated by the inter-element vectors, and performs two-dimensional direction estimation processing. That is to say, the direction estimating unit 214 performs direction of arrival estimation processing using multiple virtual antennas interpolated by interpolation processing with regard to antenna elements making up the virtual receiving array.

In a case where virtual antenna elements overlap, the direction estimating unit 214 may fixedly select one of the overlapping antenna elements beforehand. Alternatively, the direction estimating unit 214 may perform averaging processing using reception signals at all overlapping virtual antenna elements.

Description will be made below regarding two-dimensional direction estimation processing using beamforming, in a case where the virtual plane layout array antenna has been configured using a $N_q$ count of inter-element vector groups. The nq'th inter-element vector making up the virtual plane layout array antenna will be written as $D(n_{va(nq)}^{(t)}, n_{va(ng)}^{(r)})$, where nq=1, . . . , Nq holds.

The direction estimating unit 214 generates the virtual plane layout array antenna correlation vector $h_{VA}(k, fs, w)$ shown in Expression (13) below, using $h_1(k, fs, w), \ldots, h_{Na \times N}(k, fs, w)$ that are elements of the virtual receiving array correlation vector $h_{\_after\_cal}(k, fs, w)$.

$$h_{VA}(k, fs, w) = CAh(k, fs, w) = \begin{bmatrix} h_{n_{va(1)}^{(t)}}(k, fs, w) h^*_{n_{va(1)}^{(r)}}(k, fs, w) \Big/ \left| h^*_{n_{va(1)}^{(r)}}(k, fs, w) \right| \\ h_{n_{va(2)}^{(t)}}(k, fs, w) h^*_{n_{va(2)}^{(r)}}(k, fs, w) \Big/ \left| h^*_{n_{va(2)}^{(r)}}(k, fs, w) \right| \\ \vdots \\ h_{n_{va(N_q)}^{(t)}}(k, fs, w) h^*_{n_{va(N_q)}^{(r)}}(k, fs, w) \Big/ \left| h^*_{n_{va(N_q)}^{(r)}}(k, fs, w) \right| \end{bmatrix} \quad (13)$$

The following Expression (14) shows a virtual plane layout array direction vector $a_{VA}(\theta u, \Phi v)$.

$$a_{VA}(\theta_u, \Phi_v) = \begin{bmatrix} \exp\left\{ j \frac{2\pi}{\lambda} < \frac{r_{PT}(\theta_u, \Phi_v)}{|r_{PT}(\theta_u, \Phi_v)|}, D\left(n_{va(1)}^{(t)}, n_{va(1)}^{(r)}\right) > \right\} \\ \exp\left\{ j \frac{2\pi}{\lambda} < \frac{r_{PT}(\theta_u, \Phi_v)}{|r_{PT}(\theta_u, \Phi_v)|}, D\left(n_{va(2)}^{(t)}, n_{va(2)}^{(r)}\right) > \right\} \\ \vdots \\ \exp\left\{ j \frac{2\pi}{\lambda} < \frac{r_{PT}(\theta_u, \Phi_v)}{|r_{PT}(\theta_u, \Phi_v)|}, D\left(n_{va(N_q)}^{(t)}, n_{va(N_q)}^{(r)}\right) > \right\} \end{bmatrix} \quad (14)$$

The relation between the unit vector $(r_{PT}/|r_{PT}|)$ indicating the direction of the target $P_T$, and the azimuth θ and the elevation Φ, in a case where the virtual receiving array is in the XY plane, is as shown in the following Expression (15).

$$\frac{r_{PT}(\theta_u, \Phi_v)}{|r_{PT}(\theta_u, \Phi_v)|} = \begin{pmatrix} \sin\theta_u \cos\Phi_v \\ \sin\Phi_v \\ \cos\theta_u \cos\Phi_v \end{pmatrix} \quad (15)$$

The direction estimating unit 214 calculates the unit vector $(r_{PT}/|r_{PT}|)$ using the above Expression (15), for the azimuth θu, the elevation Φv regarding which the two-dimensional spatial profile in the vertical direction and horizontal direction is to be calculated. Further, the direction estimating unit 214 performs two-dimensional direction estimation processing in the horizontal direction and vertical direction, using the virtual plane layout array antenna correlation vector $h_{VA}(k, fs, w)$ and virtual plane layout array direction vector $a_{VA}(\theta u, \Phi v)$.

For example, in two-dimensional direction estimation processing using beamforming, the two-dimensional spatial profile in the vertical direction and horizontal direction is calculated using an evaluation function for two-dimensional direction estimation that is shown in the following Expression (16) using the virtual plane layout array antenna correlation vector $h_{VA}(k, fs, w)$ and virtual plane layout array direction vector $a_{VA}\theta u, \Phi v)$. The azimuth and elevation exhibiting the greatest value or maximal value in the two-dimensional spatial profile is taken to be the estimation value for the direction of arrival.

$$P_{VA}(\theta_u, \Phi_v, k, fs, w) = \left| a_{VA}(\theta_u, \Phi_v)^H h_{VA}(k, fs, w) \right|^2 \quad (16)$$

Note that the direction estimating unit 214 may apply a high-resolution direction of arrival estimation algorithm such as Capon, MUSIC, or the like, using the virtual plane layout array antenna correlation vector $h_{VA}(k, fs, w)$ and virtual plane layout array direction vector $a_{VA}(\theta u, \Phi v)$, instead of beamforming. This increases the computation amount, but angular resolution can be raised.

Note that the above-described discrete time k may be output converted into distance information. The following Expression (17) can be used to convert the discrete time k into distance information R(k)

$$R(k) = k \frac{T_w C_0}{2L} \quad (17)$$

where Tw represents code transmission slot, L represents pulse code length, and $C_0$ represents the speed of light.

Further, doppler frequency information may be converted into relative speed component and output. The following Expression (18) can be used to convert the doppler frequency fsΔΦ into relative speed component $v_d(f_s)$ $$v_d(f_s) = \frac{\lambda}{2} f_s \Delta\Phi \quad (18)$$

where λ is the wavelength of the carrier frequency of RF signals output from the transmission frequency conversion unit 105.

Antenna Element Layout in Radar Device 10

The layout of the Nt transmitting antenna elements Tx#1 through #Nt of the transmission array antenna 108 and the Na receiving antenna elements Rx#1 through #Na of the receiving array antenna 202, in the radar device 10 having the above configuration, will be described. Each of the Nt transmitting antenna elements Tx#1 through #Nt and the Na receiving antenna elements Rx#1 through #Na are laid out following a certain rule in the horizontal direction and vertical direction. Note that the layouts of the transmitting antenna and receiving antenna described below are not each restricted to transmitting antennas and receiving antennas. In other words, the same virtual receiving array can be obtained even if the layout in the transmitting antenna and the layout in the receiving antenna are interchanged. Accordingly, the layout in the transmitting antenna and the layout in the receiving antenna may be interchanged. Further, the layout in the transmitting antenna and the layout in the receiving antenna may be horizontally inverted, vertically inverted, or both rotated.

Figure 9A:
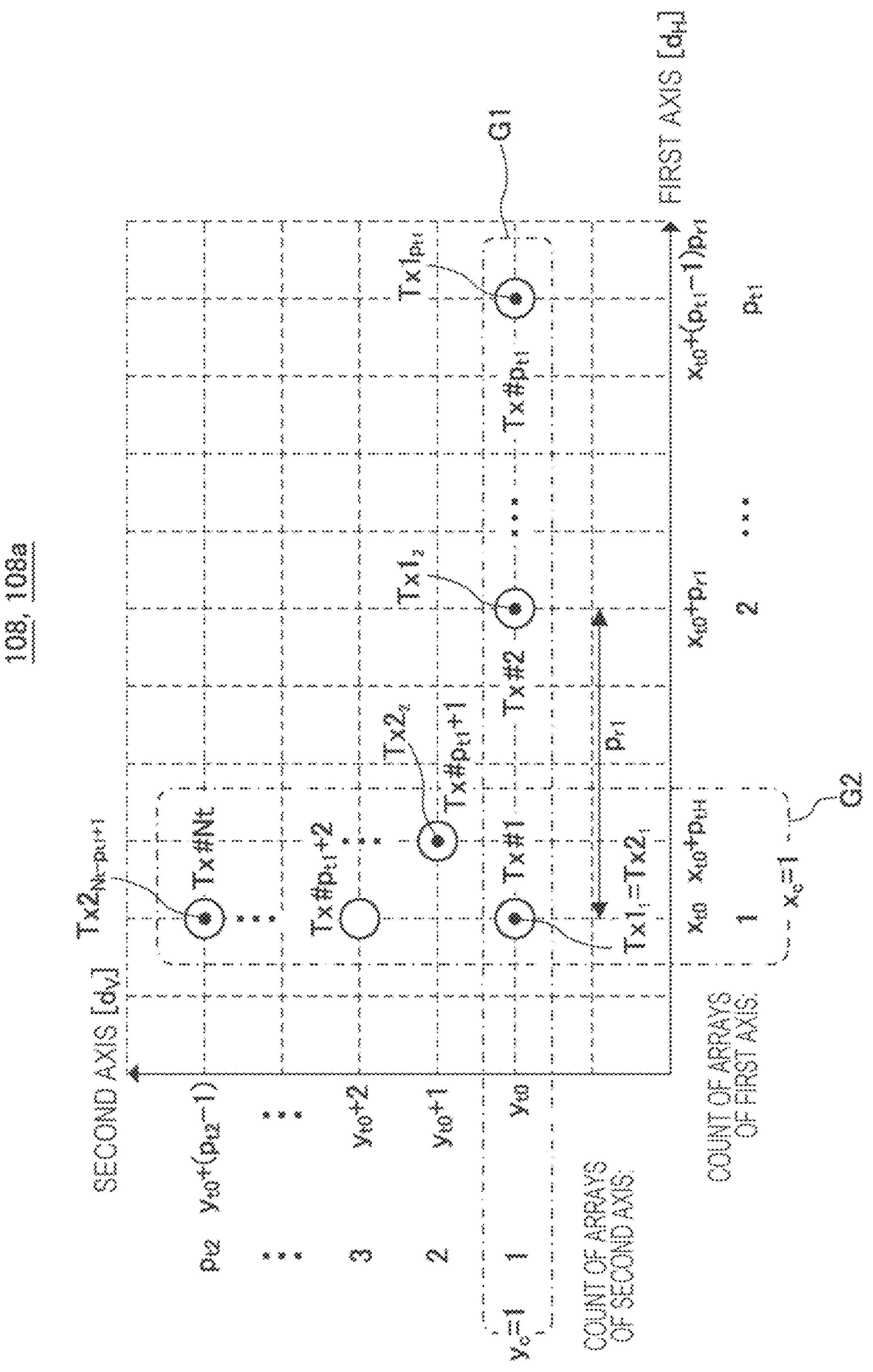
FIG. 9A is a diagram illustrating an example of a layout in a transmitting antenna according to the first embodiment.
Figure 9B:
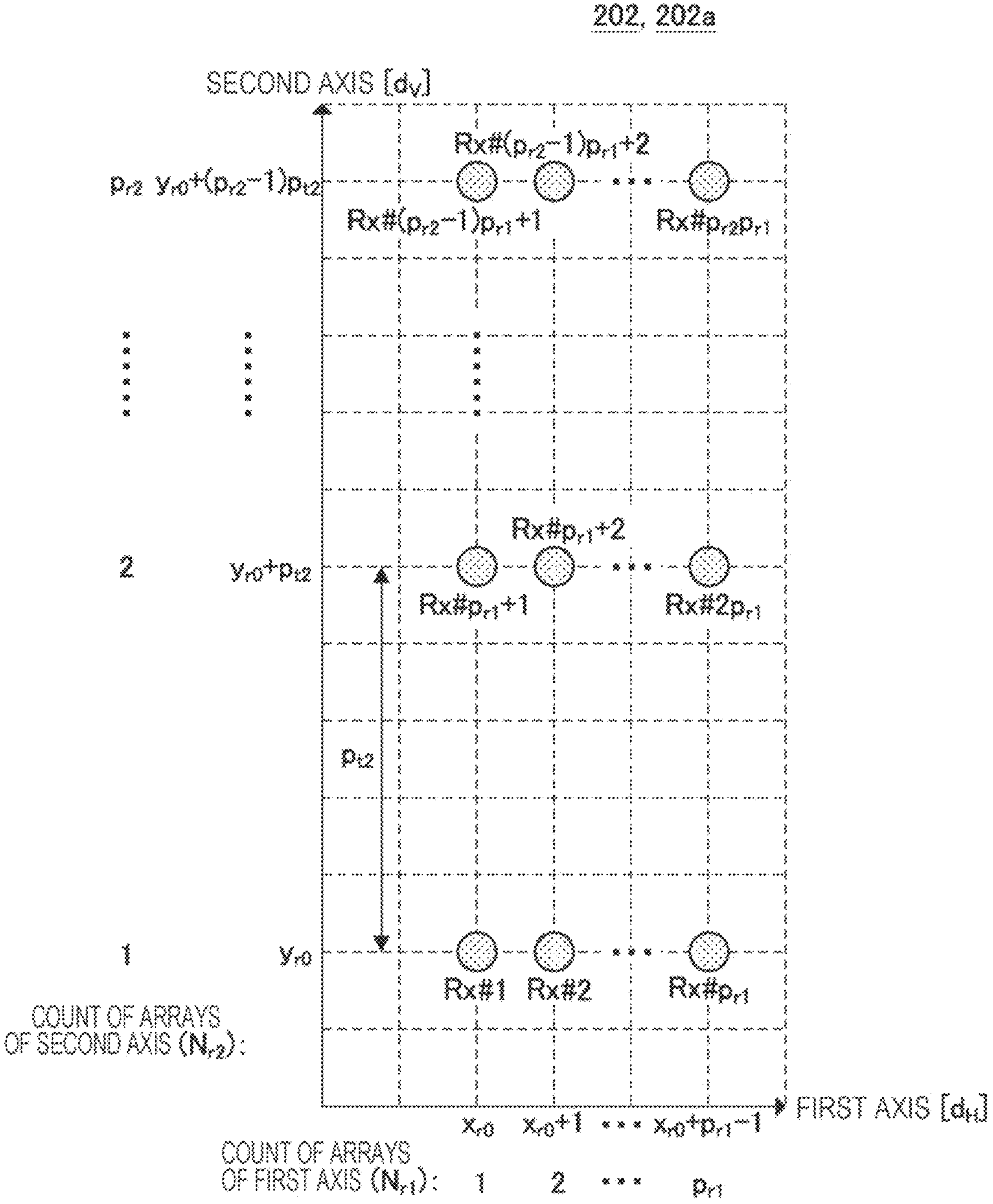
FIG. 9B is a diagram illustrating an example of a layout in a receiving antenna according to the first embodiment.
Figure 9C:
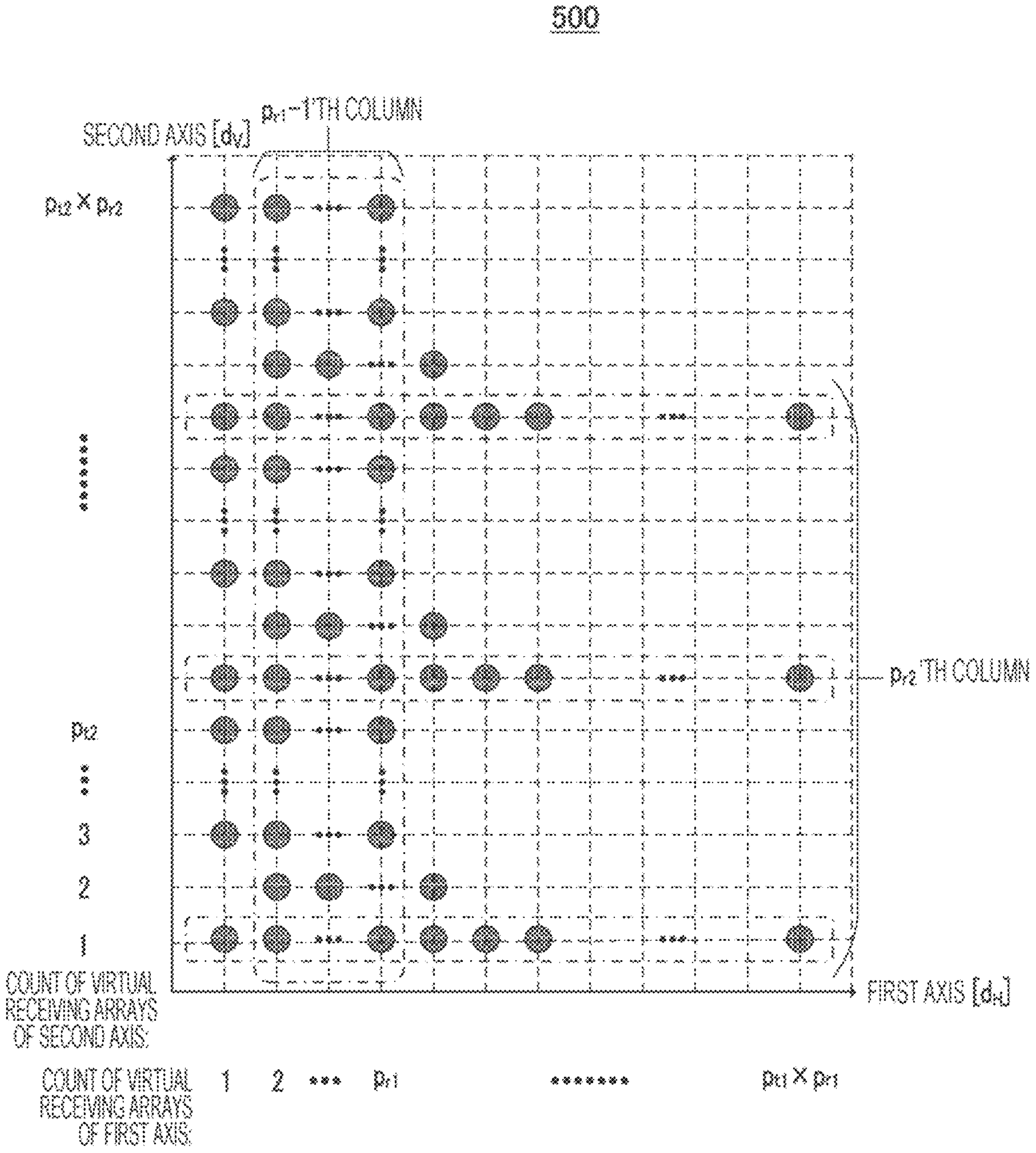
FIG. 9C is a diagram illustrating an example of a layout in a virtual receiving antenna according to the first embodiment.

FIGS. 9A and 9B are diagrams illustrating a layout of in a transmitting antenna and the layout in a receiving antennas according to the first embodiment. FIG. 9C is a diagram illustrating an example of a layout in a virtual receiving antenna according to the first embodiment. The coordinates in FIGS. 9A through 9C indicate the phase centers of the antenna elements.

A first spacing $d_H$ is a basic unit of the first axis, and a second spacing $d_V$ is a basic unit of the second axis. Antenna elements are laid out at coordinate positions indicated by an integer multiple of the basic units. In one example, the spacing $d_H$ on the first axis and second spacing $d_V$ on the second axis are each 0.3 wavelengths or longer but 2 wavelengths or shorter, or are around one-half wavelength, or are equal to one-half wavelength, for example. Note that the first axis and the second axis may be on the XT plane illustrated in FIG. 8, and may be situated so as to be orthogonal to each other.

The transmitting antenna elements Tx#1 through #Nt illustrated in FIG. 9A include a first antenna group G1 and a second antenna group G2. The first antenna group G1 includes a count $p_{t1}$ of antenna elements (at least one first antenna element). The second antenna group G2 includes a count $p_{t2}$ of antenna elements (multiple second antenna elements).

In the first antenna group G1, the coordinates of the phase center of i'th antenna elements, indicated by circles in FIG. 9A, are represented by $Tx\mathbf{1}_i$. $Tx\mathbf{1}_i$ is as shown in the following Expression (19)

$$Tx1_i = \{x_{t0} + (i-1)p_{r1},\ y_{t0} + y_c - 1\} \tag{19}$$

where i is an integer from 1 through $p_{t1}$. It can be seen from Expression (19) that antenna elements of the first antenna group G1 are laid out at $p_{r1}$ spacings.

In the second antenna group G2, the coordinates of the phase center of j'th antenna elements, indicated by circles in FIG. 9A, are represented by $Tx\mathbf{2}_j$. $Tx\mathbf{2}_j$ is as shown in the following Expression (20)

$$Tx2_j = \{x_{t0} + (x_c - 1)p_{r1} + p_{tH},\ y_{t0} + j - 1\} \tag{20}$$

$$p_{tH} = \begin{cases} x_s & (|y_c - j| = \text{odd}) \\ 0 & (|y_c - j| = \text{even}) \end{cases}$$

where j is an integer from 1 through $p_{t2}$. It can be seen from Expression (20) that antenna elements of the second antenna group G2 are laid out in a zigzag form in the second axis direction by being shifted by $p_{tH}$ in the first axis direction.

Now, $x_c$ and $y_c$ are values indicating the Nos. of antenna elements that the first antenna group G1 and second antenna group G2 share, which will be described in detail later. For example, in FIG. 9A, the first antenna element of the first antenna group G1 and the first antenna element of the second antenna group G2 is shared, so $x_c=1$ and $y_c=1$ hold.

The second antenna group G2 is laid out shifted by $x_s$ in the first axis direction, every two spacings in the second axis direction. The antenna elements are not concentrated in the second axis direction, and accordingly can be formed into sub-arrays and the aperture length broadened insofar as there is no physical interference with adjacent antenna elements. Thus, high gain can be obtained for antenna gain.

It can be seen from the above Expressions (19) and (20) that $x_c$ and $y_c$ represent the positional relation of the antenna elements that the first antenna group G1 and second antenna group G2 share. Specifically, the following Expression (21) is found from the above Expressions (19) and (20)

$$Tx1_{xc} = \{x_{t0} + (x_c - 1)p_{r1} + p_{tH},\ y_{t0} + y_c - 1\} = Tx2_{yc} \tag{21}$$

where the $x_c$'th antenna element of the first antenna group G1 and the $y_c$'th antenna element of the second antenna group G2 of the transmitting antenna elements Tx#1 through #Nt are shared antenna elements, and $Tx\mathbf{1}_{xc}=Tx\mathbf{2}_{yc}$ holds. That is to say, the first antenna group G1 and the second antenna group G2 intersect, in such a way that the $x_c$'th antenna element of the first antenna group G1 ($x_c=1$ in FIG. 9A) and the $y_c$'th antenna element of the second antenna group G2 ($y_c=1$ in FIG. 9A) are shared. Accordingly, the relation of $Nt=P_{t1}+p_{t2}-1$ holds between the sum Nt of transmitting antenna elements Tx#1 through #Nt and $p_{t1}$ and $p_{t2}$.

The Tx#1 in FIG. 9A will be described as one example. For coordinate $Tx\mathbf{1}_{i=1}$ at the phase center of the first antenna element in the first antenna group G1, the following Expression (19-1) is obtained by substituting $y_c=1$ and i=1 into the above Expression (19).

$$Tx1_1 = \{x_{t0} + (1-1)p_{r1},\ y_{t0} + 1 - 1\} = \{x_{t0},\ y_{t0}\} \tag{19-1}$$

Next, for coordinate $Tx\mathbf{2}_{j=1}$ at the phase center of the first antenna element in the second antenna group G2, the following Expression (20-1) is obtained by substituting $x_c=1$, $y_c=1$ and j=1 into the above Expression (20).

$$Tx2_1 = \{x_{t0} + (1-1)p_{r1} + 0,\ y_{t0} + 1 - 1\} = \{x_{t0},\ y_{t0}\} \tag{20-1}$$

$$p_{tH} = 0(|1-1| = 0 = \text{even})$$

Accordingly, the coordinate $Tx\mathbf{1}_{i=1}$ at the phase center of the first antenna element in the first antenna group G1 and the coordinate $Tx\mathbf{2}_{j=1}$ at the phase center of the first antenna element in the second antenna group G2 are equal to the coordinate at the phase center of the transmitting antenna element Tx#1.

In the same way, for coordinate $Tx\mathbf{2}_{j=2}$ at the phase center of the second antenna element in the second antenna group G2, the following Expression (20-2) can be expressed by substituting $x_c=1$, $y_c=1$ and j=2 into the above Expression (20).

$$Tx2_2 = \{x_{t0} + (1-1)p_{r1} + x_s,\ y_{t0} + 2 - 1\} = \{x_{t0} + x_s,\ y_{t0} + 1\} \tag{20-2}$$

$$p_{tH} = x_s(|1-2| = 1 = \text{odd})$$

Now, in a case where the shift amount $x_s$ of the second antenna group G2 in the first axis direction is 1, this can be expressed as in the following Expression (20-3).

$$Tx2_2 = \{x_{t0} + 1, y_{t0} + 1\} \quad (20\text{-}3)$$

When the coordinate at the phase center of the i'th antenna element in the j'th row of the receiving antenna elements Rx#1 through #Na (multiple third antenna elements) is written as $Rx1_{ij}$, $Rx1_{ij}$ can be expressed by the following Expression (22)

$$Rx1_{ij} = \{x_{r0} + (i-1), y_{r0} + (j-1)p_{t2}\} \quad (22)$$

where i is integers from 1 through $p_{r1}$, and j is integers from 1 through $p_{r2}$. The relation of $Na = p_{r1} \times p_{r2}$ holds between the sum Na of receiving antenna elements #1 through #Na and $p_{r1}$ and $p_{r2}$.

Constants in the above expressions (19) through (22) are as follows: $(x_{t0}, y_{t0})$ represents the coordinates of origin of the transmitting antenna element group, $(x_{r0}, y_{r0})$ the coordinates of origin of the receiving antenna group, $p_{t1}$ the count of transmitting antennas laid out in the first axis direction ($p_{t1} \geq 1$), $p_{t2}$ the count of transmitting antennas laid out in the second axis direction ($p_{t2} > 1$), $p_{r1}$ the count of receiving antennas laid out in the first axis direction (first number of columns) ($p_{r1} \geq 1$), $p_{r2}$ the count of receiving antennas laid out in the second axis direction ($p_{r2} > 1$), $x_c$ the repeating point of the second antenna group G2 of transmitting antennas (position of shared antenna element in the first axis direction) ($1 \leq x_c \leq p_{t1}$), $y_c$ the repeating point of the first antenna group G1 of transmitting antennas ($1 \leq y_c \leq p_{t2}$), and $x_s$ the shift amount of the second antenna group G2 of transmitting antennas in the first axis direction ($1 \leq x_s \leq p_{t1}$), and all are integers. Note that $p_{r1}$ is equal to the inter-element antenna spacing in the first antenna group G1 of transmitting antennas.

The virtual receiving array formed by the transmitting and receiving antenna illustrated in FIGS. 9A and 9B is configured as illustrated in FIG. 9C. There is a total count of Nt×Na virtual antenna elements in the virtual receiving array. There are $p_{r2}$ columns equidistantly arrayed in the second axis direction, of virtual receiving arrays where $p_{t1} \times p_{r1}$ virtual antenna elements are continuously laid out in the first axis direction.

In the antenna layout according to the first embodiment illustrated in FIG. 9A, antenna elements Tx#1 and Tx#$p_{t1}$+1 through Tx#Nt of the second antenna group G2 of the transmission array antenna 108*a* are arrayed in a zigzag form so that there are two first axis coordinates of the phase centers, which are $x_{t0}$ and $x_{t0}+p_{tH}$. The phase centers of the antenna elements Tx#1 and Tx#$p_{t1}$+1 through Tx#Nt of the second antenna group G2 are not equidistantly laid out at the second spacing $d_V$. However, the phase centers of the virtual antenna elements can be equidistantly laid out at the second spacing $d_V$ in the virtual receiving array. Accordingly, the beam width formed by the virtual receiving array, i.e., the resolution, is dependent on the maximum aperture length of the virtual receiving array in the first axis direction and the second axis direction.

First Variation of First Embodiment

Figure 10A:
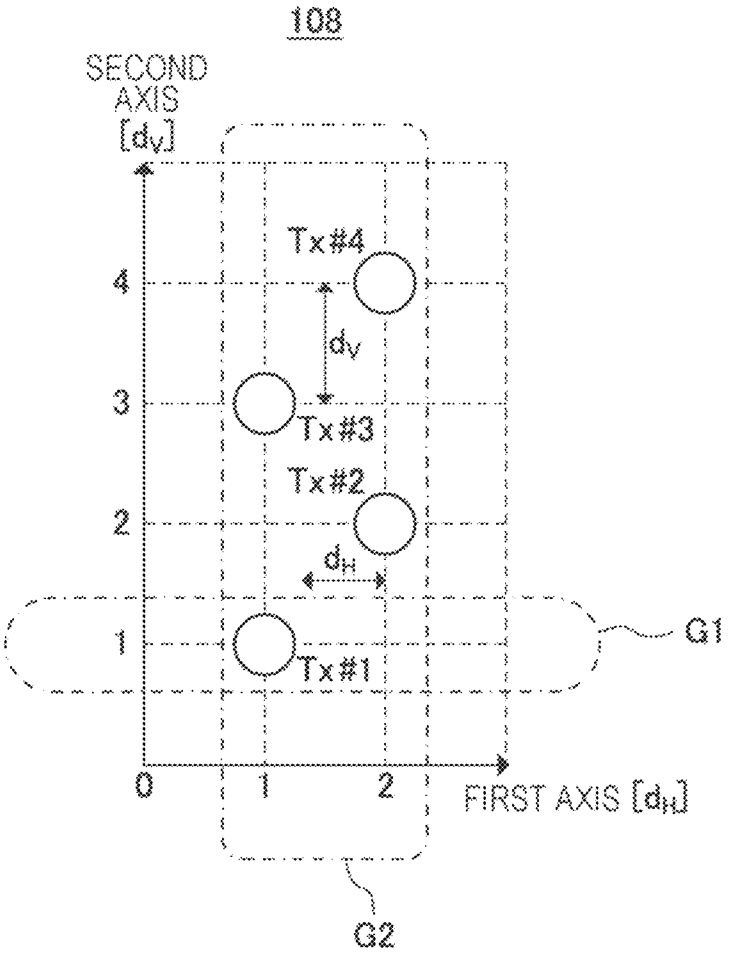
FIG. 10A is a diagram illustrating an example of a layout in a transmitting antenna according to a first variation of the first embodiment.
Figure 10B:
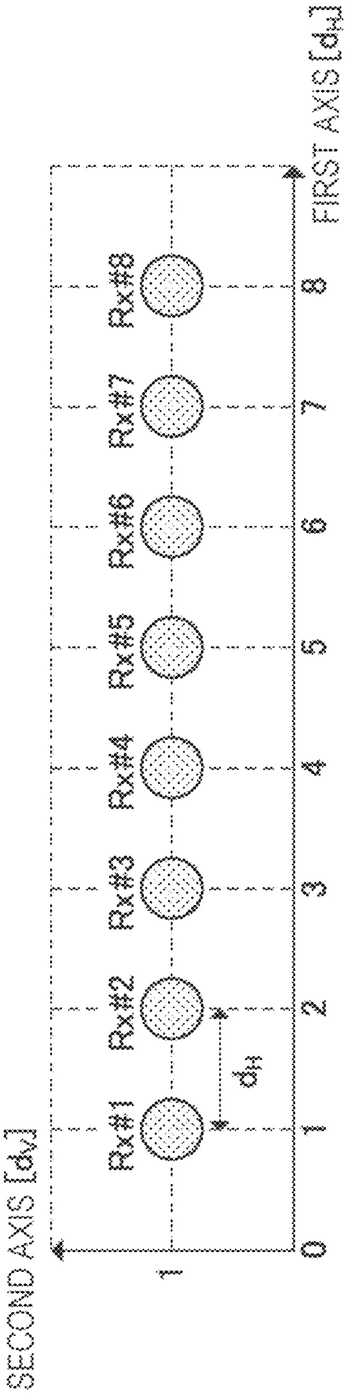
FIG. 10B is a diagram illustrating an example of a layout in a receiving antenna according to the first variation of the first embodiment.
Figure 10C:
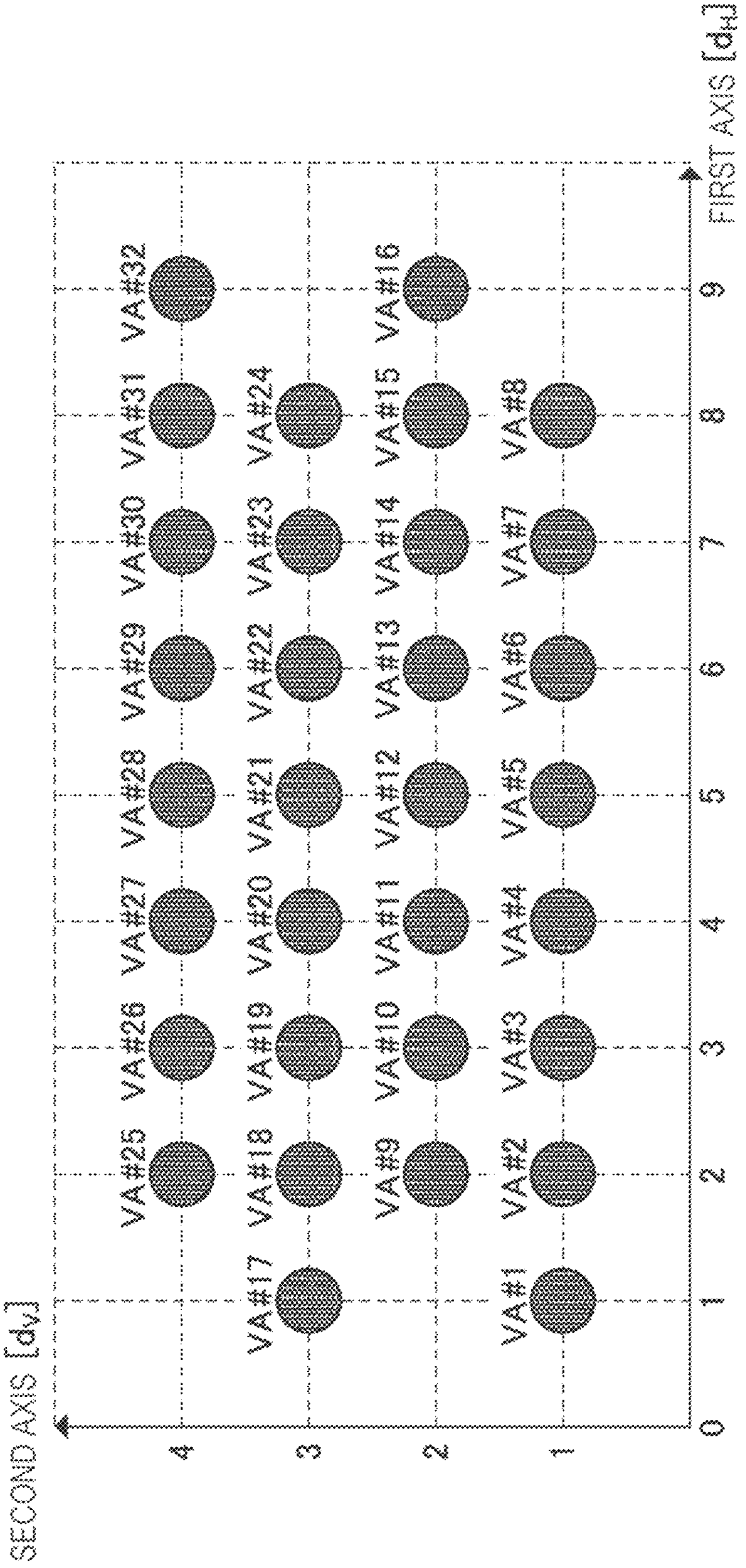
FIG. 10C is a diagram illustrating an example of a layout in a virtual receiving antenna according to the first variation of the first embodiment.

FIG. 10A illustrates an example of the layout of transmitting antenna elements Tx#1 through #Nt according to a first variation of the first embodiment. FIG. 10B illustrates an example of the layout of receiving antenna elements Rx#1 through #Na according to the first variation of the first embodiment. FIG. 10C illustrates an example of a layout of a virtual receiving antenna according to the first variation of the first embodiment.

In the example illustrated in FIGS. 10A and 10B, constants in the above expressions (19) through (22) are as follows: $(x_{t0}, y_{t0})=(1, 1)$, $(X_{r0}, Y_{r0})=(1, 1)$, $p_{t1}=1$, $p_{t2}=4$, $p_{r1}=8$, $p_{r2}=1$, $x_c=1$, $y_c=1$, and $x_s=1$. The first axis and the second axis are orthogonal to each other.

In FIG. 10A, the sum Nt of transmitting antenna elements #1 through #Nt is four, with the transmitting antenna elements being respectively represented by Tx#1 through Tx#4. The first antenna group G1 includes Tx#1 (at least one first antenna element). The second antenna group G2 includes Tx#through Tx#4 (multiple second antenna elements). In FIG. 10B, the sum Na of receiving antenna elements #1 through #Na (multiple third antenna elements) is eight, with the receiving antenna elements being respectively represented by Rx#1 through Rx#8. Features of the antenna element layouts illustrated in FIGS. 10A and 10B will be described below.

1. Aperture Length of Antenna Elements

Figure 11:
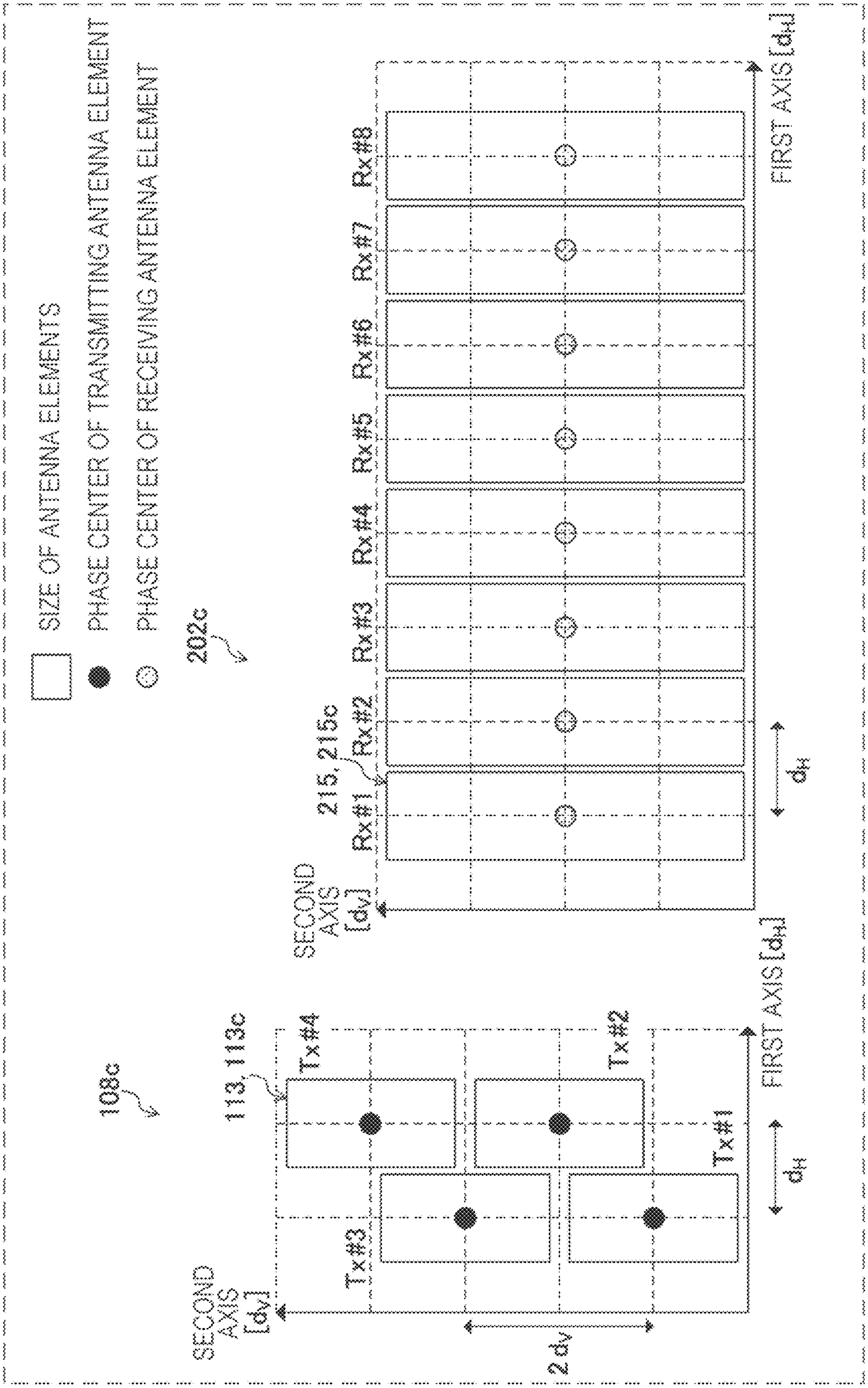
FIG. 11 is a diagram illustrating an example of the size of antenna elements according to the first variation of the first embodiment.

FIG. 11 illustrates an example of the size of antenna elements according to the first variation of the first embodiment. In a case of antenna elements laid out as illustrated in FIGS. 10A and 10B, the size of the antenna elements can be stipulated as illustrated in FIG. 11, for example. The sizes 113*c* and 215*c* of antenna elements are sizes where there is no interference among adjacent antenna elements.

The antenna elements of the transmission array antenna 108*c* are laid out in a zigzag form in the second axis direction, so the aperture length is formed to be de or less in the first axis direction and 2×$d_V$ or less in the second axis direction, as illustrated in FIG. 11. The antenna elements of the receiving array antenna 202*c* are linearly laid out in the first axis direction, so the aperture length is formed to be de or less in the first axis direction, while there are no adjacent antenna elements in the second axis direction and thus can be formed at an optional aperture length (4×$d_V$ in the example illustrated in FIG. 11).

In a case where the antenna elements of the transmission array antenna 108*c* are laid out linearly at equidistant spacings of the respective basic spacings $d_H$ and $d_V$ in the first axis direction and second axis direction, the size of the antenna elements of the transmitting array antenna is $d_V$ in the second axis direction. In comparison with this, the transmission array antenna 108*c* is laid out in two columns (zigzag form) in the second axis direction, and the receiving array antenna 202*c* is laid out in one row (linearly) in the first axis direction, as illustrated in FIG. 11, for example, according to the configuration of the present disclosure. According to this configuration, the size 113*c* of the antenna elements of the transmission array antenna 108*c* can be increased to $2d_V$ in the second axis direction, and the size 215*c* of the antenna elements of the receiving array antenna 202*c* can be increased to $4d_V$ in the second axis direction. The configuration according to the present disclosure can yield high antenna gain by the increase in size of antenna elements.

Note that the antenna elements may be configured using sub-array antenna elements, and an array weight may be applied to the sub-array antenna to suppress sidelobes.

2. Beam Pattern Formed by Virtual Receiving Array

Figure 12A:
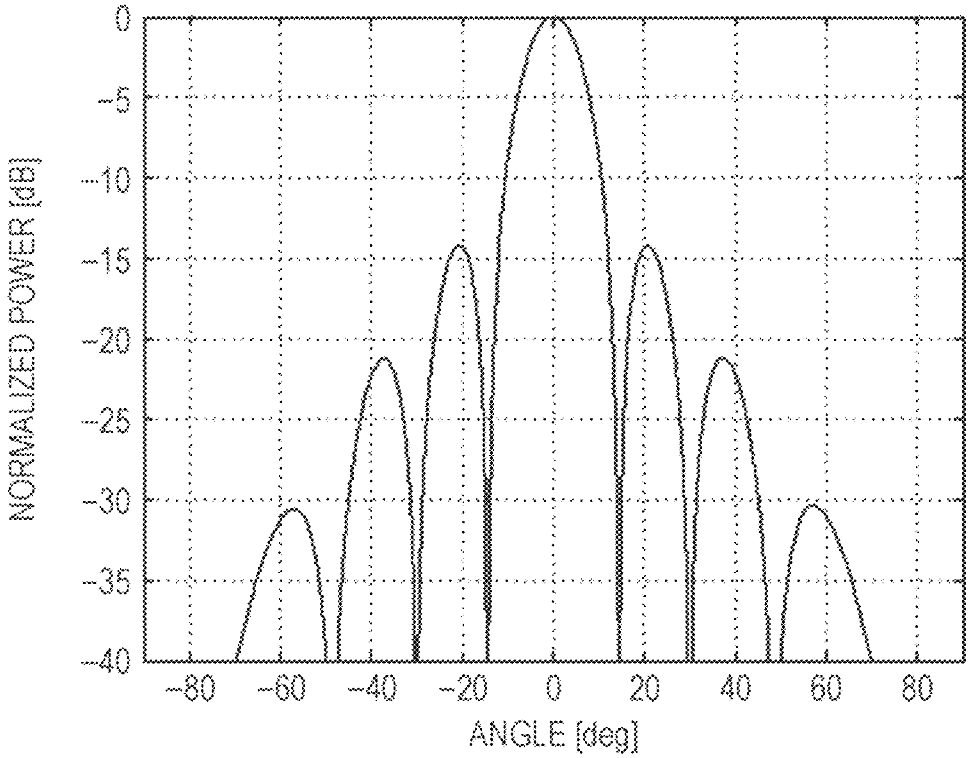
FIG. 12A is a diagram illustrating an example of a cross-sectional view of a directionality pattern of a two-dimensional beam by the virtual receiving array according to the first variation of the first embodiment, taken along a first axis direction.
Figure 12B:
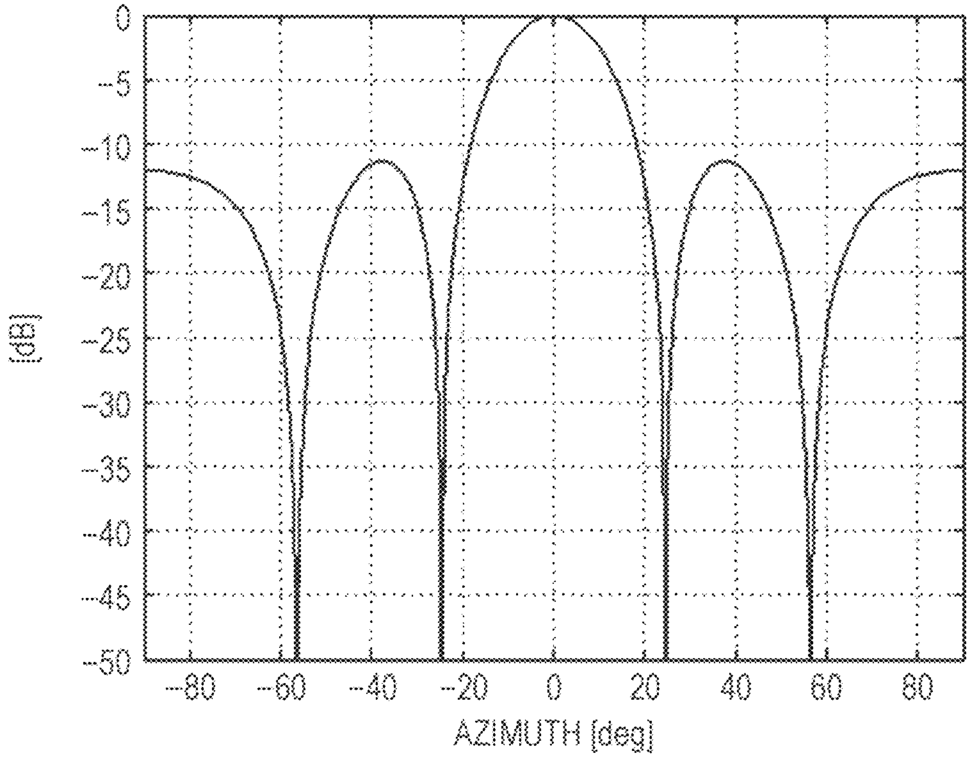
FIG. 12B is a diagram illustrating an example of a cross-sectional view of a directionality pattern of a two-dimensional beam by the virtual receiving antenna according to the first variation of the first embodiment, taken along a second axis direction.

FIG. 12A illustrates an example of a cross-sectional view of a directionality pattern of a two-dimensional beam by the virtual receiving array according to the first variation of the first embodiment, taken along the first axis direction. FIG. 12B illustrates an example of a cross-sectional view of a directionality pattern of a two-dimensional beam by the virtual receiving array according to the first variation of the first embodiment, taken along the second axis direction.

Specifically, FIG. 12A illustrates a cross-sectional view taken along the first axis direction at zero degrees to the second axis direction, in a two-dimensional beam pattern formed by beamforming using the virtual receiving arrays illustrated in FIG. 10C. FIG. 12B illustrates a cross-sectional view taken along the second axis direction at zero degrees to the first axis direction, in the same beam pattern. A case where $d_H$=0.5 wavelengths and $d_v$=0.6 wavelengths is illustrated in FIGS. 12A and 12B. Virtual antenna elements of the virtual receiving array are laid out at equidistant spaces with an aperture length in the first axis direction of $8\times d_H$ and an aperture length in the second axis direction of $3\times d_v$, as illustrated in FIG. 10C. Accordingly, a beam where grating does not occur can be formed, as illustrated in FIGS. 12A and 12B.

Comparative Example

Figure 13:
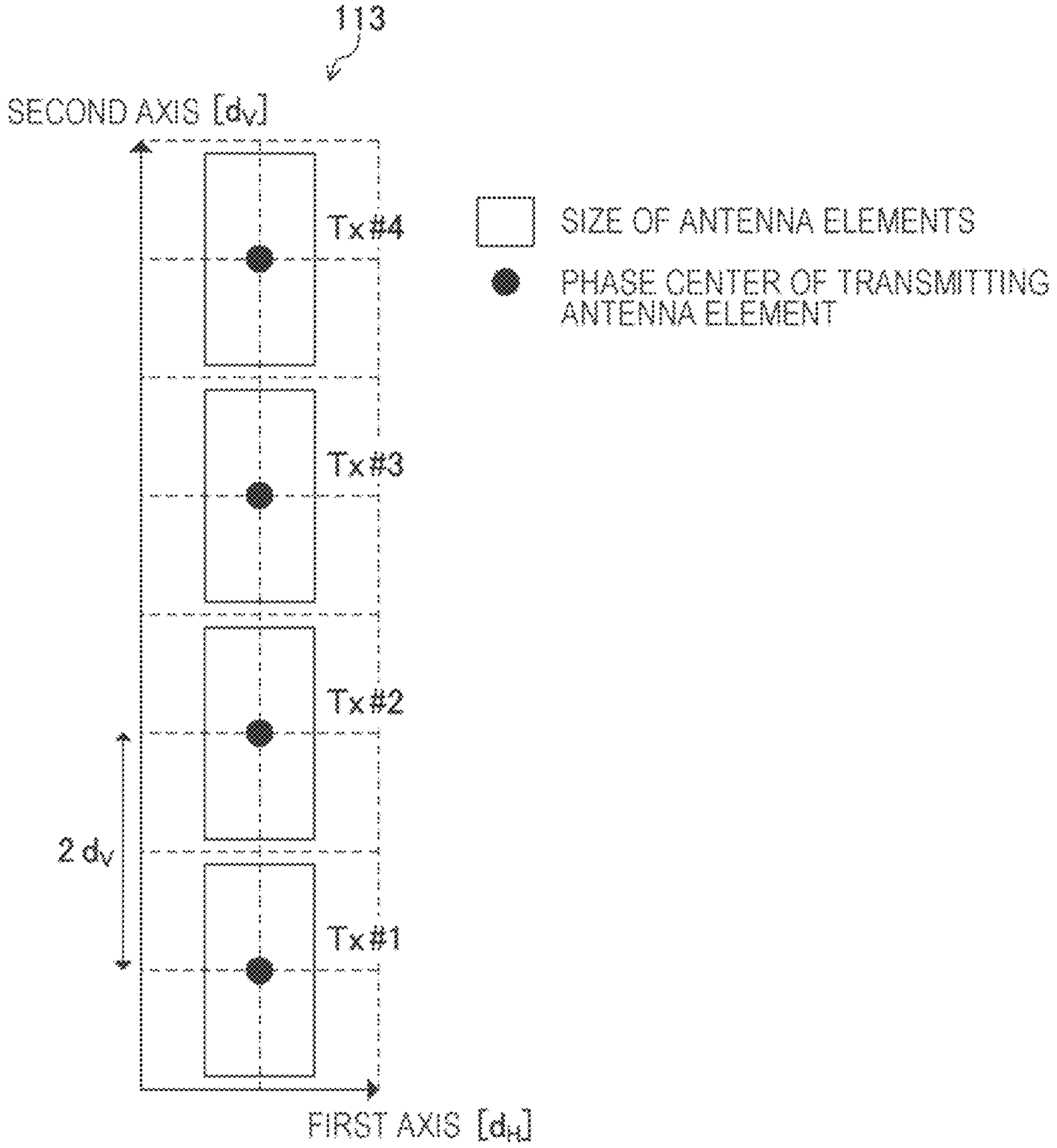
FIG. 13 is a diagram illustrating an example of a layout in a transmitting antenna according to a comparative example.
Figure 14:
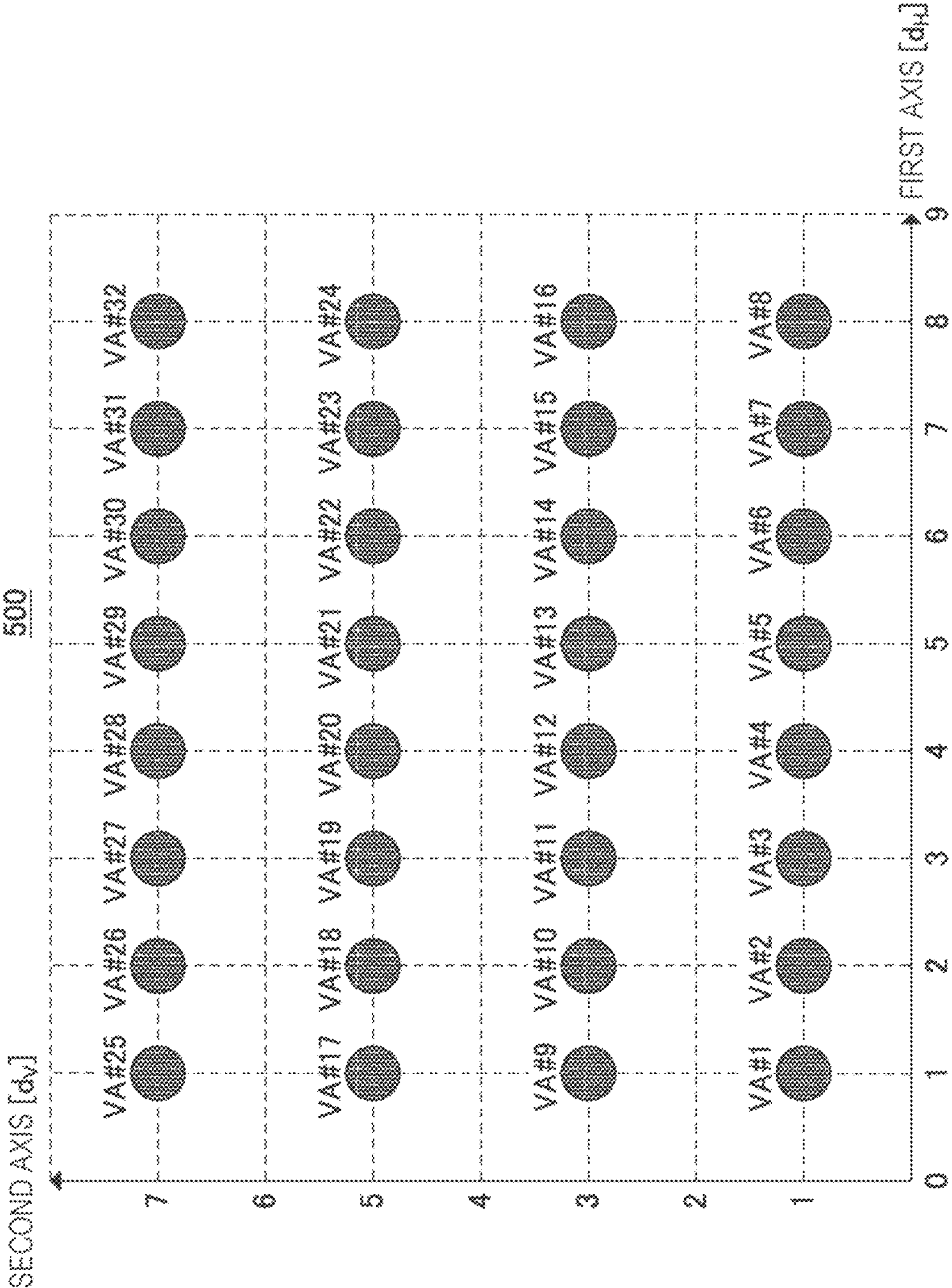
FIG. 14 is a diagram illustrating an example of a layout in a virtual receiving antenna according to the comparative example.
Figure 15:
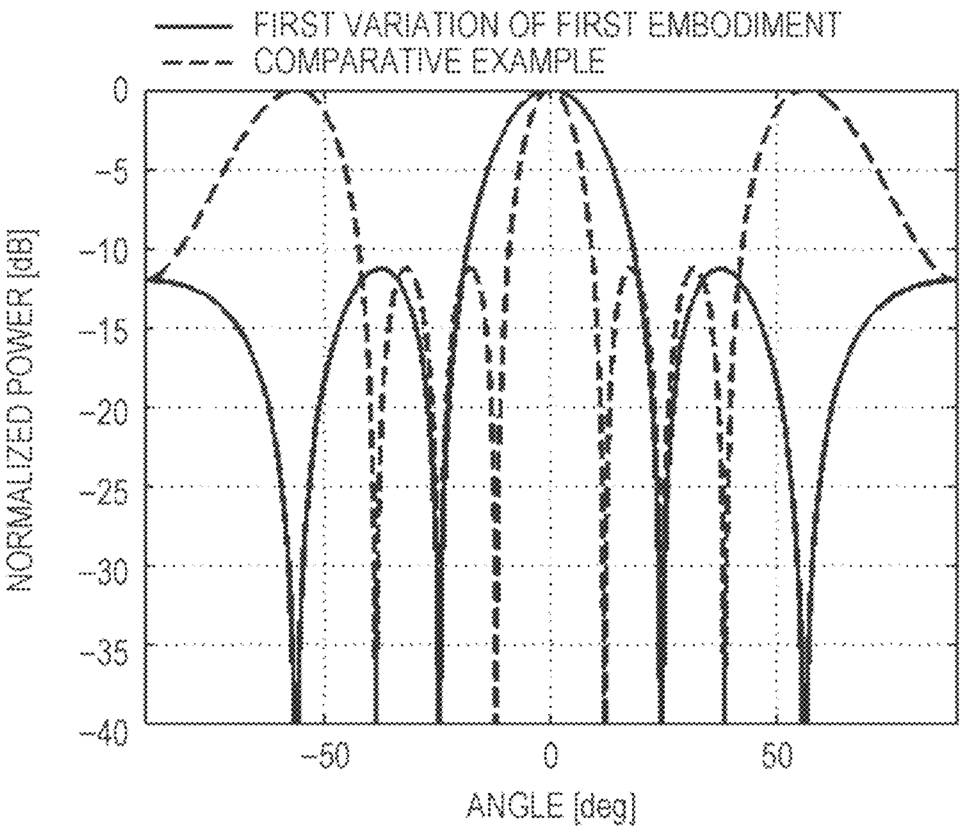
FIG. 15 is a diagram illustrating an example of a cross-sectional view of a directionality pattern by a virtual receiving array according to the comparative example, taken along the second axis direction.

A case where four transmitting antenna elements are arrayed in the second axis direction will be described as a comparative example, for comparison with the first variation of the first embodiment. FIG. 13 illustrates an example of a layout of transmitting antenna elements according to the comparative example. FIG. 14 illustrates an example of a layout of virtual antenna elements according to the comparative example. FIG. 15 illustrates an example of a cross-sectional view of a directionality pattern by a virtual receiving array according to the comparative example, taken along the second direction.

For example, in a case where the size of antenna elements of a transmitting antenna is increased, the transmission antenna is laid out with spacings of $2\times d_V$ or more in the second axis direction, so that adjacent antenna elements do not interfere. In a case where the receiving antenna us laid out as illustrated in FIG. 10B, the virtual receiving array has the layout illustrated in FIG. 14. As a result, the virtual receiving array is also laid out with spacings of $2\times d_V$ or more in the second axis direction, and accordingly is sparse as compared to the arrangement in FIG. 10C. Note that the virtual receiving arrays are laid out with spacings of 1 $d_V$ in the second axis direction in FIG. 10C. The beam received by the virtual receiving array illustrated in FIG. 14 includes grating lobes as indicated by the dotted lines in FIG. 15, and the probability of erroneous detection is higher.

Second Variation of First Embodiment

In a second variation of the first embodiment, an antenna layout where higher resolution can be obtained by the same number of elements in the virtual receiving array as the first variation, and a direction of arrival estimation method using the same, will be described.

Figure 16A:
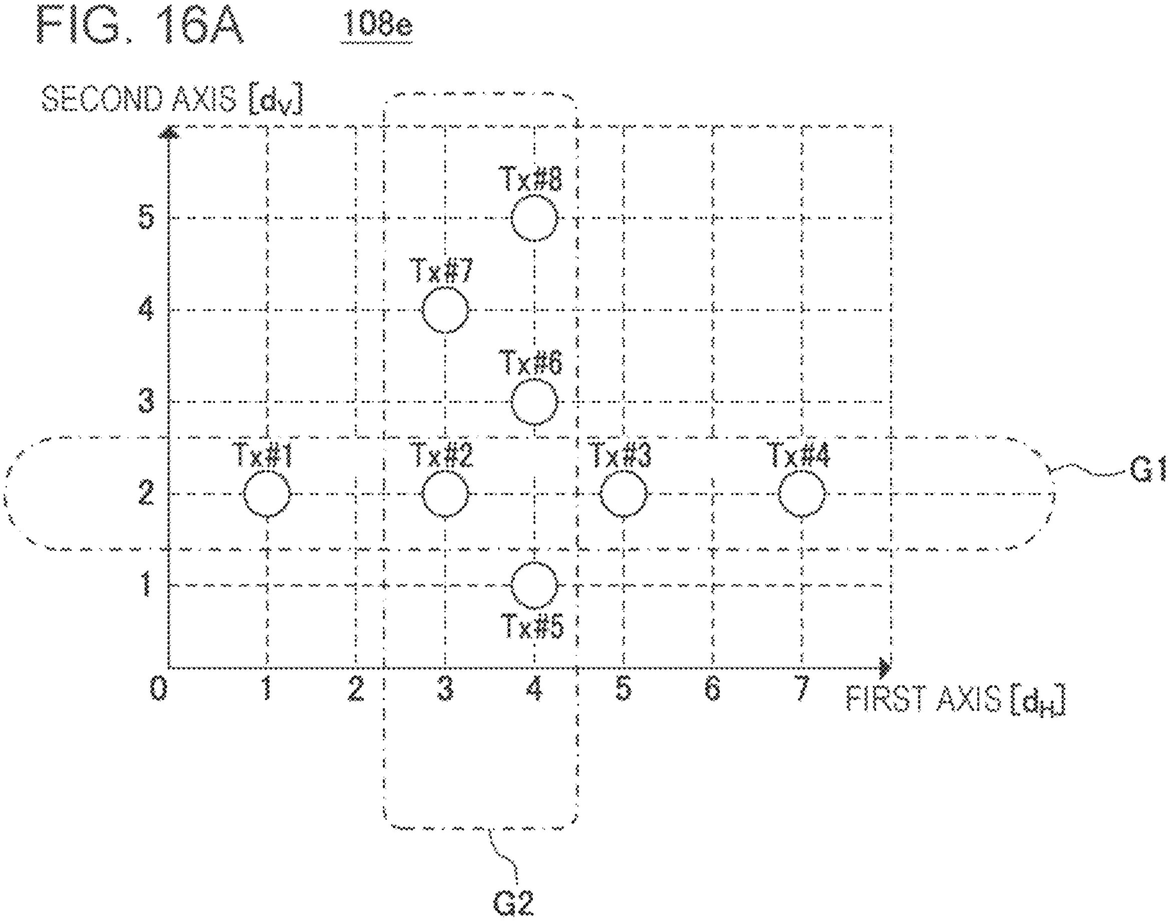
FIG. 16A is a diagram illustrating an example of a layout in a transmitting antenna according to a second variation of the first embodiment.
Figure 16B:
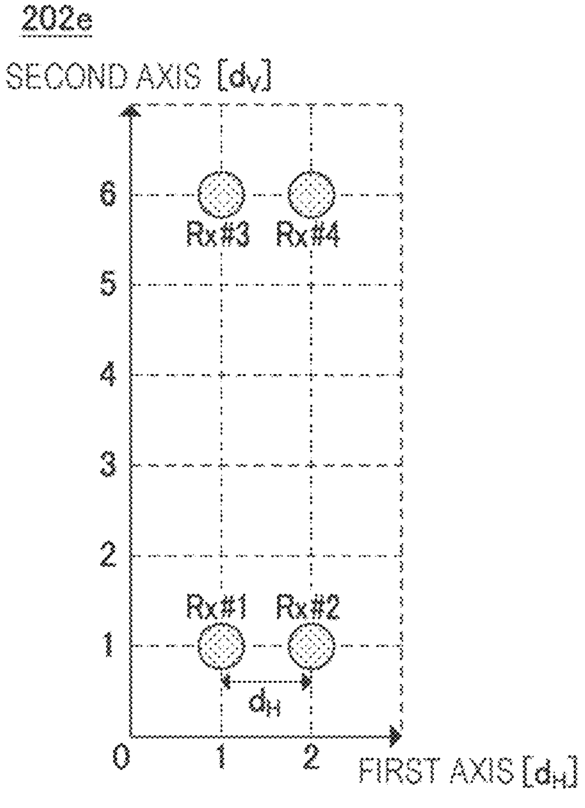
FIG. 16B is a diagram illustrating an example of a layout in a receiving antenna according to the second variation of the first embodiment.
Figure 16C:
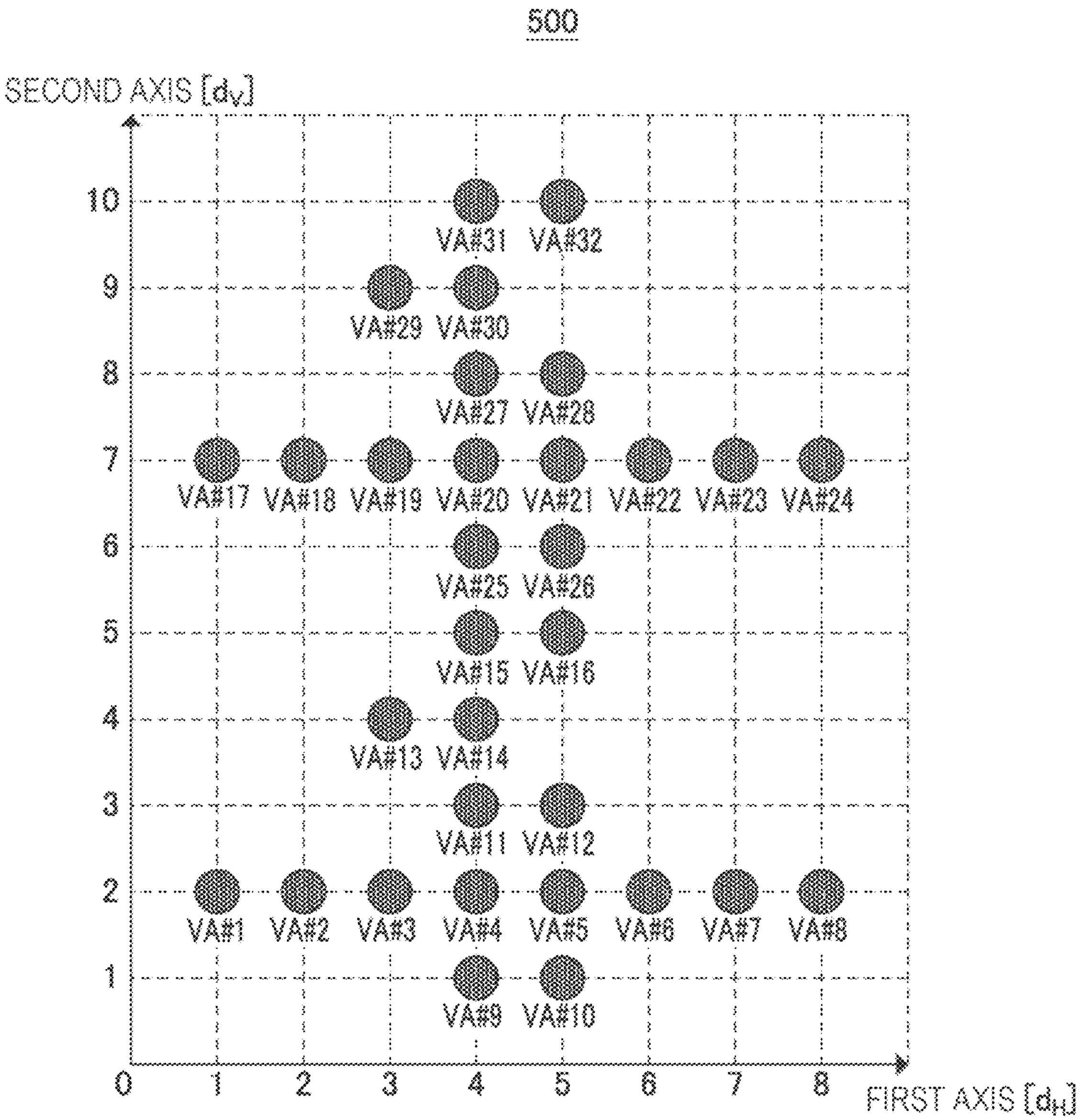
FIG. 16C is a diagram illustrating an example of a layout in a virtual receiving antenna according to the second variation of the first embodiment.

FIG. 16A illustrates an example of the layout of transmitting antenna elements Tx#1 through #Nt according to the second variation of the first embodiment. FIG. 16B illustrates an example of the layout of receiving antenna elements Rx#1 through #Na according to the second variation of the first embodiment. FIG. 16C illustrates an example of a layout of a virtual receiving antenna according to the second variation of the first embodiment. Note that the count of elements of the virtual receiving antenna is 32, which is the same as in the first variation.

In the example illustrated in FIGS. 16A and 16B, constants in the above expressions (19) through (22) are as follows: $(x_{t0}, y_{t0})=(1, 1)$, $(x_{r0}, y_{r0})=(1, 1)$, $p_{t1}=4$, $p_{t2}=5$, $p_{r1}=2$, $p_{r2}=2$, $x_c=2$, $y_c=2$, and $x_s=1$. The first axis and the second axis are orthogonal to each other.

In FIG. 16A, the sum Nt of antenna elements of the transmission array antenna 108*e* is eight, with the antenna elements of the transmission array antenna 108*e* being respectively represented by Tx#1 through Tx#8. The first antenna group G1 includes Tx#1 through Tx#4 (at least one first antenna element).

The second antenna group G2 includes Tx#5, Tx#2, and Tx#6 through Tx#8 (multiple second antenna elements). In FIG. 16B, the sum Na of antenna elements of the receiving array antenna 202*e* (multiple third antenna elements) is four, with the antenna elements of the receiving array antenna 202*e* being respectively represented by Rx#1 through Rx#4. The antenna layouts illustrated in FIGS. 16A and 16B will be described below.

1. Aperture Length of Antenna Elements

Figure 17:
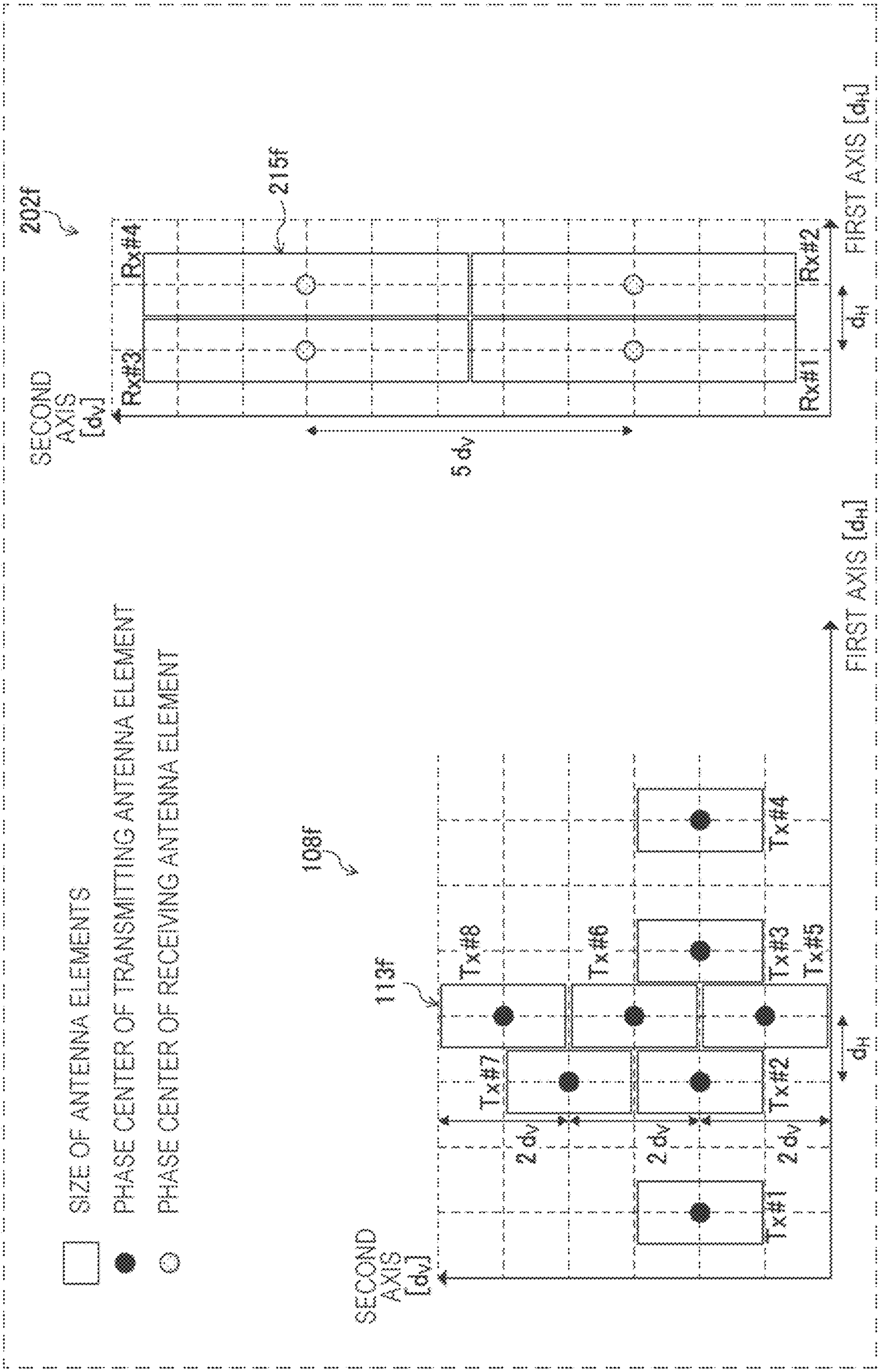
FIG. 17 is a diagram illustrating an example of the size of antenna elements according to the second variation of the first embodiment.

FIG. 17 illustrates an example of the size of antenna elements 113*f* and 215*f* according to the second variation of the first embodiment. The antenna elements are laid out so as to obtain the virtual receiving array illustrated in FIG. 16C, i.e., so that the spacings between the antenna elements of the virtual receiving array in the first axis direction and the second axis direction are $1\times d_V$ and $1\times d_H$ respectively, as illustrated in FIGS. 16A and 16B.

In a case of the antenna layout as illustrated in FIGS. 16A and 16B, the size of the antenna elements can be stipulated as illustrated in FIG. 17, for example. The sizes 113*f* and 215*f* of antenna elements are sizes where there is no interference among adjacent antenna elements.

The antenna elements of the transmission array antenna 108*f* are formed so that the aperture length is de or less in the first axis direction and $2\times d_V$ or less in the second axis direction. The antenna elements of the receiving array antenna 202*f* are formed so that the aperture length is $d_H$ or less in the first axis direction and $5\times d_V$ or less in the second axis direction.

In a case where the antenna elements of the transmission array antenna 108*f* are laid out in one column and one row (linearly) at equidistant spacings of the $1\times d_H$ and $1\times d_V$ in the first axis direction and second axis direction respectively, the size of the antenna elements cannot be increased beyond d and $d_V$ in the first axis direction and second axis direction respectively. In comparison with this, the antenna elements of the transmission array antenna 108 and receiving array antenna 202*f* can be increased so as to be larger than $d_H$ and $d_V$ in the first axis direction and the second axis direction respectively, as illustrated in FIG. 17, so high antenna gain can be obtained.

Note that the antenna elements illustrated in FIG. 17 may be configured using sub-array antennas, and an array weight may be applied to the sub-array antenna to suppress sidelobes. That is to say, the antenna elements in FIG. 17 are replaced with sub-array antennas, the sub-array antennas being configured using multiple antenna elements.

2. Beam Pattern Formed by Virtual Receiving Array

Figure 18A:
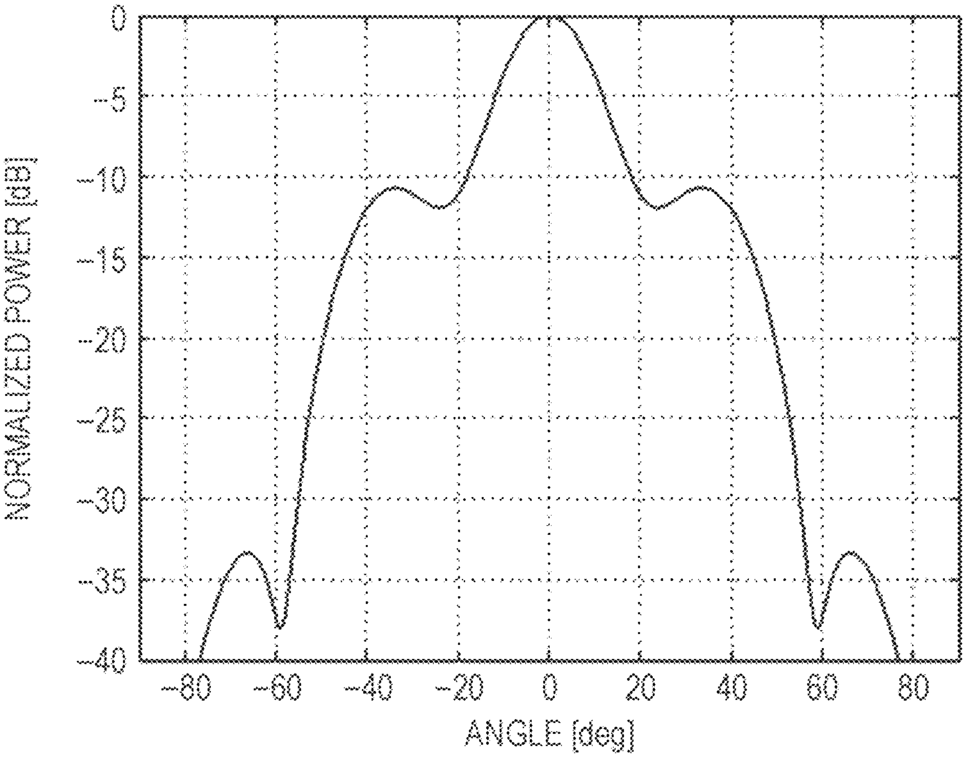
FIG. 18A is a diagram illustrating an example of a cross-sectional view of a directionality pattern of a two-dimensional beam by the virtual receiving array according to the second variation of the first embodiment, taken along a first axis direction.
Figure 18B:
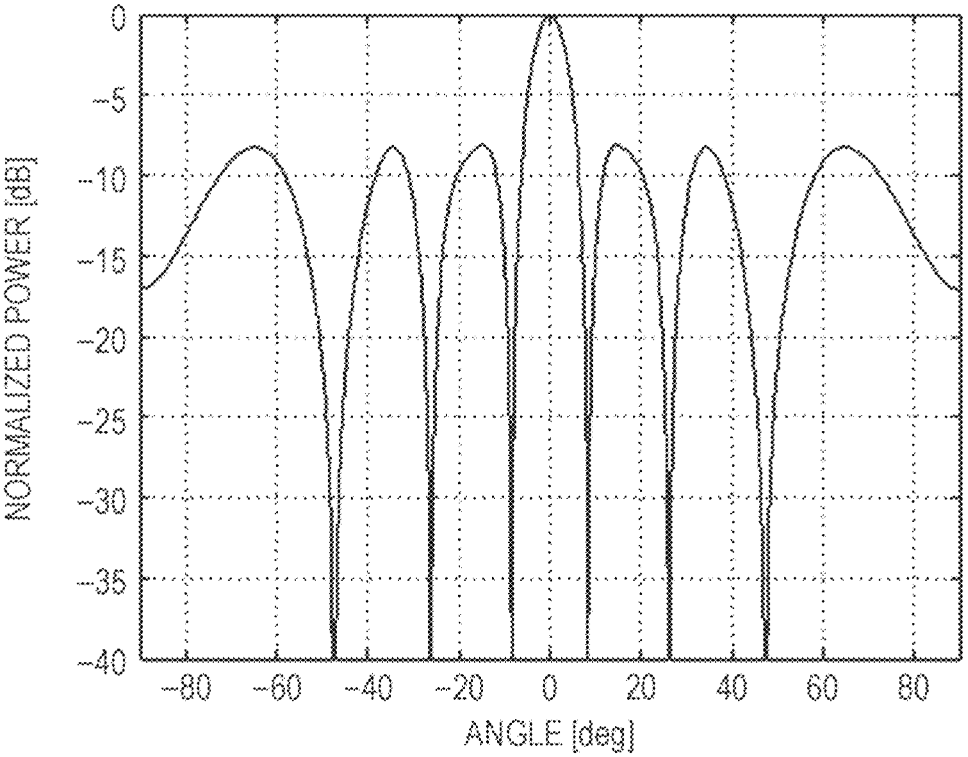
FIG. 18B is a diagram illustrating an example of a cross-sectional view of a directionality pattern of a two-dimensional beam by the virtual receiving array according to the second variation of the first embodiment, taken along a second axis direction.

FIG. 18A illustrates an example of a cross-sectional view of a directionality pattern of a two-dimensional beam by the virtual receiving array according to the second variation of the first embodiment, taken along the first axis direction. FIG. 18B illustrates an example of a cross-sectional view of a directionality pattern of a two-dimensional beam by the virtual receiving array according to the second variation of the first embodiment, taken along the second axis direction.

Specifically, FIG. 18A illustrates a cross-sectional view taken along the first axis direction at zero degrees to the second axis direction, in a two-dimensional beam pattern formed by beamforming using all of the antenna elements of the virtual receiving array illustrated in FIG. 16C. FIG. 18B illustrates a cross-sectional view taken along the second axis direction at zero degrees to the first axis direction. A case where $d_H$=0.5 wavelengths and $d_V$=0.68 wavelengths is illustrated in FIGS. 18A and 18B.

The aperture length in the first axis direction is $7\times d_H$ (VA #1 through VA #8 and VA #17 through VA #24), and the aperture length in the second axis direction is $9\times d_V$ (VA #9, VA #4, VA #11, VA #14, VA #15, VA #25, VA #20, VA #27, VA #30, and VA #31), for the virtual receiving arrays, as illustrated in FIG. 16C. Virtual antennas are laid out equidistantly at $1\times d_V$ or $1\times d_H$ spacings. Accordingly, a beam where grating does not occur can be formed, as illustrated in FIGS. 18A and 18B.

Figure 19A:
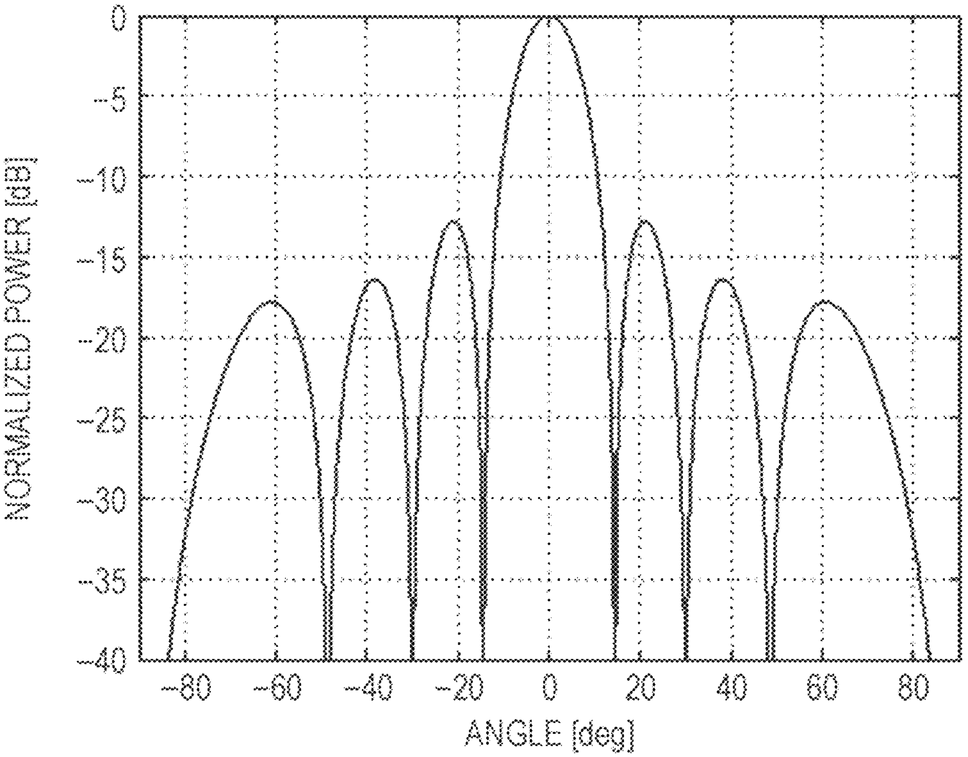
FIG. 19A is an example of a directionality pattern by the virtual receiving array according to the second variation of the first embodiment.

FIG. 19A illustrates an example of a directionality pattern of a one-dimensional beam from virtual receiving arrays (VA #1 through VA #8 and VA #17 through VA #24) equidistantly laid out in the first axis direction, out of the virtual receiving arrays according to the second variation of the first embodiment (FIG. 16C). In a case of using virtual receiving arrays VA #1 through VA #8, or virtual receiving arrays VA #17 through VA #24 equidistantly laid out in the first axis direction, out of the virtual receiving arrays VA #1 through VA #32 illustrated in FIG. 16C, the one-dimensional beam pattern in the first axis direction illustrated in FIG. 19A, for example, is formed with an aperture length of $7\times d_H$.

Figure 19B:
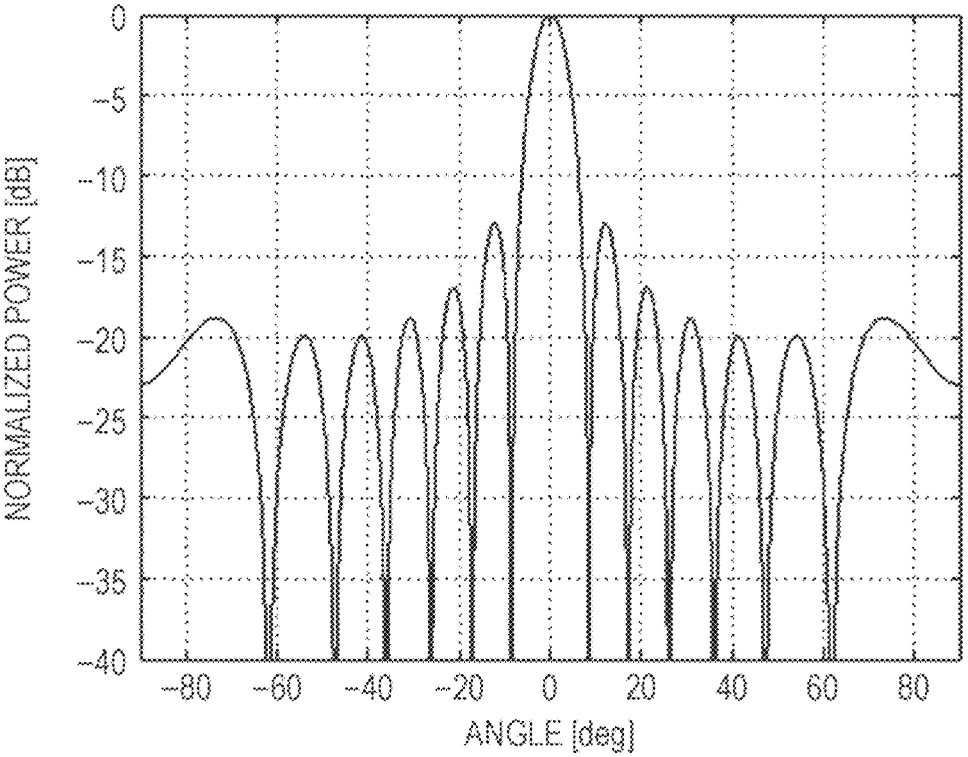
FIG. 19B is an example of a directionality pattern by the virtual receiving array according to the second variation of the first embodiment.

FIG. 19B illustrates an example of a directionality pattern of a one-dimensional beam from virtual receiving arrays equidistantly laid out in the second axis direction, out of the virtual receiving arrays VA #1 through VA #32 illustrated in FIG. 16C, according to the second variation of the first embodiment. In a case of using virtual receiving arrays VA #9, VA #4, VA #11, VA #14, VA #15, VA #25, VA #20, VA #27, VA #30, and VA #31 equidistantly laid out in the second axis direction in the same way as the case of the first axis direction, the one-dimensional beam pattern in the second axis direction illustrated in FIG. 19B, for example, is formed with an aperture length of $9\times d_V$.

The following can be found by comparing FIGS. 12A and 12B regarding the first variation of the first embodiment with FIGS. 19A and 19B regarding the second variation thereof. The second variation illustrated in FIG. 16C had a smaller beam width formed by the virtual receiving array as compared with the first variation of the first embodiment where virtual receiving arrays of the same number are equidistantly densely laid out as illustrated in FIG. 10C, and a higher angular resolution can be obtained. On the other hand, the second variation of the first embodiment illustrated in FIGS. 18A and 18B has a higher two-dimensional beam sidelobe level than the first variation of the first embodiment, illustrated in FIGS. 12A and 12B.

Accordingly, the following arrangement may be made. First, the direction of arrival is roughly estimated by the antenna layout according to the second variation of the first embodiment, using the two-dimensional beam illustrated in FIGS. 18A and 18B. Next, the direction of arrival is precisely estimated by the antenna layout according to this second variation around an angle where the estimated arrival waves are, using the virtual receiving array forming the one-dimensional beam illustrated in FIGS. 19A and 19B.

According to this estimation process, the probability of erroneous detection can be reduced by the one-dimensional beam illustrated in FIGS. 19A and 19B that has fewer sidelobes than the two-dimensional beam illustrated in FIGS. 18A and 18B, and more precise angle estimation can be realized. Further, estimation of the positions of two or more targets, which is difficult to finalize with the one-dimensional beam illustrated in FIGS. 19A and 19B, can be estimated, and further, the amount of calculation can be reduced.

The first variation and second variation have been described as examples of the antenna layout according to the first embodiment. According to the first embodiment as described above, the radar device 10 has the radar transmitting unit 100 that transmits radar transmission signals by switching multiple transmitting antenna elements #1 through #Nt of the transmission array antenna 108, and the radar receiving unit 200 that receives returning wave signals where the radar transmission signals have been reflected at a target, using multiple receiving antenna elements #1 through #Na of the receiving array antenna 202. In the first embodiment, the transmitting antenna elements #1 through #Nt and the receiving antenna elements #1 through #Na are laid out following the above-described rules.

Accordingly, the size of antenna elements can be increased by forming the transmission array antenna 108 and receiving array antenna 202 as sub-arrays, for example, thereby improving antenna gain. Also, a virtual receiving array can be configured with an antenna layout that is laid out at equidistant spacings of the first spacing d and second spacing $d_V$, and angle sidelobes and grating lobe components can be suppressed.

According to the first embodiment, a MIMO radar can be configured where the size of the transmission array antenna 108 and receiving array antenna 202 is increased by forming as sub-arrays, for example, reception SNR of returning wave signals is improved, and sidelobes and grating lobes in beam patterns formed by the virtual receiving array are suppressed.

Second Embodiment

A configuration where the second antenna group has a two-column zigzag layout, like the second antenna group G2 in FIG. 9A for example, has been exemplified in the first embodiment. Antenna Tx$\mathbf{2}_1$ of the first column and antenna Tx$\mathbf{2}_2$ of the second column are disposed separated by the second spacing in the second axis direction, and are disposed separated by the first spacing multiplied by $x_s$ in the first axis direction, as illustrated in FIG. 9A. Further, antenna Tx$\mathbf{2}_2$ is disposed between antenna Tx$2_1$ and antenna Tx$\mathbf{1}_1$ on the coordinates of the first axis.

An alternative layout will be described where the antenna elements of the second antenna group have a broader range of layout on the first axis. That is to say, the antenna elements of the second antenna group are all laid out at different positions with regard to second axis coordinates. Further, at least two antenna elements of the second antenna group are laid out at the same position with regard to first axis coordinates. Accordingly, the aperture length of antenna elements making up the transmitting array antenna can be made broader in the second axis direction in comparison with the first embodiment, yielding advantages such as enabling high gain of the antenna elements and so forth.

Note that in the second embodiment and first and second variations thereof that will be described below, the antenna elements may have a sub-array configuration, and in particular, a virtual receiving array can be efficiently configured in a case where the size of antenna elements is $2\times d_V$ or greater in the second axis direction. An antenna layout where the probability of erroneous detection is reduced and an efficient virtual receiving array is configured in a case of increasing the size of transmitting antenna elements in the second axis direction as compared to the first embodiment, and a direction of arrival estimation method using the same, will be described in the second embodiment.

Figure 20A:
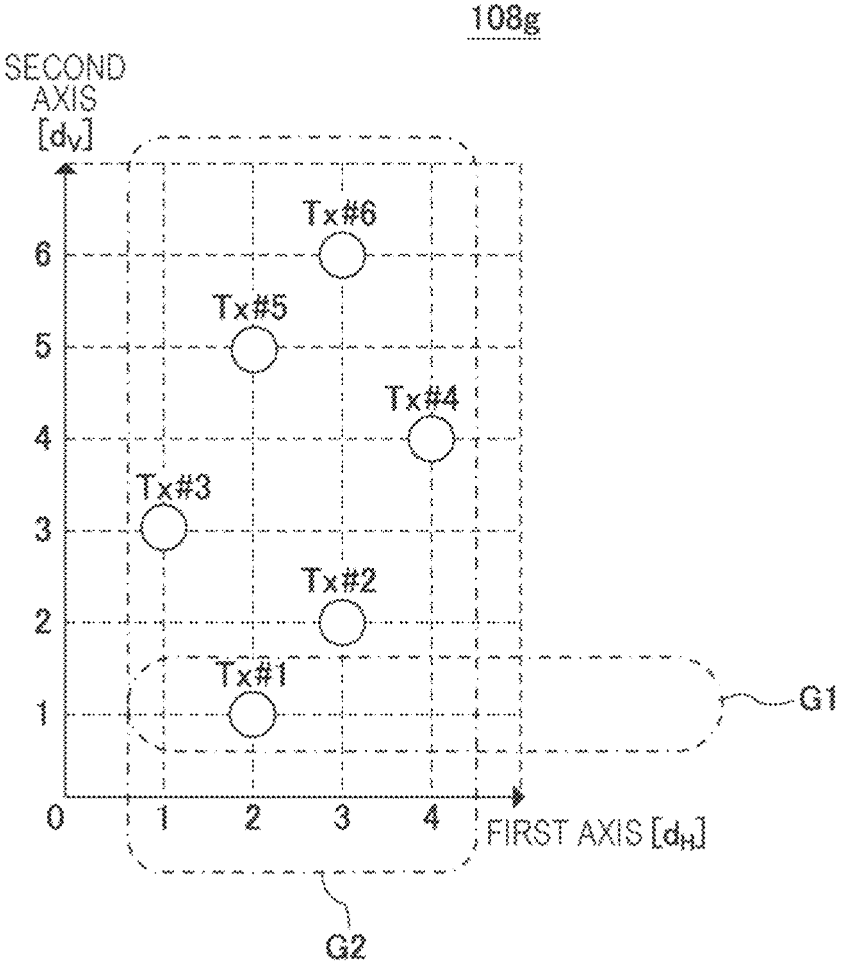
FIG. 20A is a diagram illustrating an example of a layout of antenna elements in a transmitting array antenna according to a second embodiment.
Figure 20B:
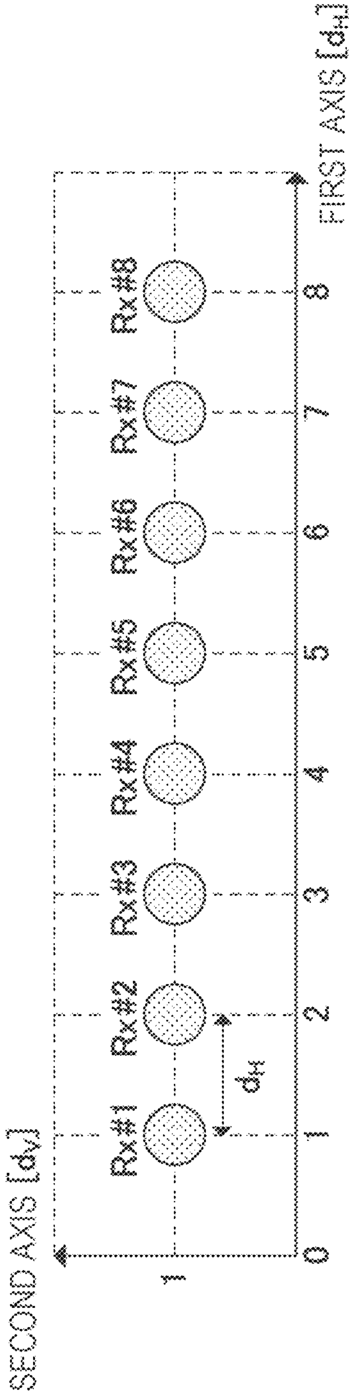
FIG. 20B is a diagram illustrating an example of a layout of antenna elements in a transmitting array antenna according to the second embodiment.
Figure 20C:
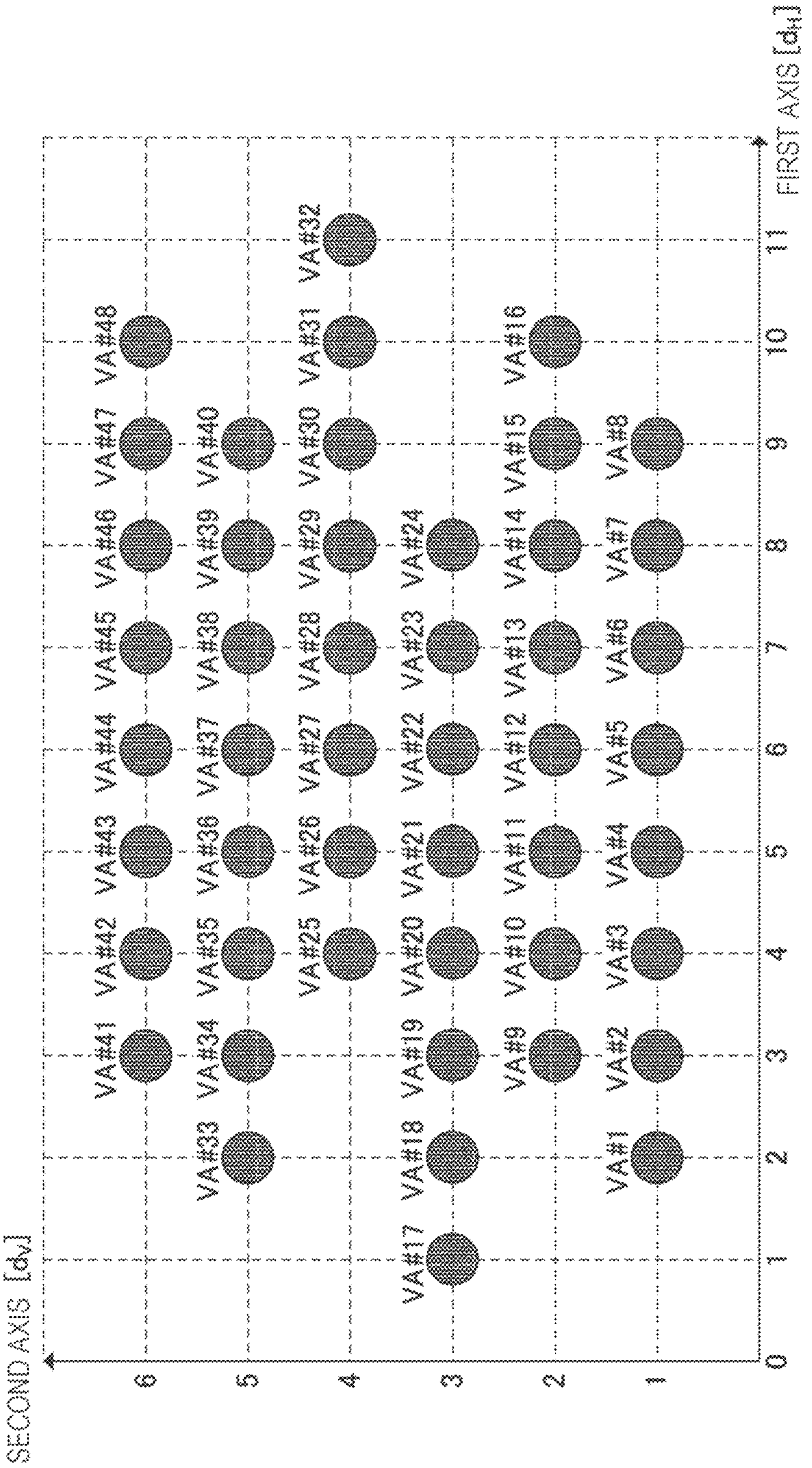
FIG. 20C is a diagram illustrating an example of a layout in a virtual receiving array according to the second embodiment.

FIG. 20A illustrates an example of the layout of antenna elements Tx#1 through #Nt of a transmission array antenna 108*g* according to the second embodiment. FIG. 20B illustrates an example of the layout of antenna elements Rx#1 through #Na of a receiving array antenna 202*g* according to the second embodiment. FIG. 20C illustrates an example of the layout of a virtual receiving array 500*g* according to the second embodiment.

A case where the antenna element count Nt of the transmission array antenna 108*g* is six, the antenna element count Na of the receiving array antenna 202*g* is eight, and the element count of the virtual receiving array 500*g* is 48, is illustrated as an example in FIGS. 20A through 20C. The first axis and second axis illustrated in FIGS. 20A and 20B are orthogonal to each other.

The antenna elements of the transmission array antenna 108*g* are represented by Tx#1 through Tx#6 in FIG. 20A. The first antenna group G1 includes Tx#1 (at least one first antenna element). The second antenna group G2 includes Tx#1 through Tx#6 (multiple second antenna elements).

The transmitting antenna elements Tx#1 through Tx#6 are laid out at second spacings in the second direction, as illustrated in FIG. 20A. In other words, the transmitting antenna elements Tx#1 through Tx#6 are each laid out at different second axis coordinates. Further, the transmitting antenna elements Tx#1 through Tx#4 are each laid out at first spacings in the first axis direction, with the first axis coordinates of the transmitting antenna elements Tx#1 and Tx#2 being equal to the first axis coordinates of the Tx#5 and Tx#6, respectively.

In FIG. 20B, receiving antenna elements (multiple third antenna elements) are expressed as Rx#1 through Rx#8. The receiving antenna elements Rx#1 through Rx#8 are laid out equidistantly at first spacings in the first axis direction, as illustrated in FIG. 20B.

In a case of using the layout of the antenna elements illustrated in FIGS. 20A and 20B, the configuration of the virtual receiving array 500*g* illustrated in FIG. 20C, i.e., the configuration of the virtual receiving array 500*g* including a region where spacings between antenna elements in the first axis direction and second axis direction are $1\times d_V$ and $1\times d_H$, respectively, is obtained.

Figure 21:
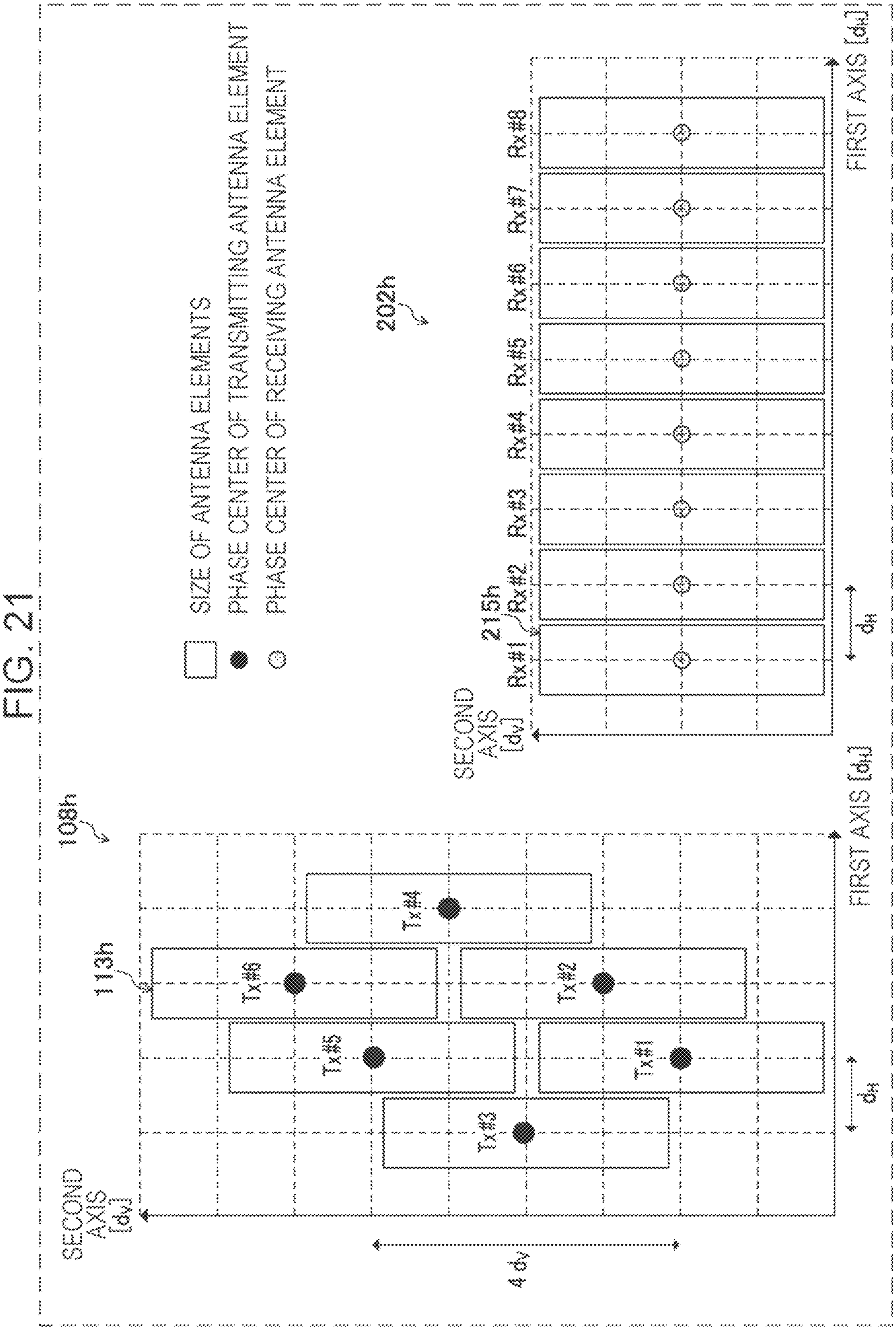
FIG. 21 is a diagram illustrating an example of the size of antenna elements according to the second embodiment.

FIG. 21 illustrates an example of the sizes 113*h* and 215*h* of antenna elements according to the second embodiment. In a case of the antenna layout as illustrated in FIGS. 20A and 20B, the sizes 113*h* and 215*h* of the antenna elements can be stipulated as illustrated in FIG. 21, for example. The sizes 113*h* and 215*h* of antenna elements are sizes where there is no interference among adjacent antenna elements.

In FIG. 21, the size 113*h* of the antenna elements of the transmission array antenna 108*h* is formed with an aperture length of d or less in the first axis direction and an aperture length of $4\times d_V$ or less in the second axis direction. The size 215*h* of the antenna elements of the receiving array antenna 202*h* is formed with an aperture length of $d_H$ or less in the first axis direction and an optional aperture length in the second axis direction.

Note that the antenna elements illustrated in FIG. 21 may be configured using a sub-array antenna that uses multiple antenna elements. Further, an array weight may be applied to the sub-array antenna to suppress sidelobes.

Note that the transmission array antenna 108*h* may perform beamforming using multiple antenna elements. For example, power is supplied to transmitting antenna elements Tx#1 through Tx#6 with phase controlled, to configure eight virtual receiving array elements by one transmitting antenna element and eight receiving antenna elements.

For example, in the transmission array antenna 108*h* illustrated in FIG. 21, in a case of configuring antenna elements having an aperture length around $d_H$ in the first axis length and $4\times d_V$ in the second axis direction, each by sub-array antennas, the sub-array antennas can be configured densely, so a beam with a low sidelobe level can be formed when beamforming.

Thus, the transmission array antenna 108*h* can be used as a single high-gain antenna by the antenna layout and sub-array configuration of antenna elements according to the present disclosure. Also, in the case of a time division multiplexing MIMO radar, the number of multiplexing is smaller so the transmission cycle is shorter, and accordingly the maximum doppler speed, at which the doppler analyzing unit can analyze, can be increased. Thus, the above-described example is a configuration suitable for detecting high-speed objects at long distances, as compared to a case of independently transmitting signals from transmitting antenna elements.

First Variation of Second Embodiment

In a first variation of the second embodiment, an antenna layout will be described where the aperture length of the virtual receiving array is broadened by layout out the receiving antennas with a greater spacing in the first axis direction as compared to the second embodiment, whereby high resolution can be obtained.

Figure 22A:
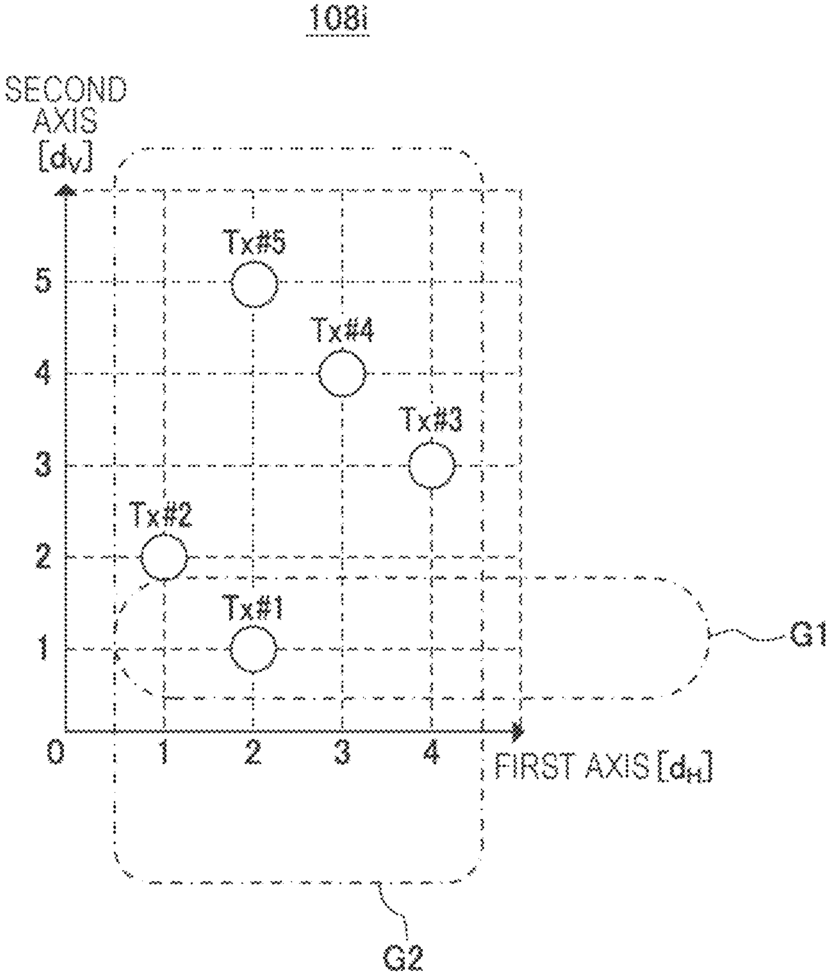
FIG. 22A is a diagram illustrating an example of a layout of antenna elements in a transmitting array antenna according to a first variation of the second embodiment.
Figure 22B:
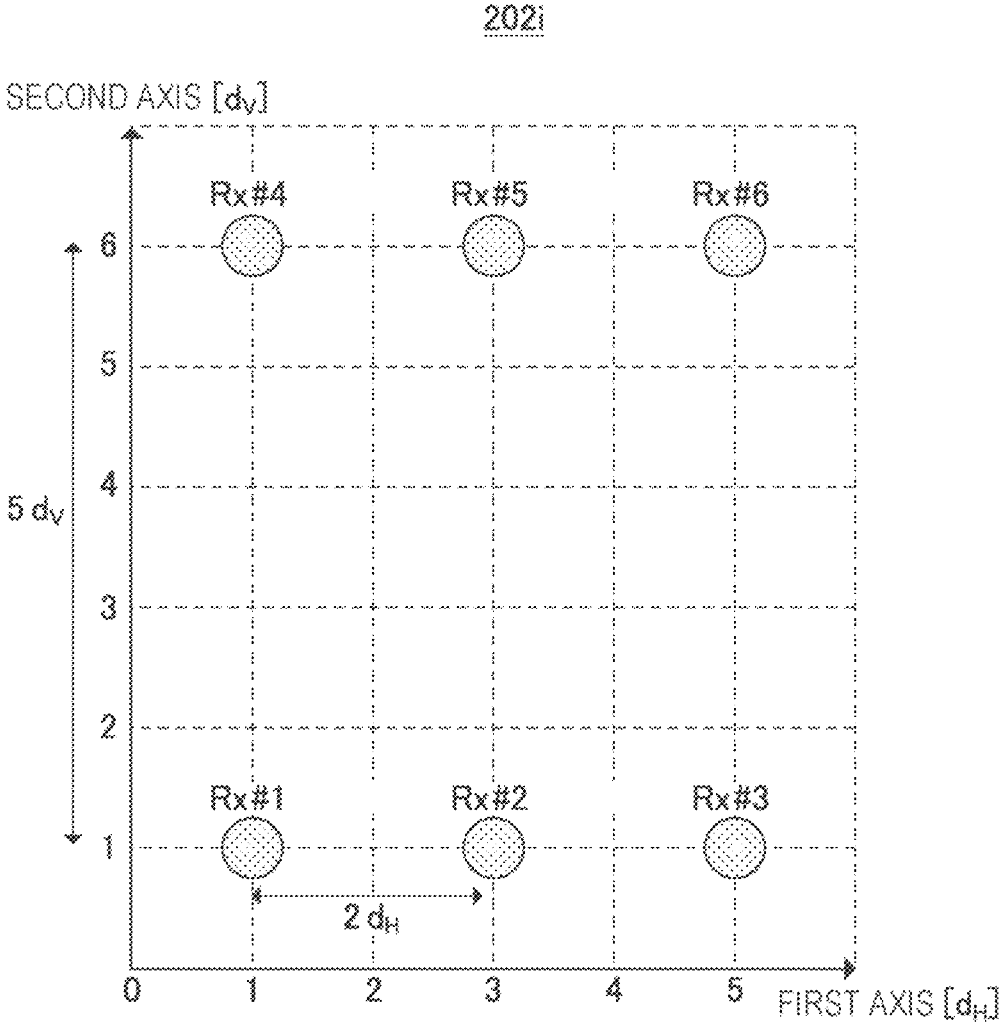
FIG. 22B is a diagram illustrating an example of a layout of antenna elements in a receiving array antenna according to the first variation of the second embodiment.
Figure 22C:
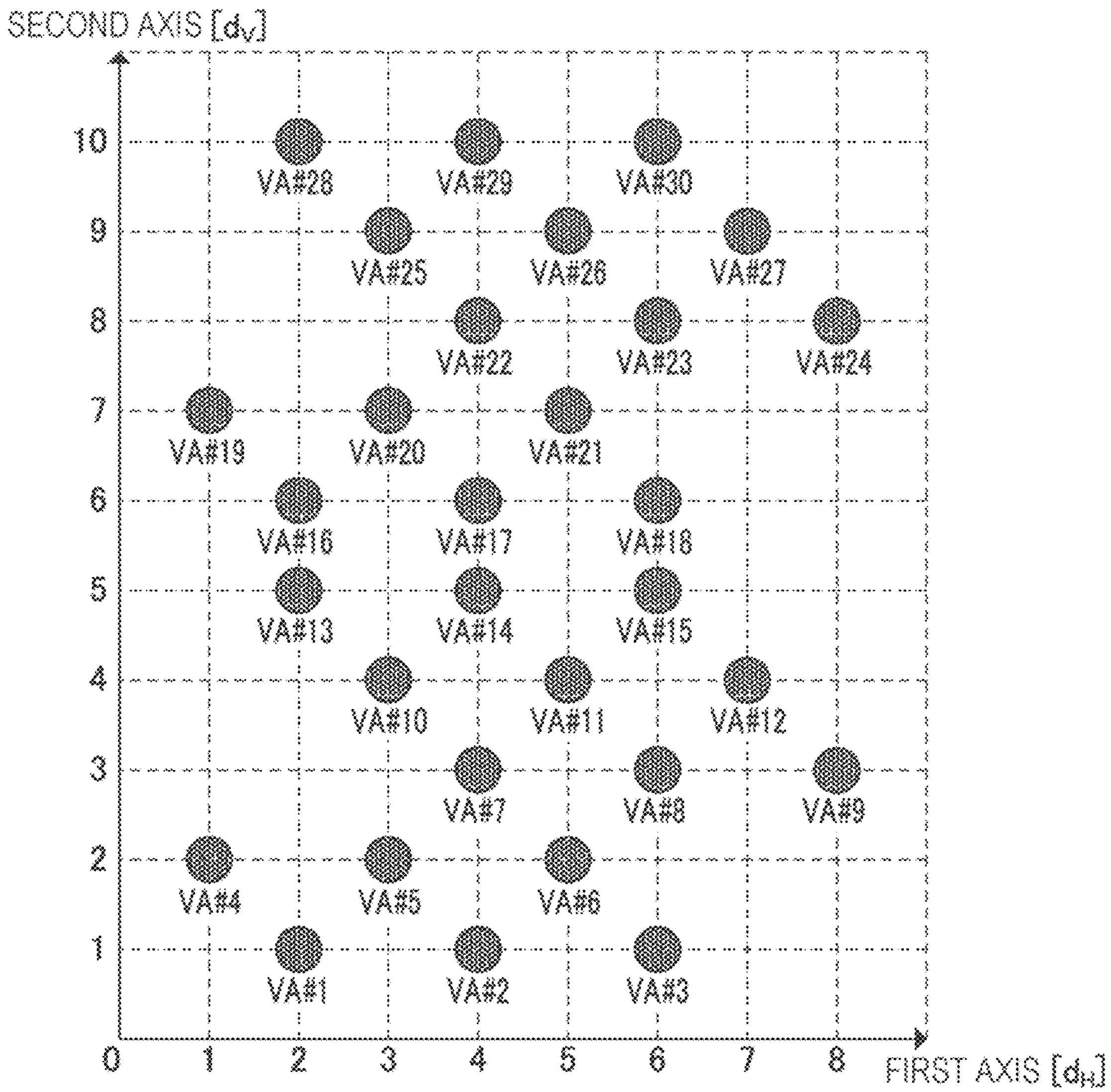
FIG. 22C is a diagram illustrating an example of a layout in a virtual receiving array according to the first variation of the second embodiment.

FIG. 22A illustrates an example of the layout of antenna elements Tx#1 through #Nt of a transmission array antenna 108*i* according to the first variation of the second embodiment. FIG. 22B illustrates an example of the layout of antenna elements Rx#1 through #Na of a receiving array antenna 202*i* according to the first variation of the second embodiment. FIG. 22C illustrates an example of the layout of a virtual receiving array 500*i* according to the first variation of the second embodiment.

A case where the antenna element count Nt of the transmission array antenna 108*i* is five, the antenna element count Na of the receiving array antenna 202*i* is six, and the element count of the virtual receiving array 500*i* is 30, is illustrated as an example in FIGS. 22A through 22C. The first axis and second axis illustrated in FIGS. 22A and 22B are orthogonal to each other.

The antenna elements of the transmission array antenna 108*i* are represented by Tx#1 through Tx#5 ion FIG. 22A. The first antenna group G1 includes Tx#1 (at least one first antenna element). The second antenna group G2 includes Tx#1 through Tx#5 (multiple second antenna elements).

The transmitting antenna elements Tx#1 through Tx#5 are laid out at second spacings in the second direction, as illustrated in FIG. 22A. In other words, the transmitting antenna elements Tx#1 through Tx#5 are each laid out at different second axis coordinates. Further, the transmitting antenna elements Tx#1 through Tx#4 are each laid out at first spacings in the first axis direction, with the first axis coordinate of the transmitting antenna element Tx#1 being equal to the first axis coordinate of the Tx#5.

In FIG. 22B, receiving antenna elements (multiple third antenna elements) are expressed as Rx#1 through Rx#6. The receiving antenna elements Rx#1 through Rx#6 are laid out equidistantly at spacings of $2\times d_H$ in the first axis direction and at spacings of $5\times d_V$ in the second axis direction, as illustrated in FIG. 22B.

In a case of using the layout of the antenna elements illustrated in FIGS. 22A and 22B, the configuration of the virtual receiving array 500*i* illustrated in FIG. 22C, i.e., the configuration of the virtual receiving array 500*i* where virtual antenna elements are arrayed with spacings as to adjacent virtual antenna elements being the spacing "interval" shown in Expression (23) or less, is obtained.

$$\text{interval} = \sqrt{d_H^2 + d_V^2} \tag{23}$$

In a case of the antenna layout illustrated in FIGS. 22A and 22B, the sizes of the antenna elements, for example, can be stipulated in the same way as the sizes 113*h* and 215*h* of the antenna elements in the second embodiment illustrated in FIG. 21. For example, the antenna elements of the transmission array antenna 108*i* illustrated in FIG. 22A are formed with an aperture length of $d_H$ or less in the first axis direction and an aperture length of $4\times d_V$ or less in the second axis direction. The antenna elements of the receiving array antenna 202*i* illustrated in FIG. 22B are formed with an aperture length of $2\times d_H$ or less in the first axis direction and $5\times d_V$ or less in the second axis direction.

Note that the antenna elements illustrated in FIG. 22A may each be configured using a sub-array antenna that uses multiple antenna elements. Further, an array weight may be applied to the sub-array antenna to suppress sidelobes.

According to the first variation of the second embodiment, the virtual receiving array 500*i* illustrated in FIG. 22C is configured by the configurations illustrated in FIGS. 22A and 22B. Accordingly, the aperture length of the transmitting array antenna elements in the second axis direction can be increased, and further, the aperture length of the receiving array antenna elements in the first axis direction can be increased as compared to the second embodiment.

Second Variation of Second Embodiment

The antenna layout according to a second variation of the second embodiment is an antenna layout that partially includes the antenna layout according to the first variation of the second embodiment. In addition to the advantages that are obtained by the first variation of the second embodiment, advantages can be obtained of improved resolution, and in the case of a time division MIMO radar, the maximum doppler speed at which the doppler analyzing unit can analyze can be increased.

Figure 23A:
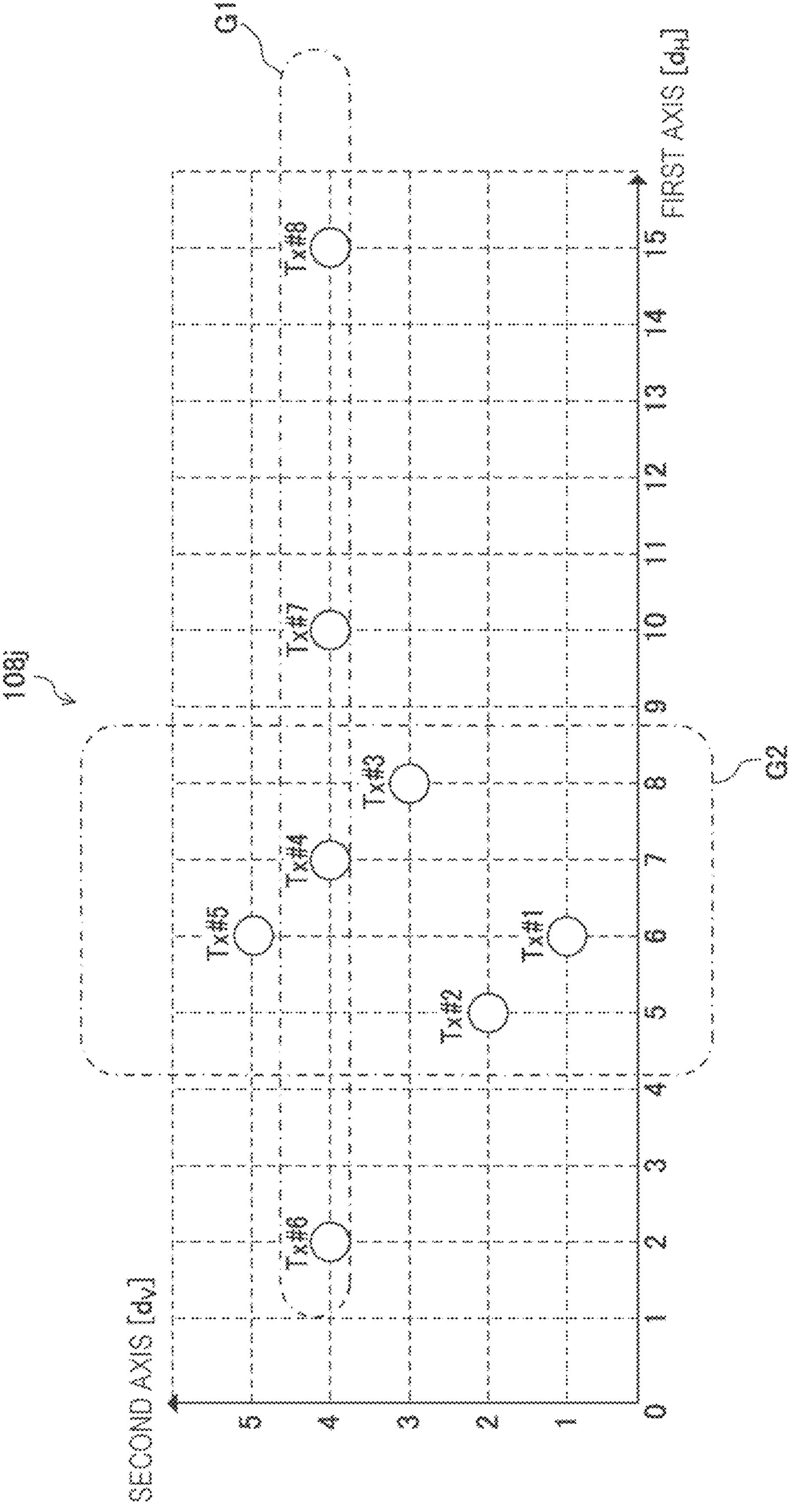
FIG. 23A is a diagram illustrating an example of a layout of antenna elements in a transmitting array antenna according to a second variation of the second embodiment.
Figure 23B:
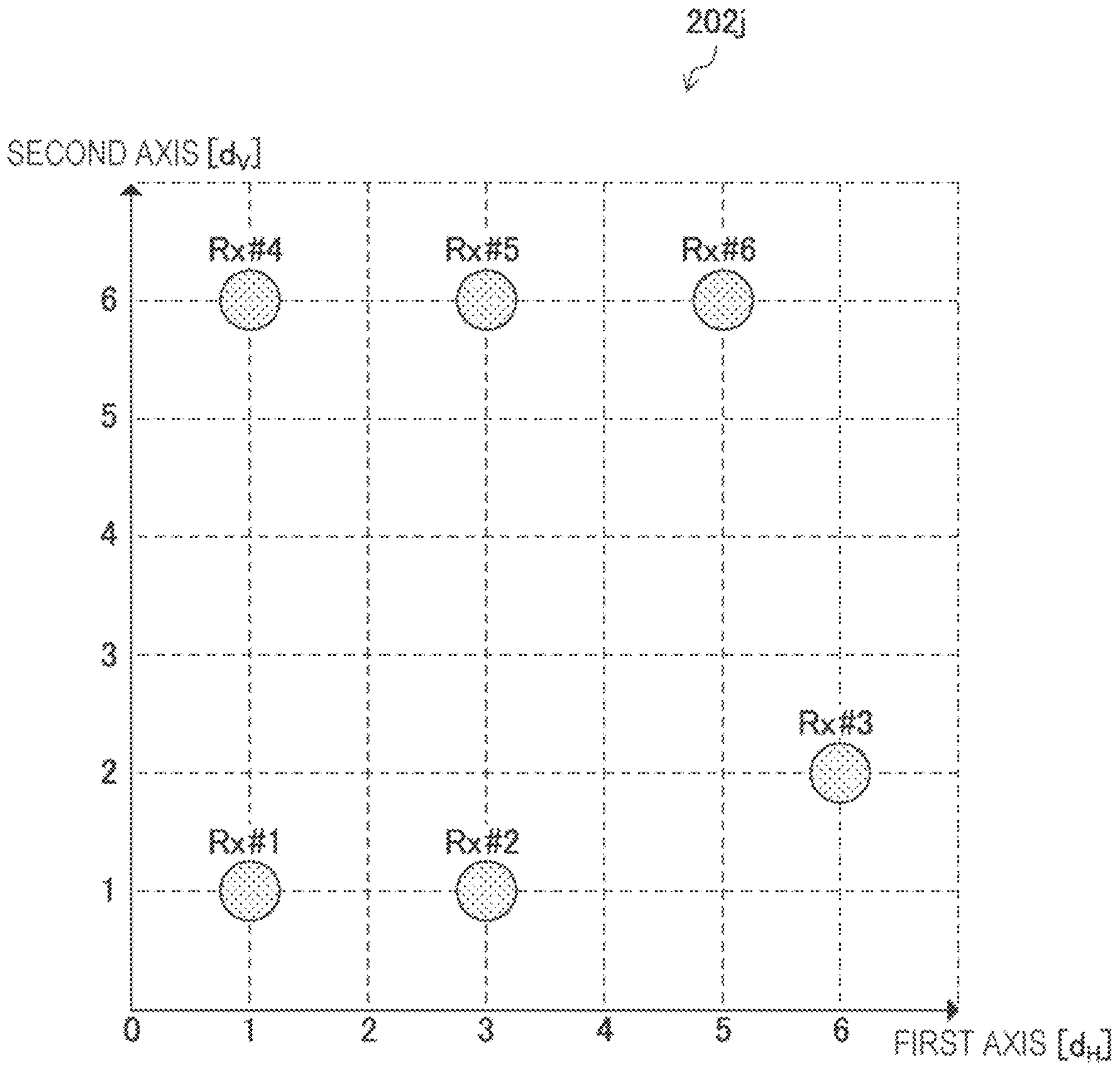
FIG. 23B is a diagram illustrating an example of a layout of antenna elements in a receiving array antenna according to the second variation of the second embodiment.
Figure 23C:
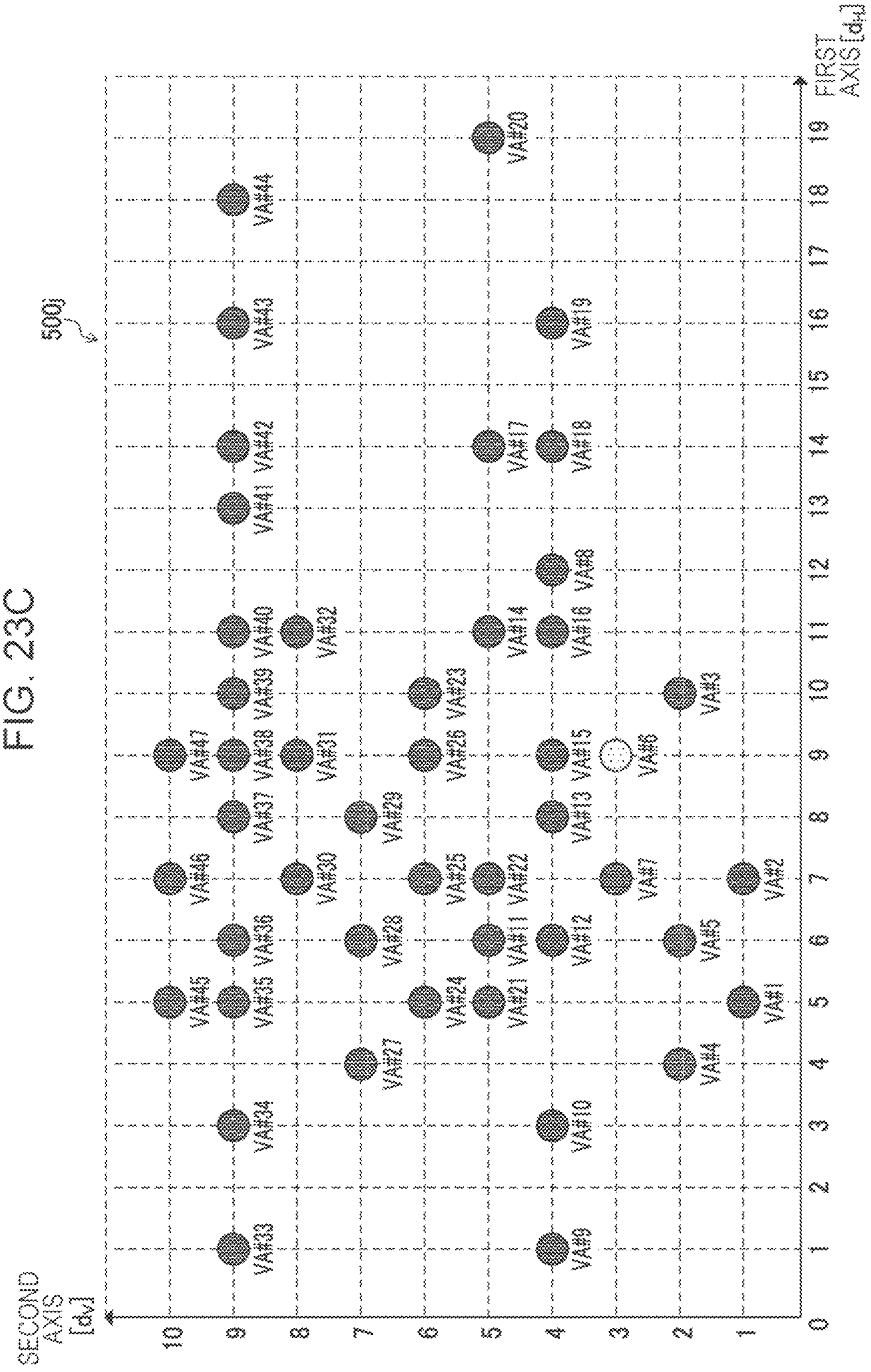
FIG. 23C is a diagram illustrating an example of a layout in a virtual receiving antenna according to the second variation of the second embodiment.

FIG. 23A illustrates an example of the layout of antenna elements Tx#1 through #Nt of a transmission array antenna 108*j* according to the second variation of the second embodiment. FIG. 23B illustrates an example of the layout of antenna elements Rx#1 through #Na of a receiving array antenna 202*j* according to the second variation of the second embodiment. FIG. 23C illustrates an example of the layout of a virtual receiving array 500*j* according to the second variation of the second embodiment.

In FIG. 23A, the transmitting antenna elements Tx#1 through Tx#5 have the same configuration as the transmitting antenna elements Tx#1 through Tx#5 in the first variation of the second embodiment illustrated in FIG. 22A. The first antenna group G1 in FIG. 23A includes the transmitting antenna elements Tx#4, Tx#6, Tx#7, and Tx#8, and the second antenna group G2 includes the transmitting antenna elements Tx#1 through Tx#5.

In FIG. 23B, the receiving antenna elements Rx#1, Rx#2, Rx#4, Rx#5, and Rx#6 have the same configuration as the receiving antenna elements Rx#1, Rx#2, Rx#4, Rx#5, and Rx#6 in the first variation of the second embodiment illustrated in FIG. 22B. Further in FIG. 23B, the first axis coordinate and second axis coordinate of the receiving antenna element Rx#3 are each different from the first axis coordinate and second axis coordinate of the other receiving antenna elements Rx#1, Rx#2, Rx#4, Rx#5, and Rx#6, so that the virtual antenna elements of the virtual receiving array are at overlapping positions in the configuration.

In the virtual receiving array illustrated in FIG. 23C, a virtual antenna element configured of the transmitting antenna element Tx#2 and receiving antenna element Rx#3, and a virtual antenna element configured of the transmitting antenna element Tx#3 and receiving antenna element Rx#2, are configured overlapping at the position of the virtual antenna element VA #6. Accordingly, two reception signals are present at the position of the virtual antenna element VA #6, corresponding to the overlapping virtual antenna elements. One of the two reception signals may be used to perform direction of arrival estimation, or direction of arrival estimation may be performed using the average thereof, or direction of arrival estimation may be performed using the sum thereof. There is no phase difference due to angle of arrival in the two overlapping reception signals, since the position of the virtual antennas overlap. Further, doppler analysis may be performed using the two overlapping reception signals.

Figure 24:
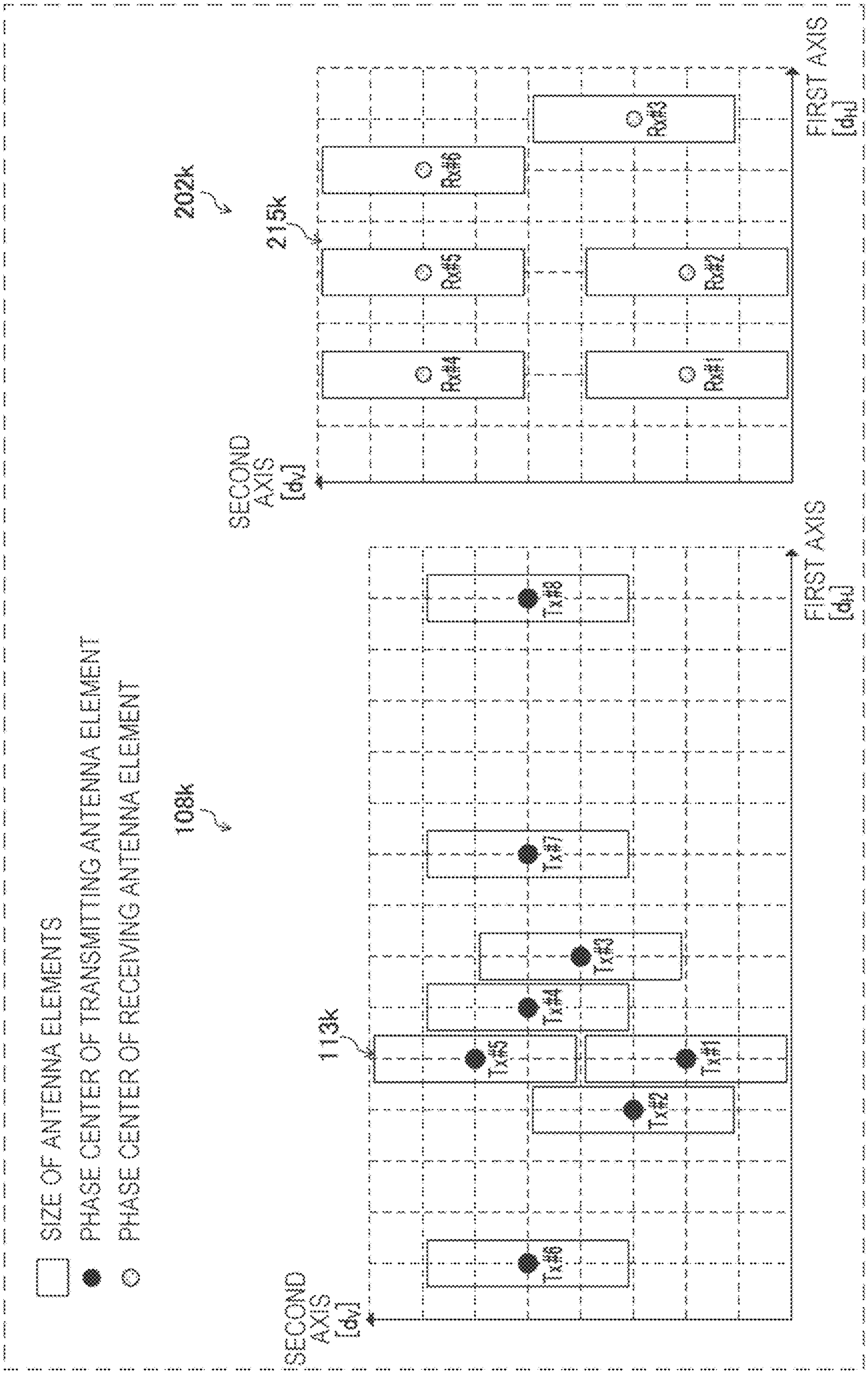
FIG. 24 is diagram illustrating an example where the sizes of antenna elements according to the second variation of the second embodiment are 113*k* and 215*k;*

FIG. 24 illustrates an example of the sizes 113*k* and 215*k* of antenna elements according to the second variation of the second embodiment. The sizes 113*k* and 215*k* of the antenna elements can be stipulated in the same way as the second embodiment and the first variation of the second embodiment, as illustrated in FIG. 24, for example. Now, the sizes 113*k* and 215*k* of antenna elements are sizes where there is no interference among adjacent antenna elements.

Note that in FIG. 24, the sizes of the transmitting antenna elements Tx#1 through #8 and the receiving antenna elements Rx#1 through #6 are the same. However, the sizes of the transmitting antenna elements Tx#1 through #8 and the receiving antenna elements Rx#1 through #6 may differ, as long as the sizes are such that there is no interference among adjacent antenna elements. The transmitting antenna elements and the receiving antenna elements may be configured using a sub-array antenna, and an array weight may be applied to the sub-array antenna to suppress sidelobes.

For example, the receiving antenna elements Rx#1 through Rx#6 may each be configured of sub-arrays of two elements in the first axis direction and four elements in the second axis direction. Further, the transmitting antenna elements Tx#6 through Tx#8 may each be configured of sub-arrays having aperture lengths of $3\times d_H$ in the first axis direction and $8\times d_V$ in the second axis direction. The beam pattern of the transmission array antenna 108*k* has a narrower angle as compared to the configuration in FIG. 23, and the antenna gain in the frontal direction improves so the SNR improves.

Figure 25A:
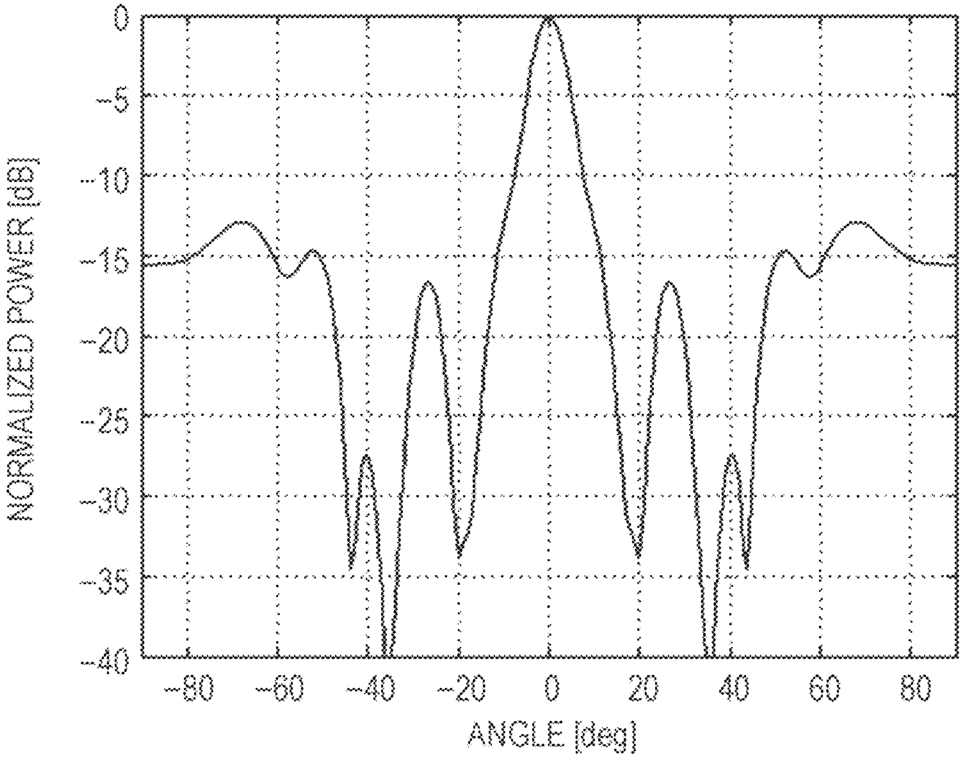
FIG. 25A is a diagram illustrating an example of a cross-sectional view of a directionality pattern by the virtual receiving array according to the second variation of the second embodiment, taken along a first axis direction.
Figure 25B:
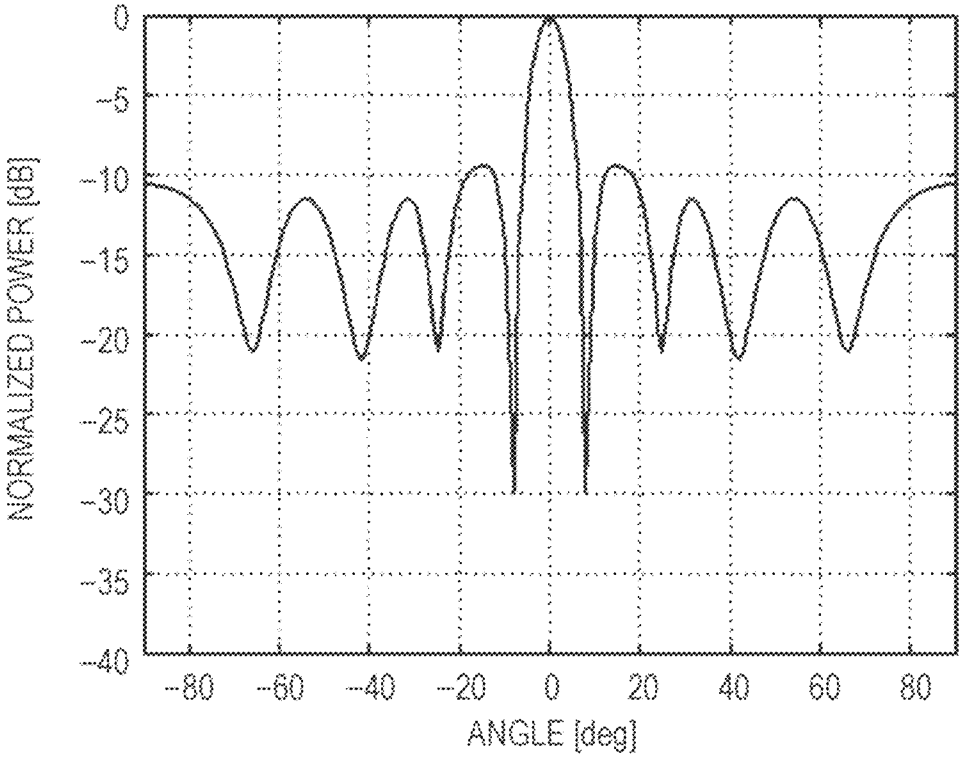
FIG. 25B is a diagram illustrating an example of a cross-sectional view of a directionality pattern by the virtual receiving array according to the second variation of the second embodiment, taken along a second axis direction.

FIG. 25A illustrates an example of a cross-sectional view of a directionality pattern of a two-dimensional beam (main beam 0° in horizontal direction and 0° in vertical direction) by the virtual receiving array 500*j* according to the second variation of the second embodiment in FIG. 23C, taken along the first axis direction. FIG. 25B illustrates an example of a cross-sectional view of a directionality pattern of a two-dimensional beam by the virtual receiving array according to the second variation of the second embodiment, taken along the second axis direction.

The virtual receiving array 500*j* in the second variation of the second embodiment is arrayed sparsely as compared to the first variation of the second embodiment, so the sidelobe level is high. Accordingly, the effects of the height of the sidelobe level on the probability of erroneous detection may be suppressed by combining with a technique where the direction of arrival estimation is performed independently for the first axis direction and the second axis direction, as described in the second variation of the first embodiment. For example, direction of arrival estimation is made with precision in the first axis direction and second axis direction by the virtual receiving array 500*j* illustrated in FIG. 23C, and precise direction of arrival estimation using a two-dimensional beam is performed for angles exceeding a certain threshold value. Accordingly, the effects of the height of sidelobe level on the probability of erroneous detection can be suppressed, and further, the amount of calculation required for direction of arrival estimation can be reduced.

Note that part of the multiple transmitting antenna elements Tx#1 through Tx#8 included in the transmission array antenna 108*j* may be used overlapped, in the same way as in the second embodiment and the first variation of the second embodiment. For example, the five transmitting antennas of transmitting antenna elements Tx#1 through Tx#5 may be used overlapped, out of the multiple transmitting antenna elements Tx#1 through Tx#8 included in the transmission array antenna 108*j*. Accordingly, the number of overlapped antennas can be reduced while maintaining angle estimation capabilities in the second axis direction (vertical direction). Also for example, the four transmitting antennas of transmitting antenna elements Tx#4, Tx#6, Tx#7, and Tx#8 may be used overlapped, out of the multiple transmitting antenna elements Tx#1 through Tx#8 included in the transmission array antenna 108*j*. Accordingly, the number of overlapped antennas can be reduced while maintaining angle estimation capabilities in the first axis direction (horizontal direction). In the case of a time division multiplexing MIMO radar, the smaller number of overlapping antennas there is, the smaller the transmission cycle of signals can be analyzed at the doppler analyzing unit 213, and the maximum doppler speed at which the doppler analyzing unit 213 can analyze can be increased. Moreover, beamforming can be performed by multiple antenna elements included in multiple transmitting antenna elements Tx#1 through Tx#8.

Other Embodiments

A configuration where antenna elements are disposed separated by the second spacing in the second axis direction, and each antenna element is disposed separated by the first spacing multiplied by $x_s$ in the first axis direction, has been exemplified as the second antenna group in the first embodiment. Alternately, a configuration of the second antenna group is conceivable where antennas are disposed separated by the second spacing in the second axis direction, and are disposed separated by the first spacing multiplied by $x_{s,j}$ in the first axis direction at cycles of a count of N.

Specifically, a configuration is conceivable where, in Expression (20) in the description of the first embodiment, $p'_{tH}$, stipulated in the following Expression (24) with regard to integers j from 1 through $p_{r2}$, is used instated of $p_{tH}$ $$p'_{tH}=x_{s,j} \tag{24}$$

where j is an integer of 0 or larger but smaller than N in which $|y_c-j|$ is an integer multiple of N, N is an integer that is larger than 2 but $p_{r1}$ or smaller, and $x_{s,j}$ is an integer that is 0 or larger but smaller than $p_{r1}$ with regard to j=0, 1, . . . , N-1.

For example, in a case where $N=p_{r1}$ and $x_{s,j}=j$ hold, the antenna elements of the transmission array antenna 108 have an aperture length of $N\times d_V$ in the second axis direction. Accordingly, the size of antenna elements of the transmission array antenna 108 and receiving array antenna 202 can be increased and high antenna gain can be obtained as compared to a case where the antenna elements of the transmission array antenna 108 are linearly and equidistantly laid out at the basic spacings $d_H$ and $d_V$. Laying out the virtual receiving array at equal spacings around one-half wavelength enables grating lobes and sidelobe components to be suppressed.

Although various embodiments have been described above with reference to the drawings, it is needless to say that the present disclosure is not restricted to these examples. It is clear that one skilled in the art will be able to reach various alterations and modifications within the scope of the Claims, and such should be understood to belong to the technical scope of the present disclosure as a matter of course. Various components in the above-described embodiments may be optionally combined without departing from the essence of the disclosure.

Although examples of configuring the present disclosure using hardware have been described in the above-described embodiments, the present disclosure may be realized by software in cooperation with hardware as well.

The functional blocks used in the description of the above-described embodiments typically are realized as large-scale integration (LSI) that is an integrated circuit. An integrated circuit may control the functional blocks used in the description of the above-described embodiments, and have input and output. These may be individually formed into one chip, or part or all may be included in one chip. Also, while description has been made regarding an LSI, there are different names such as integrated circuit (IC), system LSI, super LSI, and ultra LSI, depending on the degree of integration.

The circuit integration technique is not restricted to LSIs, and dedicated circuits or general-purpose processors may be used to realize the same. A field programmable gate array (FPGA) which can be programmed after manufacturing the LSI, or a reconfigurable processor where circuit cell connections and settings within the LSI can be reconfigured, may be used.

Further, in the event of the advent of an integrated circuit technology which would replace LSIs by advance of semiconductor technology or a separate technology derived therefrom, such a technology may be used for integration of the functional blocks, as a matter of course. Application of biotechnology, for example, is a possibility.

A radar device according to the present disclosure includes: a radar transmitting circuit that transmits radar signals from a transmission array antenna; and a radar receiving circuit that receives returning wave signals, where the radar signals have been reflected at a target, from a receiving array antenna. One of the transmitting array antenna and the receiving array antenna includes a first antenna group and a second antenna group. The first antenna group includes one or more first antenna elements of which the phase centers of the antenna elements are laid out at each first layout spacing following a first axis direction, and a shared antenna element. The second antenna group includes a plurality of second antenna elements and the one shared antenna element, and the phase centers of the antenna elements are laid out in two columns at each second layout spacing following a second axis direction that is different from the first axis direction. The phase centers of the antenna elements included in each of the two columns differ from each other regarding position in the second axis direction. The other of the transmitting array antenna and the receiving array antenna includes a plurality of third antenna elements of which the phase centers are laid out in a first count of columns based on the first layout spacing along the first axis direction, at each third layout spacing that is smaller than the first layout spacing, and laid out following the second axis direction at each fourth layout spacing that is larger than the second layout spacing.

In the radar device according to the present disclosure, the first layout spacing is equal to a first spacing multiplied by $p_{r1}$, the second layout spacing is equal to a second spacing, the first count of columns is equal to the $p_{r1}$, the third layout spacing is equal to the first spacing, the fourth layout spacing is equal to the second spacing multiplied by $p_{t2}$, the two columns of the second antenna group are laid out at positions on the first axis that differ by the first spacing multiplied by $x_s$, and the $p_{r1}$ is an integer larger than 1, the $p_{t2}$ is an integer larger than 1, and the $x_s$ is an integer larger than 0 and smaller than the $p_{r1}$.

In the radar device according to the present disclosure, the $x_s$ is equal to 1.

In the radar device according to the present disclosure, a count of elements of the one or more first antenna elements is equal to 1.

In the radar device according to the present disclosure, a count of elements of the plurality of third antenna elements is equal to the first count of columns.

In the radar device according to the present disclosure, the count of elements of the plurality of third antenna elements is greater than the first count of columns.

In the radar device according to the present disclosure, first spacing and the second spacing are 0.3 wavelengths or longer but 2 wavelengths or shorter, with the wavelength of the radar signal as a reference.

In the radar device according to the present disclosure, the first antenna group and the second antenna group are laid out in a T-shape or cross-shape.

In the radar device according to the present disclosure, the first axis direction and the second axis direction are orthogonal to each other.

A radar device according to the present disclosure includes: a radar transmitting circuit that transmits radar signals from a transmission array antenna; and a radar receiving circuit that receives returning wave signals, where the radar signals have been reflected at a target, from a receiving array antenna. One of the transmitting array antenna and the receiving array antenna includes a first antenna group and a second antenna group. The first antenna group is one shared antenna element, or includes one or more first antenna elements of which the phase center of the antenna elements are arrayed following a first axis direction and the one shared antenna element. The second antenna group includes a plurality of second antenna elements and the one shared antenna element, with the position of phase centers of the antenna elements differing from each other in a second axis direction that differs from the first axis direction. At least one phase center of the plurality of second antenna elements and the phase center of the one shared antenna element have the same position in the first axis direction, and are laid out in one column or more at each second layout spacing in the second axis direction.

The present disclosure is suitable as a radar device that detects over a wide-angle range, and can be installed in vehicles, for example.

What is claimed is:

1. A radar device, comprising:

a radar transmitting circuit which, in operation, transmits radar signals from a transmission array antenna; and a radar receiving circuit which, in operation, receives return wave signals, where the radar signals have been reflected at a target, from a receiving array antenna, wherein one array antenna of the transmission array antenna and the receiving array antenna includes a plurality of first antennas, wherein a phase center of a first antenna and a phase center of a second antenna among phase centers of the plurality of first antennas are arranged continuously in a first axis direction, are laid out at a first layout spacing along the first axis direction, and are arranged at a same position in a second axis direction orthogonal to the first axis direction, wherein a remaining array antenna of the transmission array antenna and the receiving array antenna includes a plurality of second antennas, wherein a phase center of a third antenna, a phase center of a fourth antenna, a phase center of a fifth antenna, and a phase center of a sixth antenna among phase centers of the plurality of second antennas are arranged continuously in the first axis direction, are arranged at a same position in the second axis direction, and are laid out at second layout spacings having different layout spacings along the first axis direction, wherein a layout spacing between the phase center of the fourth antenna and the phase center of the fifth antenna among the second layout spacings is a narrowest spacing among the second layout spacings, and wherein the narrowest spacing among the second layout spacings is wider than the first layout spacing.

2. The radar device according to claim 1, wherein the radar transmitting circuit transmits the radar signals using time-division multiplexing, code-division multiplexing, or frequency-division multiplexing.

3. The radar device according to claim 1, wherein the radar transmitting circuit controls a beamforming processing by controlling phase of the radar signals.

4. The radar device according to claim 1, wherein the first layout spacing and each of the second layout spacings are 0.3 wavelengths or longer and 2 wavelengths or shorter, with a wavelength of the radar signals as a reference.

5. A method for transmitting and receiving radar signals, the method comprising:

transmitting, by a transmission array antenna connected to a radar transmitting circuit, radar signals; and receiving, by a receiving array antenna connected to a radar receiving circuit, return wave signals, where the radar signals have been reflected at a target, wherein one array antenna of the transmission array antenna and the receiving array antenna includes a plurality of first antennas, wherein a phase center of a first antenna and a phase center of a second antenna among phase centers of the plurality of first antennas are arranged continuously in a first axis direction, are laid out at a first layout spacing along the first axis direction, and are arranged at a same position in a second axis direction orthogonal to the first axis direction, wherein a remaining array antenna of the transmission array antenna and the receiving array antenna includes a plurality of second antennas, wherein a phase center of a third antenna, a phase center of a fourth antenna, a phase center of a fifth antenna, and a phase center of a sixth antenna among phase centers of the plurality of second antennas are arranged continuously in the first axis direction, are arranged at a same position in the second axis direction, and are laid out at second layout spacings having different layout spacings along the first axis direction, wherein a layout spacing between the phase center of the fourth antenna and the phase center of the fifth antenna among the second layout spacings is a narrowest spacing among of the second layout spacings, and wherein the narrowest spacing among the second layout spacings is wider than the first layout spacing.

6. The method for transmitting and receiving radar signals according to claim 5, wherein the radar signals are transmitted by using time-division multiplexing, code-division multiplexing, or frequency-division multiplexing.

7. The method for transmitting and receiving radar signals according to claim 5, wherein the radar signals are applied to a beamforming processing using phase control.

8. The method for transmitting and receiving radar signals according to claim 5, wherein the first layout spacing and each of the second layout spacings are 0.3 wavelengths or longer and 2 wavelengths or shorter, with a wavelength of the radar signals as a reference.

* * * * *